United States Patent [19]
Murakami et al.

[11] Patent Number: 5,926,588
[45] Date of Patent: Jul. 20, 1999

[54] OPTICAL SWITCH

[75] Inventors: Takashi Murakami; Tsutomu Watanabe; Kazumasa Ozawa; Hisao Maki; Kazuhito Saito, all of Yokohama; Nobuo Tomita, Higashiibaraki-gun, all of Japan

[73] Assignees: Sumitomo Electric Industries Ltd; Nippon Telegraph & Telephone Corporation, both of Japan

[21] Appl. No.: 08/507,378

[22] PCT Filed: Dec. 20, 1994

[86] PCT No.: PCT/JP94/02150

§ 371 Date: Aug. 21, 1995

§ 102(e) Date: Aug. 21, 1995

[87] PCT Pub. No.: WO95/17697

PCT Pub. Date: Dec. 20, 1994

[30] Foreign Application Priority Data

Dec. 20, 1993 [JP] Japan .................................... 5-319820
May 19, 1994 [JP] Japan .................................... 6-105631
Oct. 14, 1994 [JP] Japan .................................... 6-249548

[51] Int. Cl.[6] ...................................................... G02B 6/26
[52] U.S. Cl. ............................................. 385/16; 385/20
[58] Field of Search ................................ 385/16, 17, 18, 385/19, 20, 21, 22, 23, 25, 49

[56] References Cited

U.S. PATENT DOCUMENTS 5,035,482  7/1991  ten Berge et al. ...................... 350/96.2
5,239,599  8/1993  Harman ..................................... 385/16
5,446,810  8/1995  Watanabe et al. ........................ 385/22

FOREIGN PATENT DOCUMENTS 55-156903  12/1980  Japan .
63-29220   2/1988   Japan .
2-287313   11/1990  Japan .
5-181073   7/1993   Japan .
7-43625    2/1995   Japan .

OTHER PUBLICATIONS

Microfilm of the specification and drawings annexed to the written application of Japanese Utility Model Application No. 115694/1978 (Laid–Open No. 32863/2980) (Nippon Telegraph & Telephone Corp.), Mar. 3, 1980.

Microfilm of the specification and drawings annexed to the written application of Japanese Utility Model Application No. 164706/1979 (Laid–Open No. 80502/1981) (Sumitomo Electric Industries, Ltd.), Jun. 30,1981, lines 1 to 3, p. 6.

*Primary Examiner*—John Ngo
*Attorney, Agent, or Firm*—Cushman Darby & Cushman IP Group of Pillsbury Madison & Sutro LLP

[57] ABSTRACT

An optical switch of the present invention comprises an optical fiber arranging member in which tip ends of a plurality of first optical fibers are juxtaposed, a movable arm facing the optical fiber arranging member and fixing a tip end of a second optical fiber, and a drive mechanism For driving at least one of the optical fiber arranging member and the movable arm, for switching of optical connection, in an arrangement direction of the first optical fibers and in a direction perpendicular to the arrangement direction of the first optical fibers to optically couple the second optical fiber with the first optical fiber, wherein the optical fiber arranging member and the movable arm are encased in a sealing case and wherein an antireflection agent is filled in the sealing case.

36 Claims, 49 Drawing Sheets

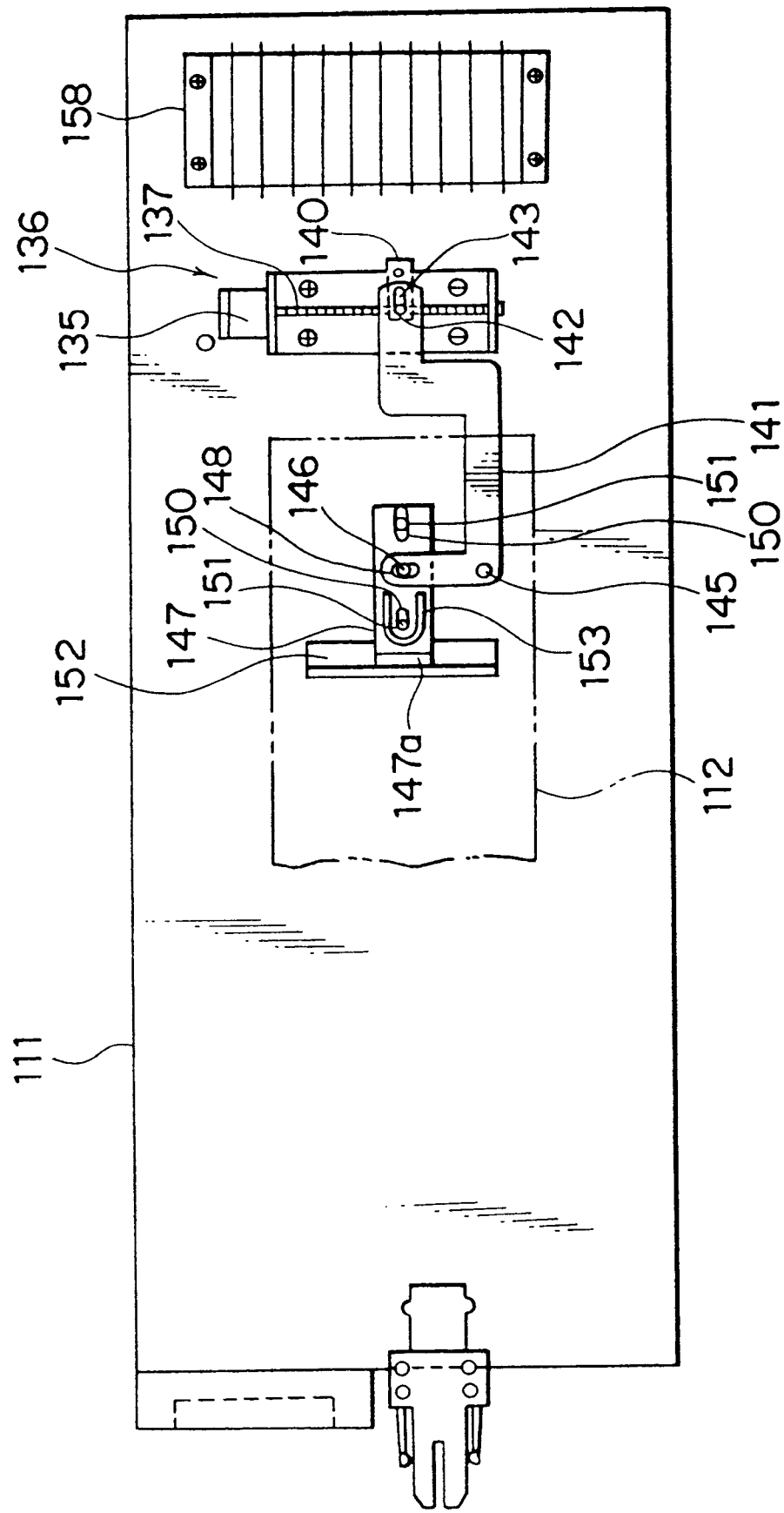

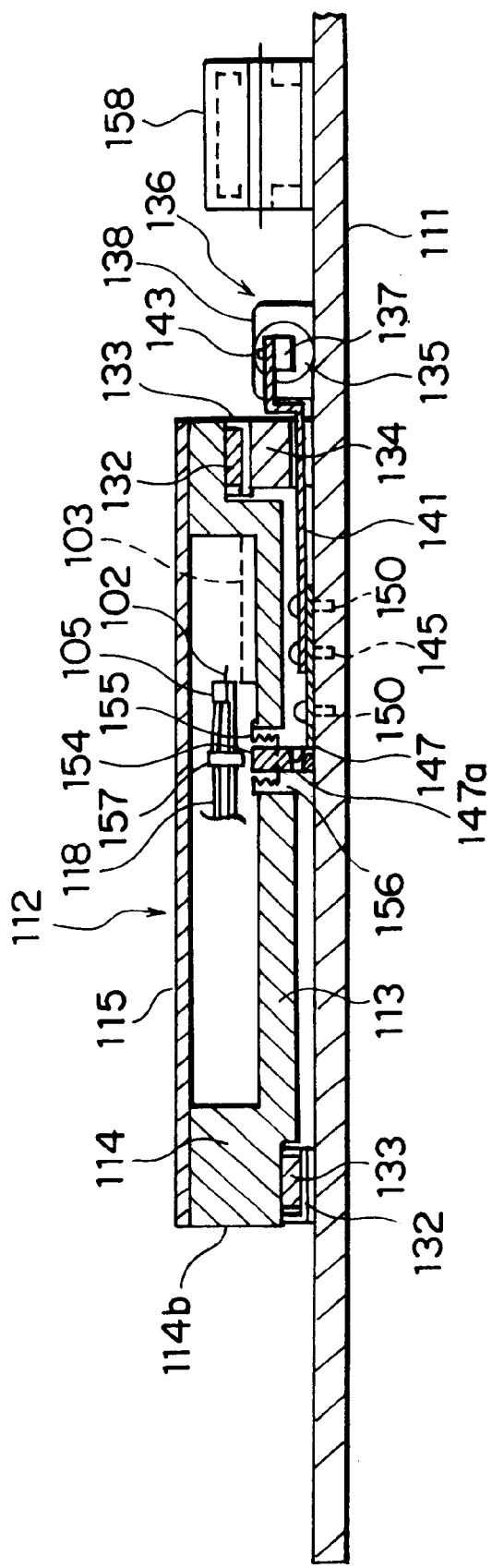
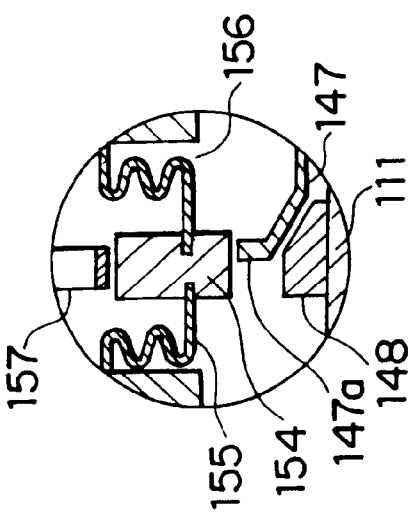

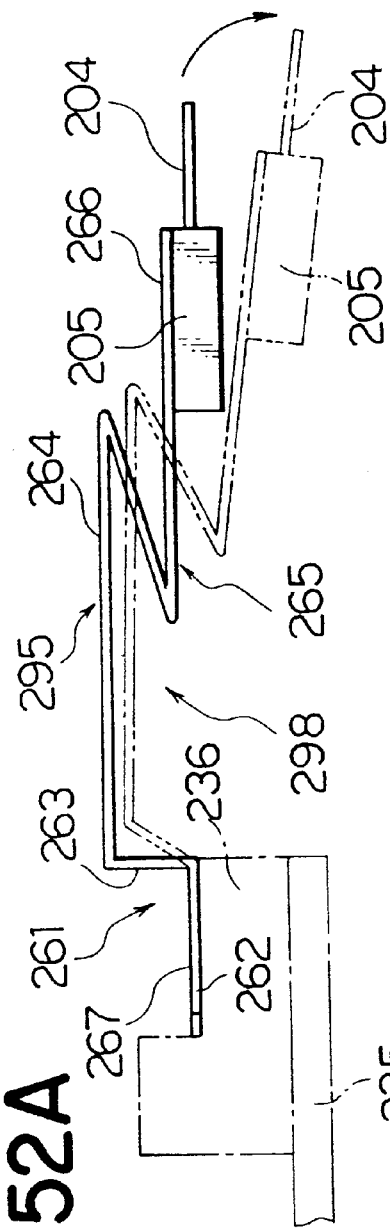
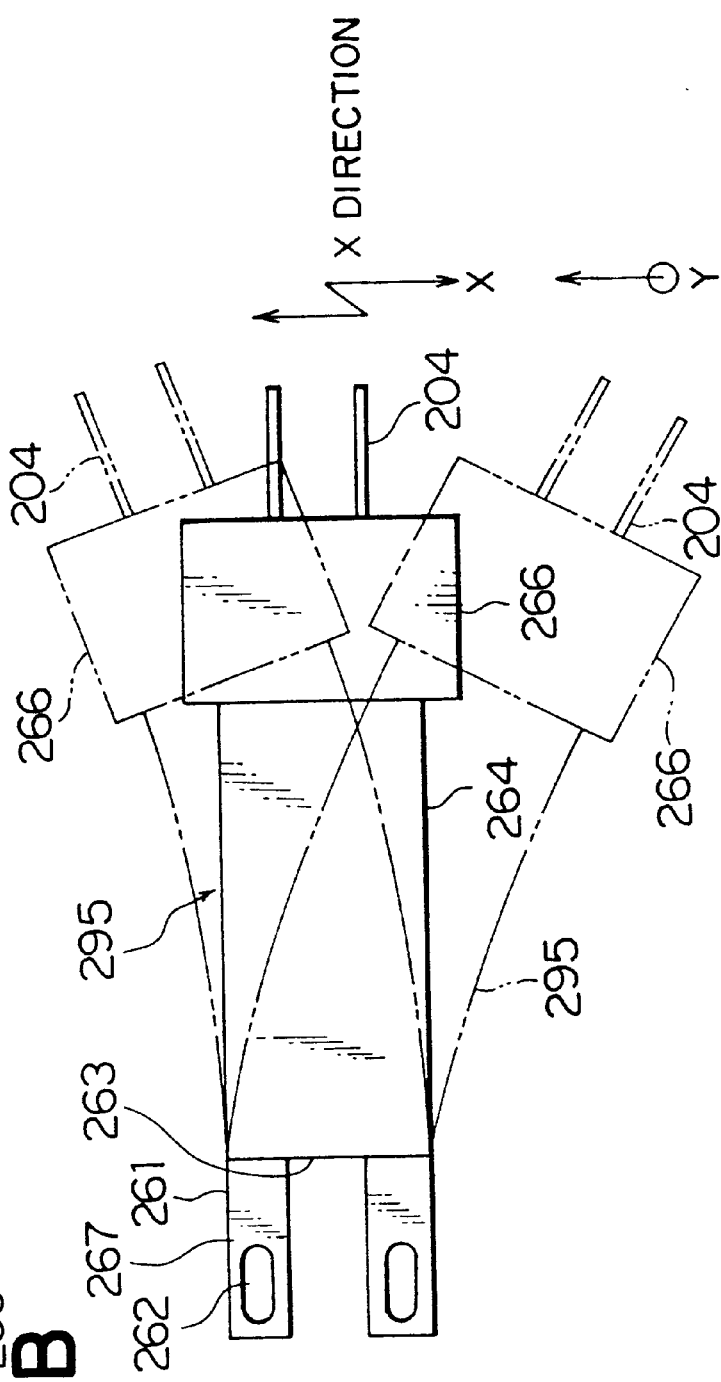
Fig. 52A
Fig. 52B

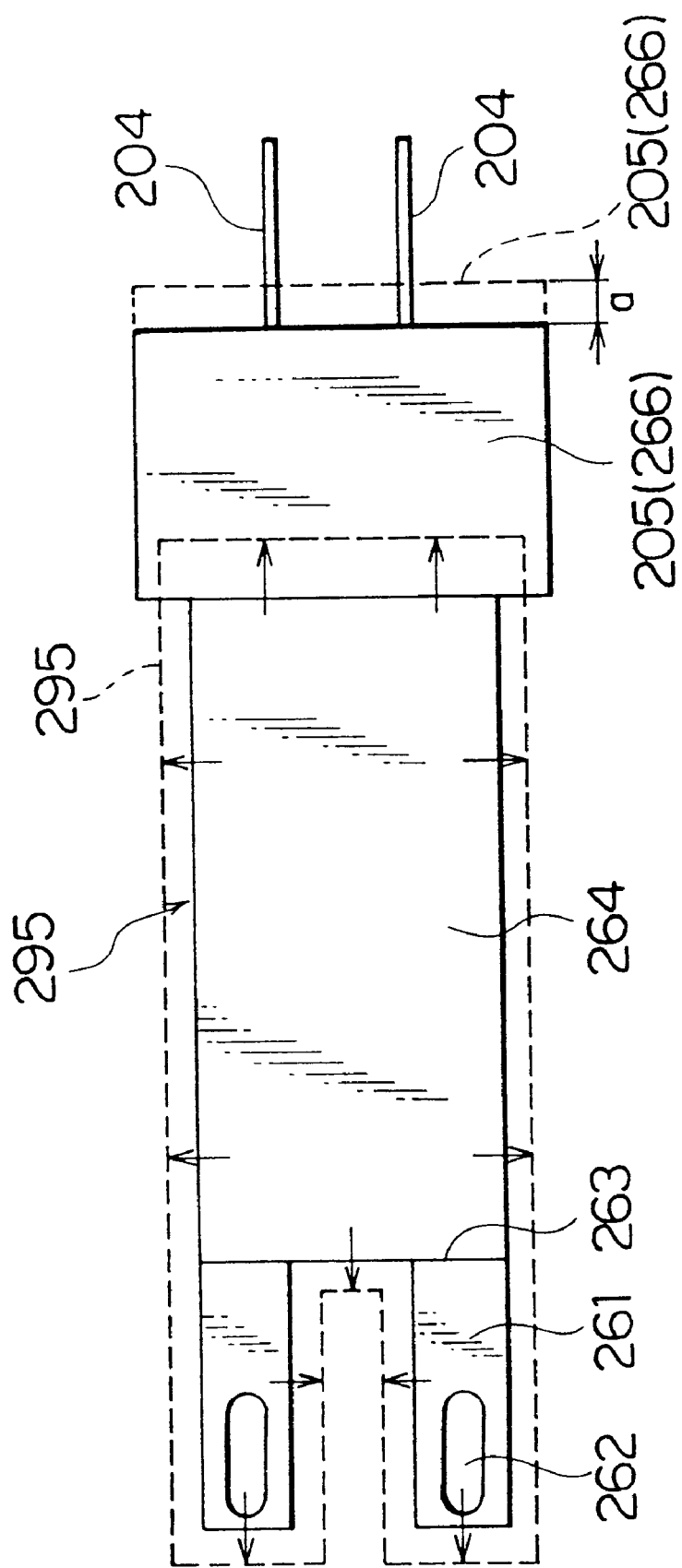

ABSTRACT

OPTICAL SWITCH

TECHNICAL FIELD

The present invention relates to an optical switch, and particularly to an optical switch for optical coupling between a plurality of first optical fibers juxtaposed on an optical fiber arranging member and a second optical fiber movable along the optical fiber arranging member.

BACKGROUND ART

There are known optical scan switches provided with a connector table in which a lot of connectors are arranged in a matrix and are to be connected to a master connector which is two-dimensionally movable ("C-449, 10-path-batch 1×1000 optical scan switch," Spring Meeting (1998), Institute of Electronics, Information and Communication Engineers of Japan, P4-238).

The conventional connector table, however, achieved the two-dimensional arrangement of optical fibers by physically arranging a plurality of connectors in a matrix. Thus, the arrangement was not accurate between optical fibers held by different connectors, thereby exhibiting a defect that they were not able to be connected with accuracy with an optical fiber held in the master connector.

DISCLOSURE OF THE INVENTION

The optical switch of the present invention has been accomplished to solve the above problem, and specifically, an object of the invention is to stabilize optical characteristics in optically coupling a movable-side optical fiber with a stationary-side optical fiber, to improve reliability of optical coupling, and to improve positioning accuracy upon optical coupling.

An optical switch according to the present invention comprises an optical fiber arranging member in which tip ends of a plurality of first optical fibers are juxtaposed, a movable arm facing the optical fiber arranging member and fixing a tip end of a second optical fiber, and a drive mechanism for driving at least one of said optical fiber arranging member and said movable arm, for switching of optical coupling, in a direction of arrangement of said first optical fibers and in a direction perpendicular to the direction of arrangement of said first optical fibers to optically couple said second optical fiber with said first optical fiber, wherein said optical fiber arranging member and said movable arm are encased in a sealing case and an antireflection agent is filled in the sealing case.

In the optical switch according to the present invention, where an arbitrary fiber is selected out of the plurality of first optical fibers juxtaposed on the optical fiber arranging member, the drive device moves the second optical fiber in the direction to release optical coupling, i.e., in the direction to get away from the arrangement plane of the first optical fibers in the direction perpendicular thereto and thereafter, the second optical fiber is moved by a predetermined distance along the arrangement direction of the first optical fibers. After that, while moving the second optical fiber in the direction to approach the arrangement plane, the second optical fiber is stopped at a predetermined position, thus effecting optical coupling or switching of light. On this occasion, because the optical fiber arranging member and moving arm are encased in the sealing case filled with the antireflection agent, dust or the like can be prevented from intruding into the sealing case from the outside. Driving either the optical fiber arranging member or the movable arm, sure optical coupling can be achieved through the antireflection agent.

An optical switch according to the present invention comprises a first base plate on a top surface of which a plurality of fiber fixing grooves for fixing a plurality of first optical fibers are formed; a second base plate on a top surface of which a plurality of fiber introducing grooves for introducing a second optical fiber are formed as located on extension lines of said fiber fixing grooves; an optical fiber arranging member having said first base plate and said second base plate; a movable head facing said optical fiber arranging member and fixing a tip end of said second optical fiber; a positioning member provided in said movable head and engaging with said fiber introducing groove; a movable arm having said movable head at a tip end thereof; and a drive device for driving said movable arm in a direction of arrangement of said first optical fibers and in a direction perpendicular to the direction of arrangement of said first optical fibers to optically couple said second optical fiber with said first optical fiber.

Thus, the optical switch according to the present invention is so arranged that when the second optical fiber is carried into the fiber introducing groove to be optically coupled with one of the first optical fibers, the positioning member provided in the movable head comes into fit with the fiber introducing groove, whereby the second optical fiber becomes stationary as positioned in the fiber introducing groove even with application of external stress on the movable head in the fiber arrangement direction. Further, because the movable arm is arranged to have elasticity, the second optical fiber and positioning member are pressed to the fiber introducing grooves, which keeps the second optical fiber from floating out of the fiber introducing groove, thus causing no deviation of optical axis between the first and second optical fibers.

An optical switch according to the present invention comprises a first base plate on a top surface of which a plurality of fiber fixing grooves for fixing a plurality of first optical fibers are formed; a second base plate on a top surface of which a plurality of fiber introducing grooves for introducing a second optical fiber are formed as located on extension lines of said fiber fixing grooves; an engaging portion formed on the top surface of said second base plate and formed along said fiber introducing grooves; an optical fiber arranging member having said first base plate and said second base plate; a movable head facing said optical fiber arranging member and fixing a tip end of said second optical fiber; a positioning member provided in said movable head and engaging with said engaging portion; a movable arm having said movable head at a tip end thereof; and a drive device for driving said movable arm in a direction of arrangement of said first optical fibers and in a direction perpendicular to the direction of arrangement of said first optical fibers to optically couple said second optical fiber with said first optical fiber.

Thus, the optical switch according to the present invention is so arranged that when the second optical fiber is carried into the fiber introducing groove to be optically coupled with one of the first optical fibers, the positioning member provided in the movable head comes into fit with the engaging portion, whereby the second optical fiber becomes stationary as positioned in the fiber introducing groove even with application of external stress on the movable head in the fiber arrangement direction. Further, because the movable arm is arranged to have elasticity, the second optical fiber and positioning member are pressed to the engaging portion, which keeps the second optical fiber from floating out of the fiber introducing groove, thus causing no deviation of optical axis between the first and second optical fibers.

The above object and other objects will be apparent from the description to follow.

BRIEF DESCRIPTION OF THE DRAWINGS

FIG. 26 is a plan view to show the second drive mechanism for moving the second optical fibers.

FIG. 27A is an expanded portion of FIG. 27.

FIG. 27 is a longitudinal cross section of the optical switch to show related mechanisms to the second drive mechanism of FIG. 26.

FIG. 32A is an expanded portion of FIG. 32.

FIGS. 52A and 52B are side view and plan view of the second movable arm.

FIG. 57 is a plan view to show a deformed state due to thermal expansion, of the movable arm.

BEST MODE FOR CARRYING OUT THE INVENTION

Preferred embodiments of the optical switch according to the present invention will be described in detail by reference to the drawings.

Figure 1:
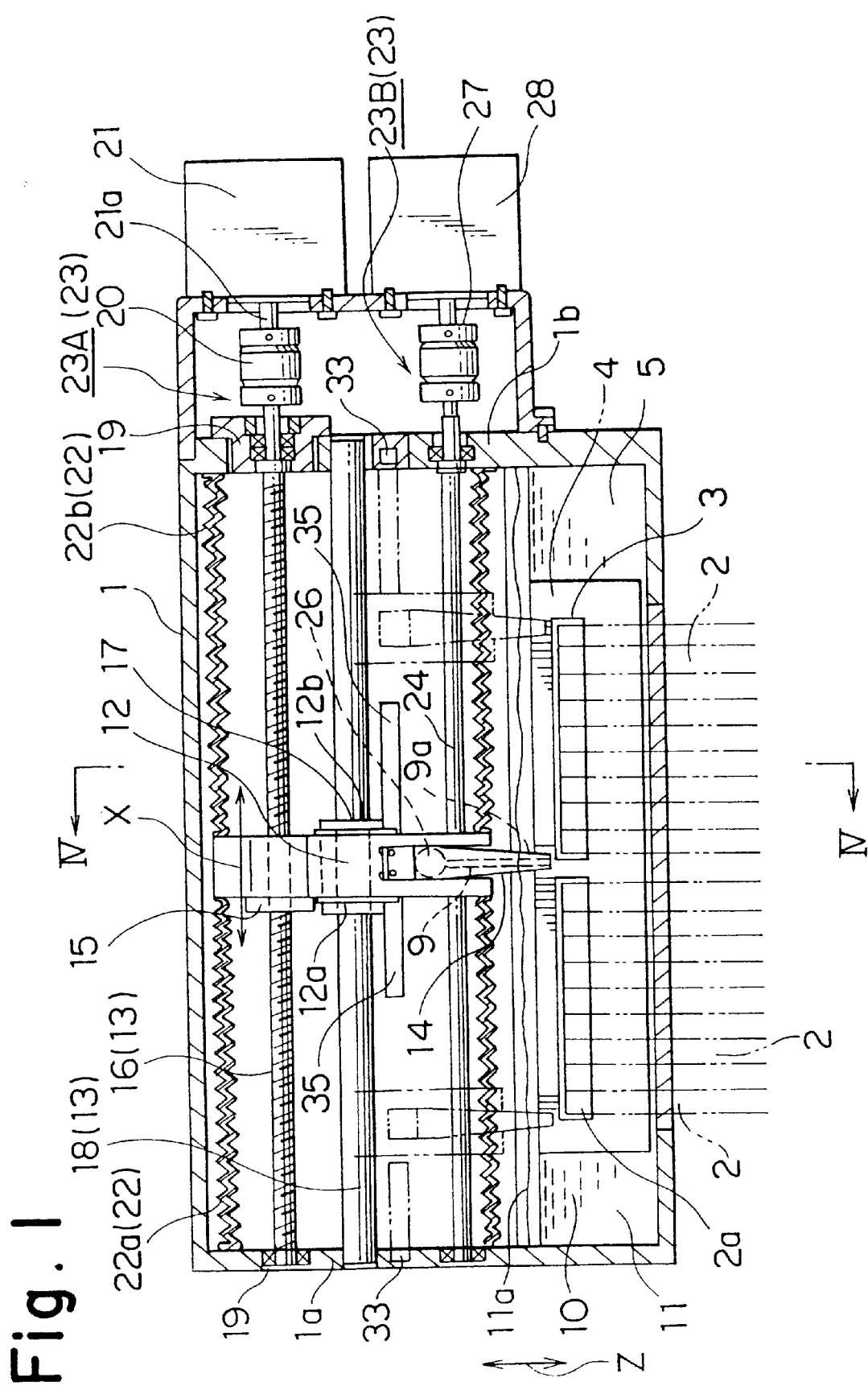
FIG. 1 is a cross section to show an optical switch of the present invention.
Figure 4:
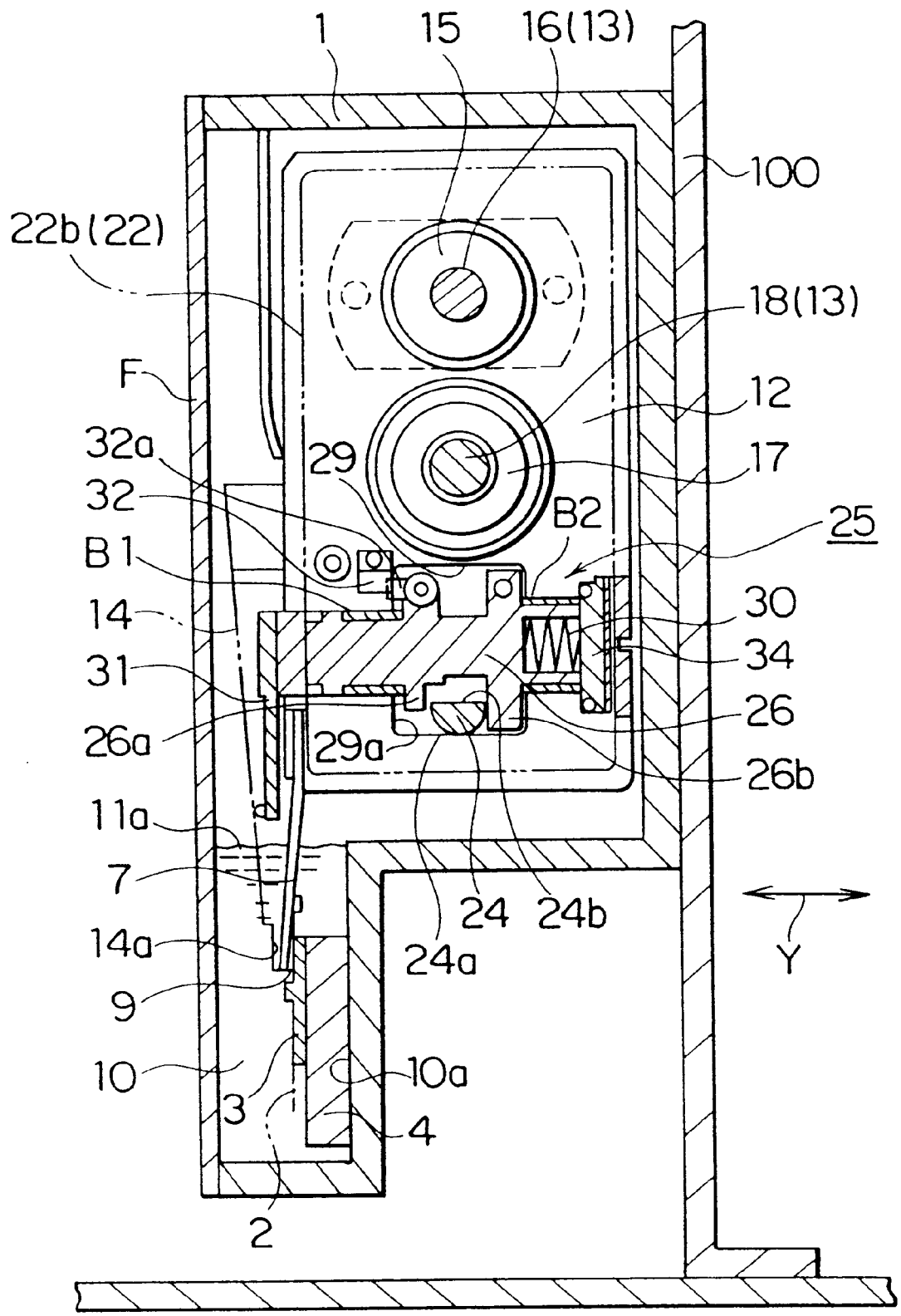
FIG. 4 shows a first embodiment of a second drive mechanism and is a cross section along IV—IV line in FIG. 1.

In FIG. 1 and FIG. 4, reference numeral 1 designates an oblong sealing case hermetically closed by a cap F, and this sealing case 1 is arranged to prevent dust from intruding from the outside and also to prevent an antireflection agent 11, as detailed later, from leaking out because it is perfectly sealed to the outside. Fixed in the lower part of the sealing case 1 is an optical fiber arranging member 3 for a plurality of first optical fibers 2 in a tape form to be arranged in a juxtaposed relation. This optical fiber arranging member 3 is fixed to an internal wall 5 of the sealing case 1 through a base 4 having a predetermined thickness (FIG. 4).

Figure 2:
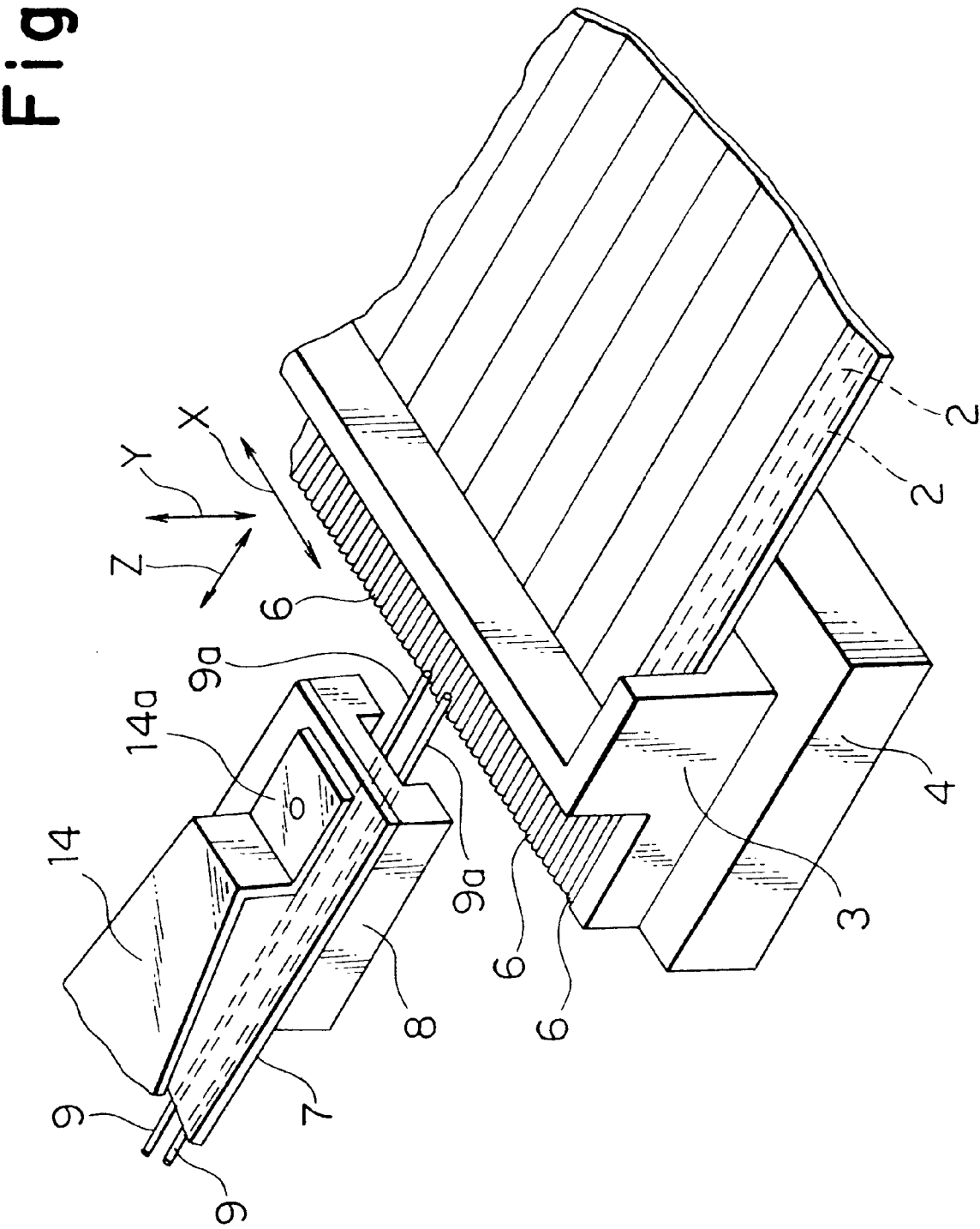
FIG. 2 is a perspective view to show fiber introducing grooves provided in an optical fiber arranging member.
Figure 3:
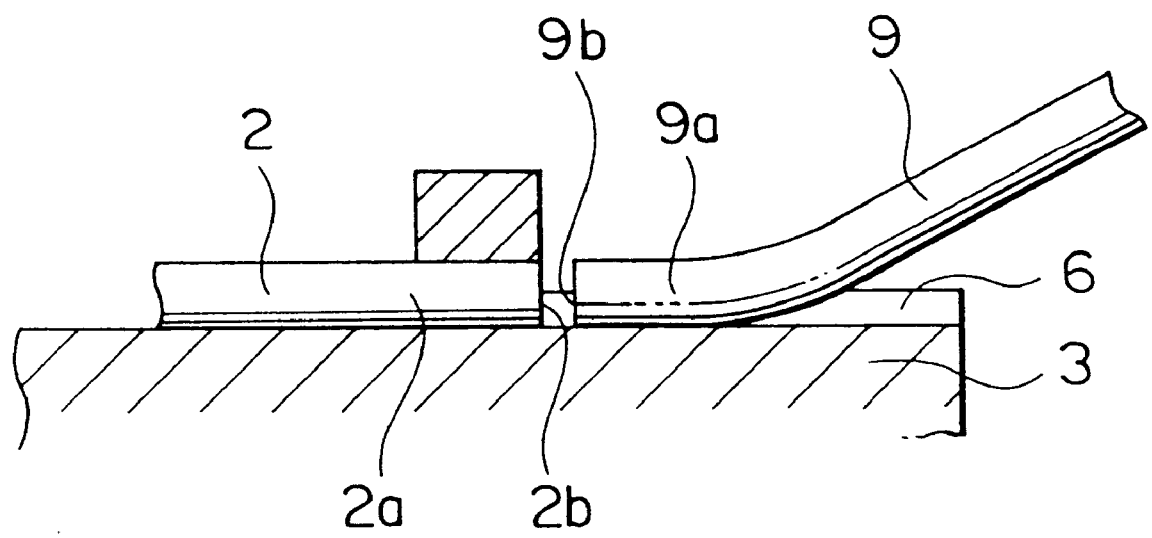
FIG. 3 is a side view to show optical coupling between a first optical fiber and a second optical fiber.

As shown in FIG. 2 and FIG. 3, fiber introducing grooves 6 each in a V cross section are juxtaposed in a number corresponding to the number of first optical fibers 2 in the upper part of the optical fiber arranging member 3, and an end facet 2b of a tip end 2a of each first optical fiber 2 is fixed therein so as to be exposed from a terminal end of each fiber introducing groove 6. Further, a movable arm 94 is composed of a first movable arm 14 and a second movable arm 7 of plate spring form. Thus, when a tip end 9a of a second optical fiber 9 set in a head 8 of the second movable arm 7 composing a part of the movable arm 94 is inserted into a fiber introducing groove 6, an end facet 9b of the second optical fiber 9 comes to be aligned with an end facet 2b of a first optical fiber 2, thereby achieving arbitrary optical coupling.

Figure 5:
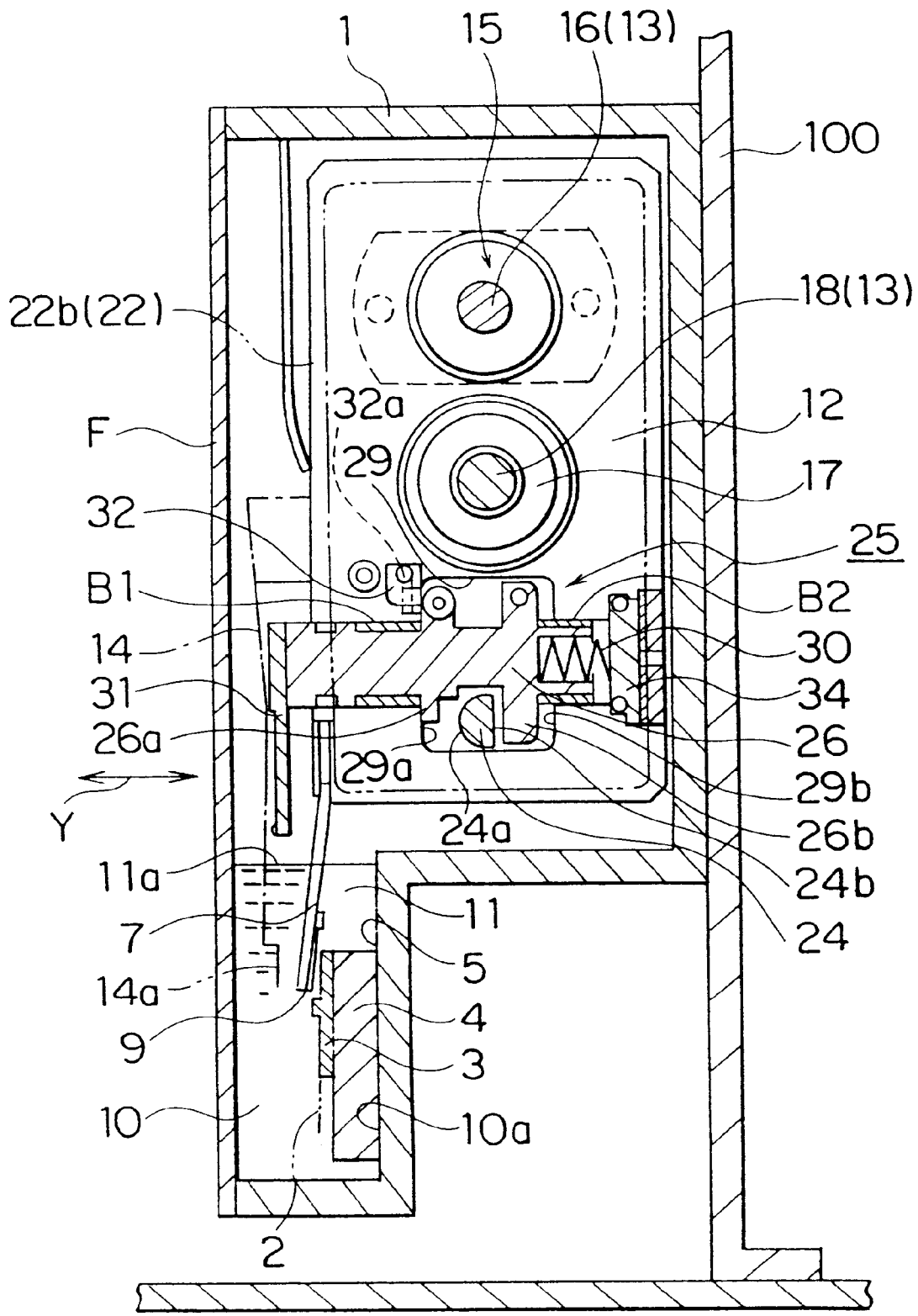
FIG. 5 is a cross section to show a state in which a movable element is driven from the state of FIG. 4 to release the optical coupling.

As shown in FIG. 1, FIG. 4, and FIG. 5, an oil sump recess 10 for encasing the tip ends 2a of the first optical fibers 2 and the tip ends 9a of the second optical fibers 9 is formed in the lower part of the sealing case 1, and the antireflection agent (for example, silicone oil) 11 having a nearly equal refractive index to that of fibers is charged in a predetermined amount into the oil sump recess 10. A specific structure of the oil sump recess 10 may be such that the volume of the lower part of the sealing case 1 is made smaller than that of the upper part and that this part with the smaller volume is used as the oil sump recess 10. Further, the base 4 is fixed to an upright surface 10a forming the oil sump recess 10 and the optical fiber arranging member 3 is fixed on this base 4, so that the fiber introducing grooves 6 may be juxtaposed in a direction nearly perpendicular to a liquid surface 11a. As a consequence, after completion of charging the antireflection agent 11 into the oil sump recess 10, the optical fiber arranging member 3 can be completely sunk in the oil sump recess 10 and the tip ends 9a of the second optical fibers 9 can also be sunk in the oil sump recess 10. Accordingly, the tip ends 9a of the second optical fibers 9 can be kept from being exposed from the liquid surface 11a of the antireflection agent 11 even when the second optical fibers 9 are driven in a predetermined direction by a drive mechanism as detailed later.

As shown in FIG. 2, the tip ends 9a of the second optical fibers 9 are fixed to the head 8 of the second movable arm 7 comprised of a plate spring and project a predetermined amount from the tip of the head 8. The second movable arm 7 extends vertically (in the Z direction), and the tip end thereof constitutes a free end and faces the fiber introducing grooves 6 of the optical fiber arranging member 3. Also, the base end of the second movable arm 7 is fixed to a base stage 12 rockably arranged in the sealing case 1, and the base stage 12 composes a rectangular block body. Here, because the second movable arm 7 is formed from a plate spring, it generates a resilient force while a force is applied to the free end. Employed as means for pressing the free end of the second movable arm 7 is the first movable arm 14 of plate spring form extending from the base stage 12 so as to cover the second movable arm 7 and composing a part of the movable arm 94. The base end of the first movable arm 14 is fixed to the base stage 12, and a pressing portion 14a curved in an L shape is formed at the free end thereof, so that the pressing portion 14a is arranged to engage with the free end of the second movable arm 7. The pressing portion 14a is coated with a Teflon resin, whereby friction can be reduced between the pressing portion 14a and the second movable arm 7, thereby suitably preventing production of wear powder.

The base stage 12 slides back and forth through a slide guide portion 13 as described later in the directions of arrangement of the First optical fibers 2 (hereinafter referred to as the X directions), and encases an optical fiber access mechanism 25 for moving the second optical fibers 9 back and forth in the directions perpendicular to the directions of arrangement of the first optical fibers 2 (hereinafter referred to as the Y directions).

The slide guide portion 13, extending in the X directions, for moving the base stage 12 in the X directions is provided in the upper part in the sealing case 1 hermetically closed. This slide guide portion 13 is composed of an external thread shaft 16 extending in the X directions as piercing the base stage 12 and meshed with an internal thread portion 15 fixed in the base stage 12, and a guide shaft 18 extending in parallel with the external thread shaft 16 and piercing the base stage 12 through a thrust bearing 17. The external thread shaft 16 is rotatably supported by both sides 1a, 1b of the sealing case 1 through bearings 19, and the guide shaft 18 is fixed to the both ends 1a, 1b. Also, one end of the external thread shaft 16 is interconnected through a coupling 20 to a drive shaft 21a of a motor 21.

The above slide guide portion 13 is surrounded by a sealing cover 22, and this sealing cover 22 is composed of a first sealing cover 22a of bellows stretching between one side surface 12a of the base stage 12 and the side 1a facing it, and a second sealing cover 22a of bellows stretching between another side surface 12b and the side 1b facing it. Thus, utilizing the sealing cover 22, the slide guide portion 13 can be isolated in the sealing case 1, which can confine wear powder produced by movable contact between the slide guide portion 13 and the base stage 12 within the sealing cover 22 and which can make the antireflection agent 11 unlikely to flow into the sealing cover 22 even if the optical switch normally used in an upright position is laid on its side.

Next described is a drive mechanism 23 for optically coupling the second optical fibers 9 with the first optical fibers 2.

The drive mechanism 23 is composed of a first drive mechanism 23A for driving the base stage 12 in the X directions, as described previously, and a second drive mechanism 23B for driving the second optical fibers 9 in the Y directions, and the first drive mechanism 23A includes the slide guide portion 13 and the motor 21 as described above as main constituents. Also, the second drive mechanism 23B is composed mainly of a cam shaft 24 of a semicircular cross section sealed in the sealing cover 22 and extending in the X directions so as to pierce the base stage 12, a motor 28 for rotating the cam shaft 24 through a coupling 27, as shown in FIG. 1, and the optical fiber access mechanism 25 arranged to move back and forth in the Y directions in cooperation with the cam shaft 24, as shown in FIG. 4 and FIG. 5.

As shown in FIG. 4 and FIG. 5, the optical fiber access mechanism 25 is provided with a cylindrical movable element 26 energized by a spring 30, and the movable element 26 has first and second flanges 26a, 26b on the outer periphery thereof and is set in a receiving space portion 29 formed inside the base stage 12. In this receiving space portion 29, there are formed a first restraining wall 29a facing the first flange 26a, for restraining the movable element 26 from moving in the Y direction, and a second restraining wall 29b facing the second flange 26b, for restraining the movable element 26 from moving in the Y direction. Also, one end of the movable element 26 is biased by the compression spring 30 supported by a support portion 34 screwed on the base stage 12, and a stay 31 extending along the first movable arm 14 is fixed to the other end of the movable element 26. This stay 31 is interposed between the second movable arm 7 and the first movable arm 14, a tip thereof is in contact with the back face of the first movable arm 14 being resilient, and the stay can be driven to follow movement of the first movable arm 14 being resilient. Ring bushes B1, B2 are fixed between the movable element 26 and the wall of the receiving space portion 29, thereby facilitating translation of the movable element 26.

Here, a semicircular cam shaft 24 is inserted between the first flange 26a and the second flange 26b of the movable element 26. A contour of the cross section of the cam shaft 24 is composed of a curved acting surface 24a and a linear non-acting surface 24b. As shown in FIG. 4, when the cam shaft 24 rotates to bring the acting surface 24a into contact with the second flange 26b, the movable element 26 is pushed down against an elastic force of the spring 30. Further, as shown in FIG. 5, when the cam shaft 24 rotates to make the non-acting surface 24b facing the second flange 26d, the movable element 26 is pushed up by the elastic force of the spring 30. On this occasion, the first flange 26a comes into contact with the first restraining surface 29a, which controls an amount of projection of the movable element 26 and which keeps the non-acting surface 24b of the cam shaft 24 from contacting the second flange 26b. As a result, there is no friction of the movable element 26 against the cam shaft 24, which enables the base stage 12 to move smoothly in the X directions and which can prevent production of wear powder.

A photosensor 32 fixed to a side face 12b of the base stage 12 works with a switch bar 32a provided on the movable element 26 to detect a Y-directional position of the movable element 26. As shown in FIG. 1, photosensors 33 fixed to the sides 1a, 1b of the sealing case 1 work with a pair of switch bars 35 provided on the side faces of the base stage 12 to detect X-directional terminal end positions of the base stage 12. Since these photosensors 32, 33 and switch bars 32a, 35 are placed inside the sealing cover 22, this arrangement can avoid influence due to scattering of the antireflection agent 11 and can prevent a malfunction.

Next described is the operation of the optical switch as described above. For using the optical switch in the vertical posture as shown in FIG. 4 and FIG. 5, the sealing case 1 is fixed to a fixing plate 100 vertically standing so as to locate the oil sump recess 10 in the lower part of the sealing case 1.

For optically coupling first optical fibers 2 arbitrarily selected with the second optical fibers 9, the motor 28 is driven to rotate the cam shaft 24 by a predetermined amount before the tip ends 9a of the second optical fibers 9 become away from the fiber introducing grooves 6, i.e., before the state shown in FIG. 5 is achieved. After that, the motor 21 is driven for a predetermined time to rotate the external thread shaft 16 by a predetermined amount, thereby feeding the base stage 12 by an arbitrary amount. Then the motor 21 is stopped to stop the base stage 12 at the position.

After that, the motor 28 is driven to rotate the cam shaft 24 by a predetermined amount, whereby, as shown in FIG. 4, the acting surface 24a pushes the second flange 26b of the movable element 26 against the elastic force of the spring 30. This lowers the stay 31 and releases the resilient force of the first movable arm 14 pushed up by the stay 31. On that occasion, the elastic force of the first movable arm 14 pushes down the free end of the second movable arm 7 by the pressing portion 14a to insert the tip ends 9a of the second optical fibers 9 into the fiber introducing grooves 6, thereby achieving optical coupling between the arbitrary first optical fibers 2 and the second optical fibers 9. In this optical coupling state the cam shaft 24 and the second flange 26b are in contact with each other under a predetermined pressure by energization of the spring 30, thereby making the base stage 12 unlikely to deviate in the X directions.

For moving the base stage 12 in the X directions, the motor 28 is driven to rotate the cam shaft 24 by a predetermined amount. This makes the non-acting surface 24b face the second flange 26d, as shown in FIG. 5, to push up the movable element 26 by the elastic force of the spring 30. On this occasion, the first flange 26a comes into contact with the first restraining surface 29a to control an amount of projection of the movable element 26, which can avoid contact or friction between the non-acting surface 24b of the cam shaft 24 and the second flange 26b. Also, ascent of the stay 31 pushes up the first movable arm 14 against the resilient force to separate the pressing portion 14a from the second movable arm 7 and to release the pressing force of the second movable arm 7, whereby utilizing the elastic force of the second arm itself, the second optical fibers 9 are removed from the fiber introducing grooves 6 so as to become ready for X-directional feed of the base stage 12.

A second embodiment of the second drive mechanism 40 is next described referring to FIG. 6 to FIG. 11. Same or like constituent portions as those in the above embodiment will be denoted by the same reference numerals, and description thereof will be omitted.

Figure 6:
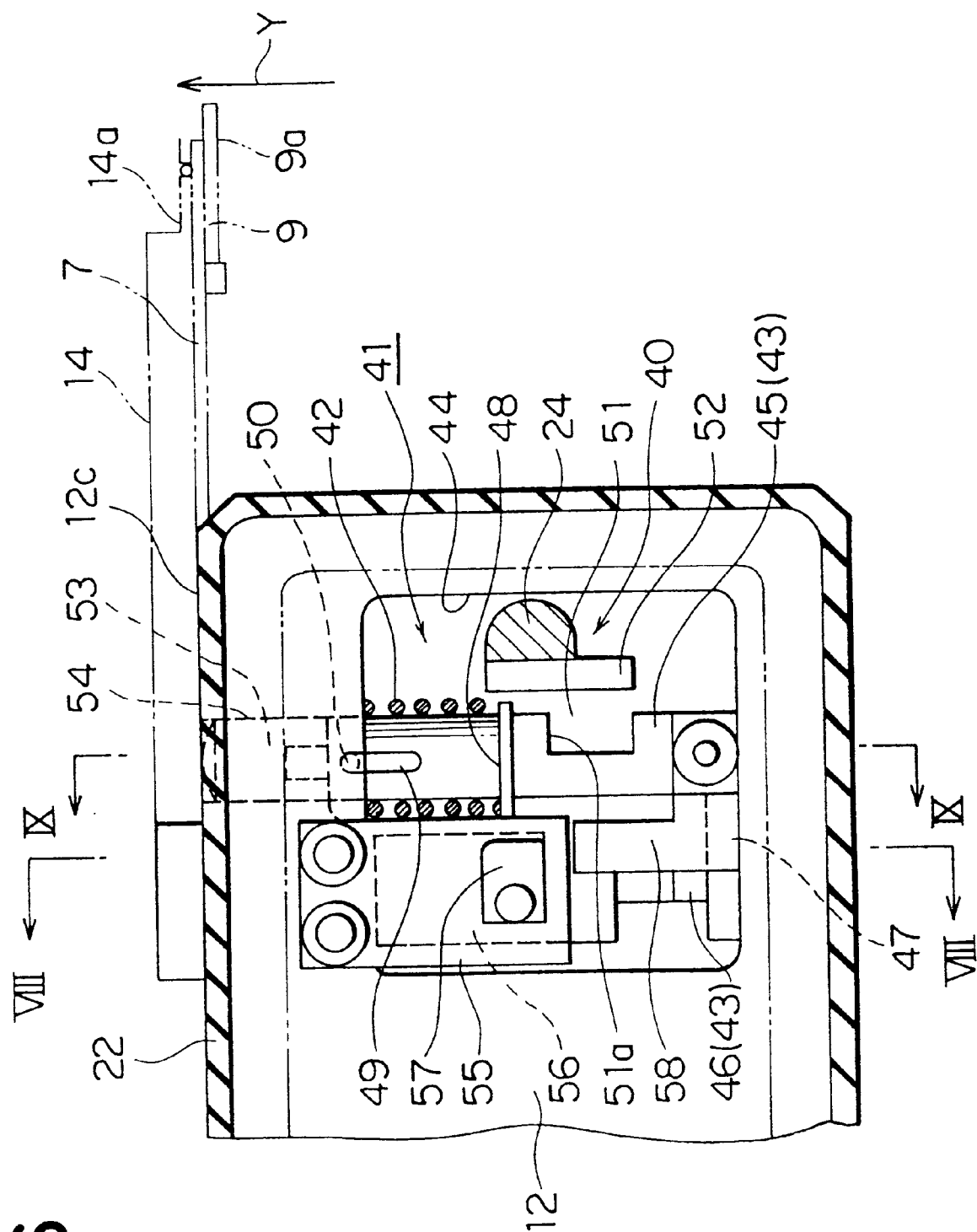
FIG. 6 is a cross section to show a second embodiment of the second drive mechanism.
Figure 7:
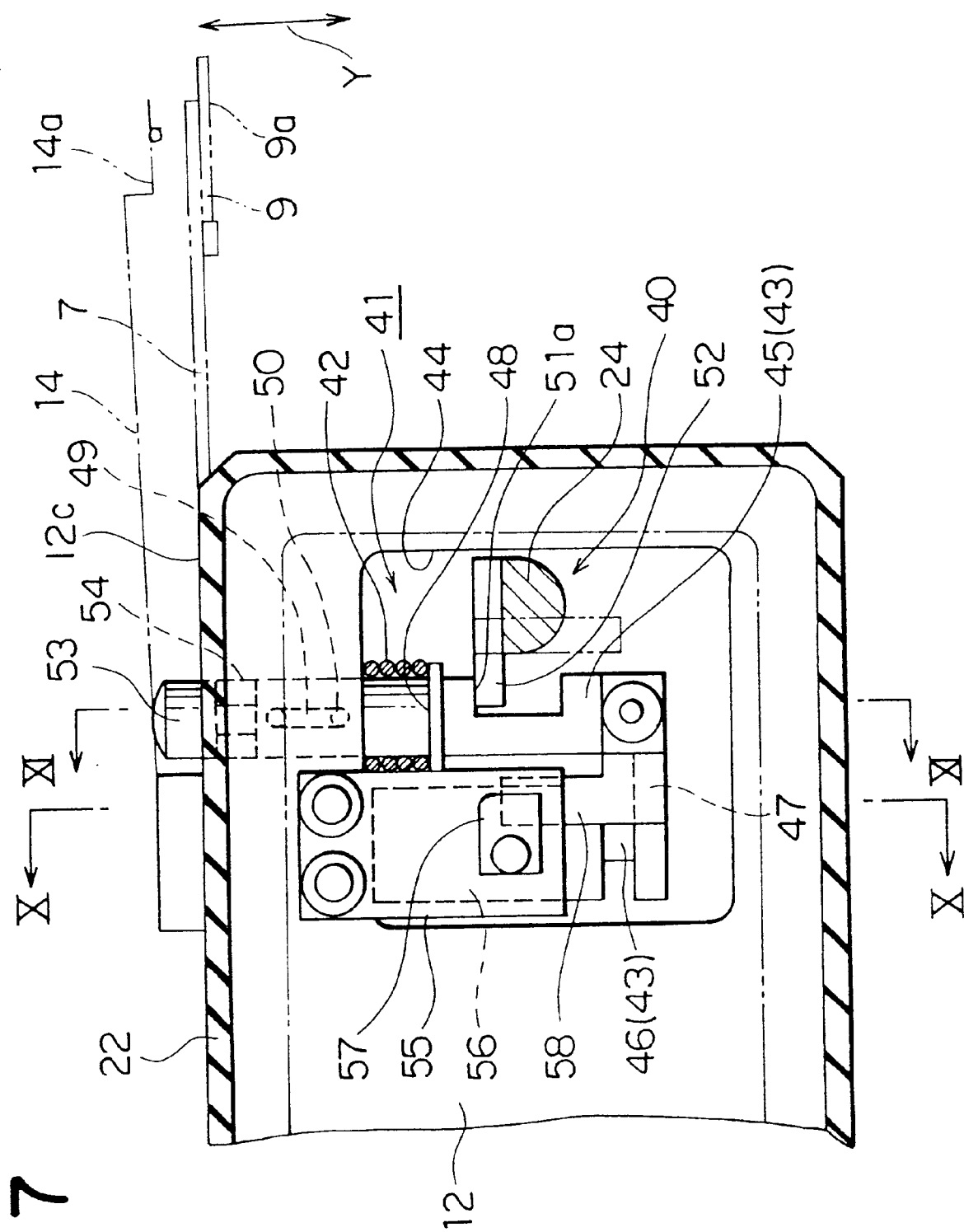
FIG. 7 is a cross section to show a state in which a movable element is driven from the state of FIG. 6 to release the optical coupling.

The second drive mechanism 40 for driving the second optical fibers 9 in the Y directions is composed of the cam shaft 24 of a semicircular cross section sealed in the sealing cover 22 and extending in the X directions so as to pierce the base stage 12, the motor 28 for rotating the cam shaft 24 through the coupling 27, as shown in FIG. 1, and an optical fiber access mechanism 41 moving back and forth in the Y directions in cooperation with the cam shaft 24, as shown in FIG. 6 and FIG. 7.

This optical fiber access mechanism 41 is provided with a separate movable element 43 energized by a compression spring 42. This movable element 43 is set in a receiving space portion 44 formed inside the base stage 12 and has first part 45 and second part 46 in a nearly cylindrical shape, and the first part 45 and second part 46 are unitarily constructed through an interconnecting portion 47.

Figure 9:
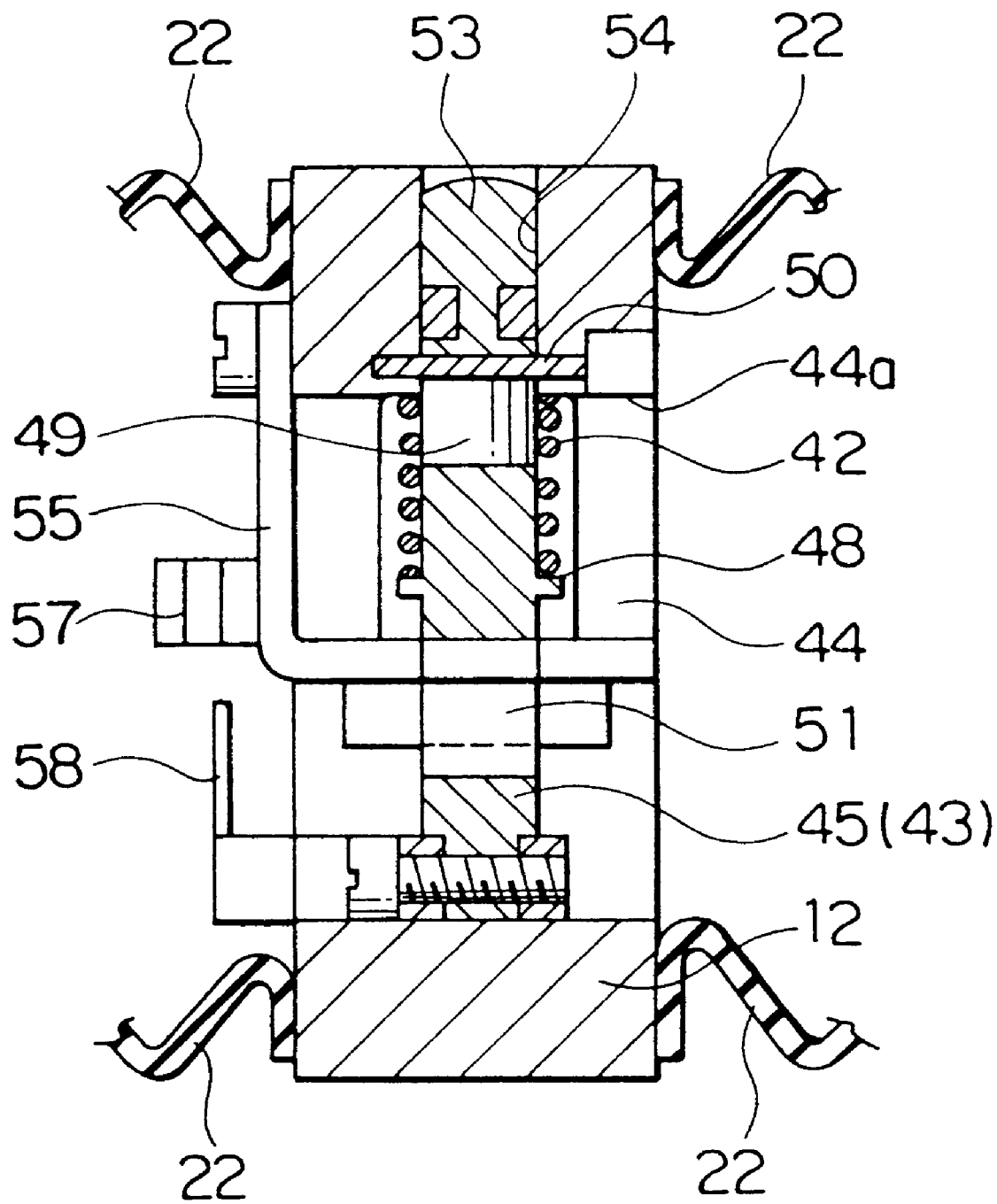
FIG. 9 is a cross section along IX—IX line in FIG. 6.

As shown in FIG. 6 and FIG. 9, the compression spring 42 is set in the center of the first part 45, one end of the spring 42 is in contact with one wall surface 44a of the receiving space portion 44 while the other end in contact with a flange portion 48. As a consequence, the movable element 43 is arranged as capable of going into or out of through the spring 42.

In the upper part of the first part 45, a restraining hole 49 is formed in a predetermined length in the axial directions or the Y directions, and a restraining pin 50 fixed on the base stage 12 is fit in the restraining hole 49. Since an amount of movement of the movable element 43 can be controlled by cooperative action of the restraining hole 49 of an elongate hole and the restraining pin 50, the stroke of the movable element 43 can be suitably modified by suitably changing the length of the restraining hole 49.

In the lower part of the first part 45, a cut-out 51 is formed in the axial directions, and the cut-out 51 faces an actuator piece 52 fixed on the cam shaft 24 and is located within a radius of rotation of the actuator piece 52. Since the movable element 43 needs to be moved back and forth by cooperative action between the actuator piece 52 and the cut-out 51 even if the movable element 43 is located at any position in the X directions, the actuator piece 52 is fixed throughout the length corresponding to the range of movement of the movable element 43 in the X directions.

Also, an actuator head 53 is formed in the uppermost portion of the first part 45, and the actuator head 53 is inserted into a through hole 54 piercing from the receiving space portion 44 to the top face 12c of the base stage 12 and is disposed at a position to contact the back face of the first movable arm 14. Accordingly, the first movable arm 14 being resilient can be driven to follow movement of the actuator head 53.

Figure 8:
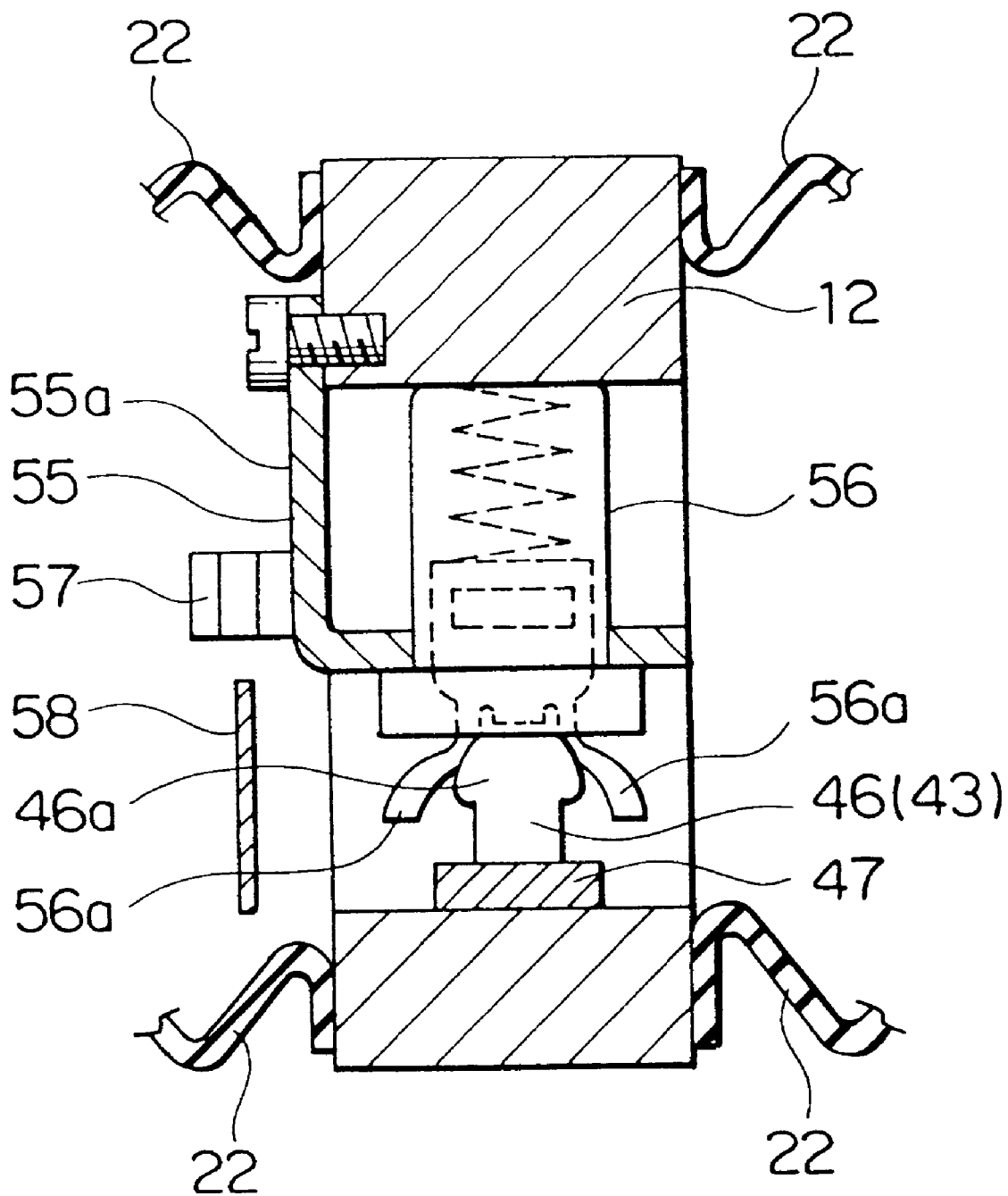
FIG. 8 is a cross section along VIII—VIII line in FIG. 6.

As shown in FIG. 6 and FIG. 8, the second part 46 incorporated with the first part 45 through the interconnecting portion 47 extends in parallel with the first part 45 and composes a keeper forming a part of a latch mechanism. A latch portion 46a of the second part 46 is positioned between pawls 56a of a latch body 56 forming a part of the latch mechanism, and the latch body 56 is fixed in the receiving space portion 44 by an L-shape support piece 55 fixed on the base stage 12. Here, the latch mechanism has the well known structure, and this embodiment employs a one-cycle two-action type latch mechanism locked with first push and unlocked with second push. Since the above latch mechanism may employ the well known mechanism, there are no restrictions on the structure and shape thereof.

Now, described referring to FIG. 1 to FIG. 3 and FIG. 6 to FIG. 11 is the operation of the optical switch utilizing the second drive mechanism 40.

Figure 10:
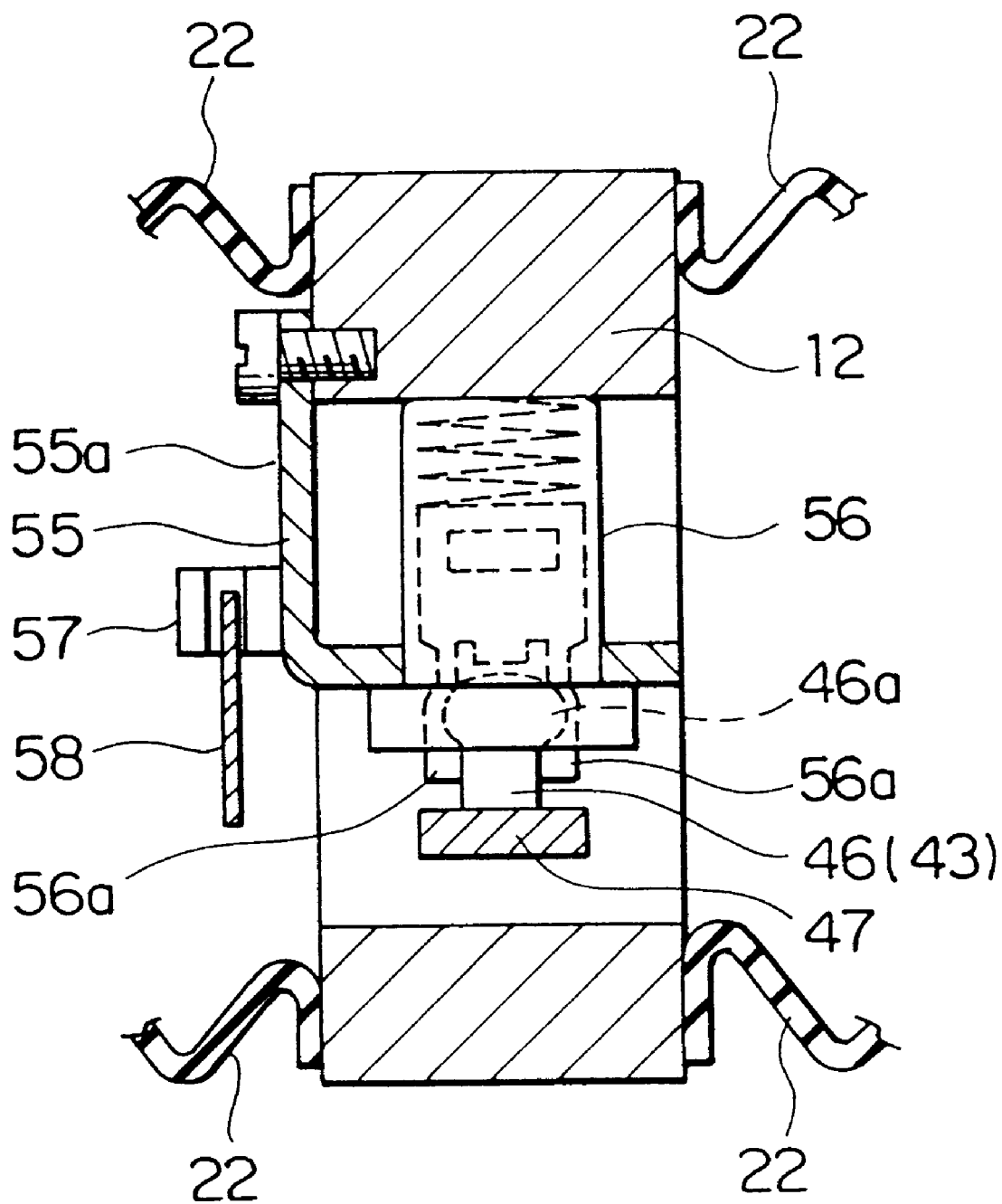
FIG. 10 is a cross section along X—X line in FIG. 7.
Figure 11:
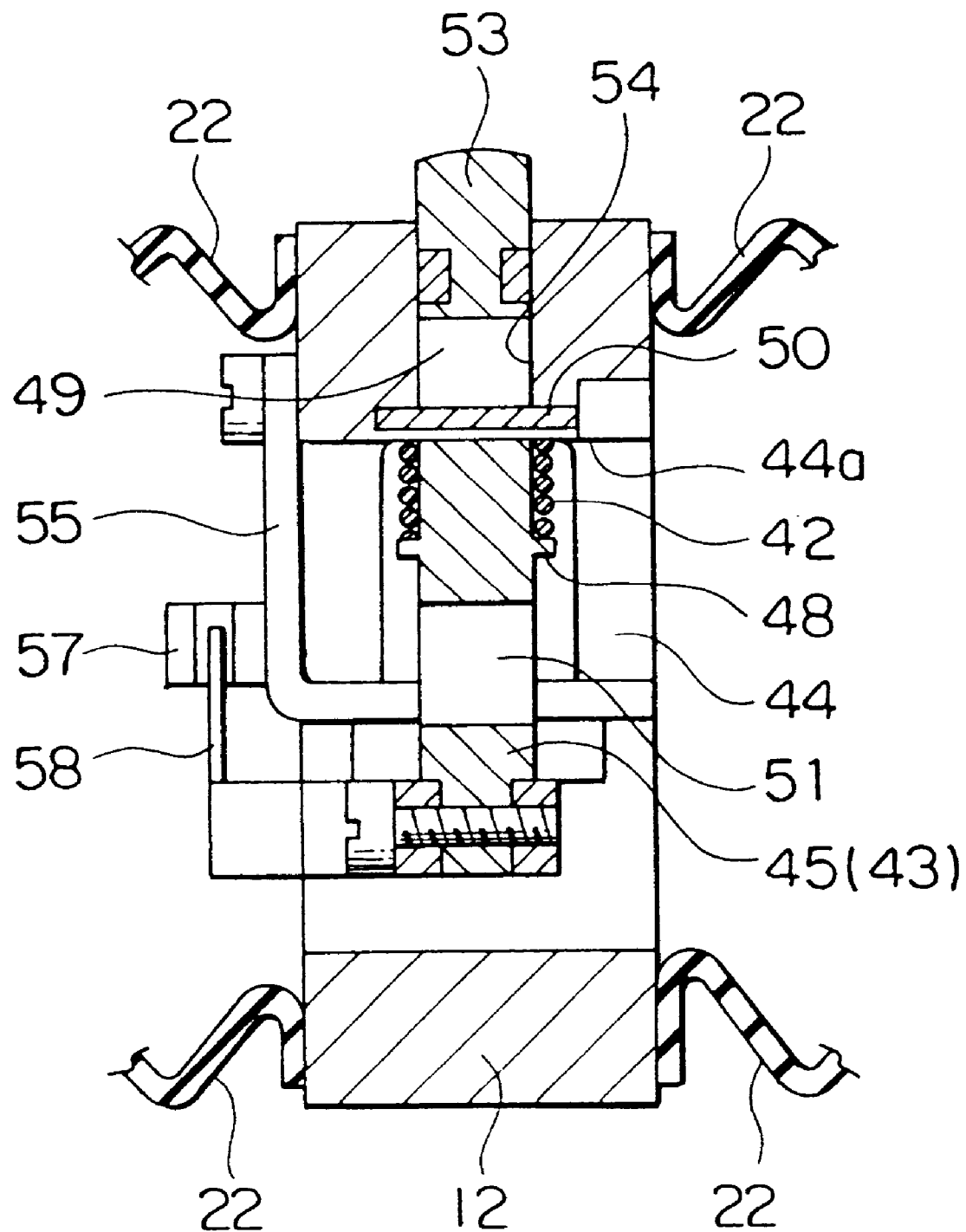
FIG. 11 is a cross section along XI—XI line in FIG. 7.

For removing the tip ends 9a of the second optical fibers 9 from the fiber introducing grooves 6, the motor 28 is driven to rotate the cam shaft 24 by a predetermined amount. As a result, as shown in FIG. 7 and FIG. 11, the actuator piece 52 and a stop surface 51a of the cut-out 51 engage with each other to push up the actuator head 53 of the first part 45 against the elastic force of the spring 42. On this occasion, the second part 46 is also pushed up as shown in FIG. 10, and the latch portion 46a comes into latch engagement with the pawls 56a of the latch body 56, thereby stopping the movable element 43 at the position.

After that, reversing the cam shaft 24, the engagement between the cut-out 51 and the actuator piece 52 is released, but the latch engagement of the second part 46 is kept unreleased, whereby the movable element 43 maintains the state of FIG. 7 while the cam shaft 24 does the state of FIG. 6. As a result, there exists no friction between the actuator piece 52 and the movable element 43, which achieves smooth movement of the base stage 12 in the X directions.

After that, for optically coupling the second optical fibers 9 with first optical fibers 2 arbitrarily selected, the motor 21 is driven for a predetermined time to rotate the external thread shaft 16 by a predetermined amount, thereby feeding the base stage 12 by an arbitrary amount in the X direction. Then the motor 21 is stopped to stop the base stage 12 at the position.

Then the motor 28 is driven to rotate the cam shaft 24 by a predetermined amount, thereby making the actuator piece 52 engage with the stop portion 51a, as shown in FIG. 7, and further pushing up the stop surface 51a by the actuator piece 52. This results in releasing the latch engagement between the latch portion 46a and the latch body 56. Then reversing the cam shaft 24 as shown in FIG. 6, the engagement between the actuator piece 52 and the stop surface 51a is released as shown in FIG. 8, and the movable element 43 is lowered by the elastic force of the spring 42, as shown in FIG. 9. On this occasion, the descent of the actuator head 53 releases the resilient force of the first movable arm 14 to push down the free end of the second movable arm 7 by the pressing portion 14a. This results in introducing the tip ends 9a of the second optical fibers 9 into the fiber introducing grooves 6, thereby achieving optical coupling between the second optical fibers 9 and the first optical fibers 2 arbitrarily selected.

Here, a photosensor 57 for detecting a Y-directional position of the movable element 43 is fixed on the side face 55a of the support piece 55, and a switch bar 58 is fixed on the movable element 43. Thus, the position of the movable element 43 can be detected by cooperative action of the photosensor 57 and switch bar 58. Further, because the photosensor 57 and switch bar 58 both are placed in the sealing cover 22, the arrangement can avoid a malfunction due to scattering of the antireflection agent 11.

Figure 12:
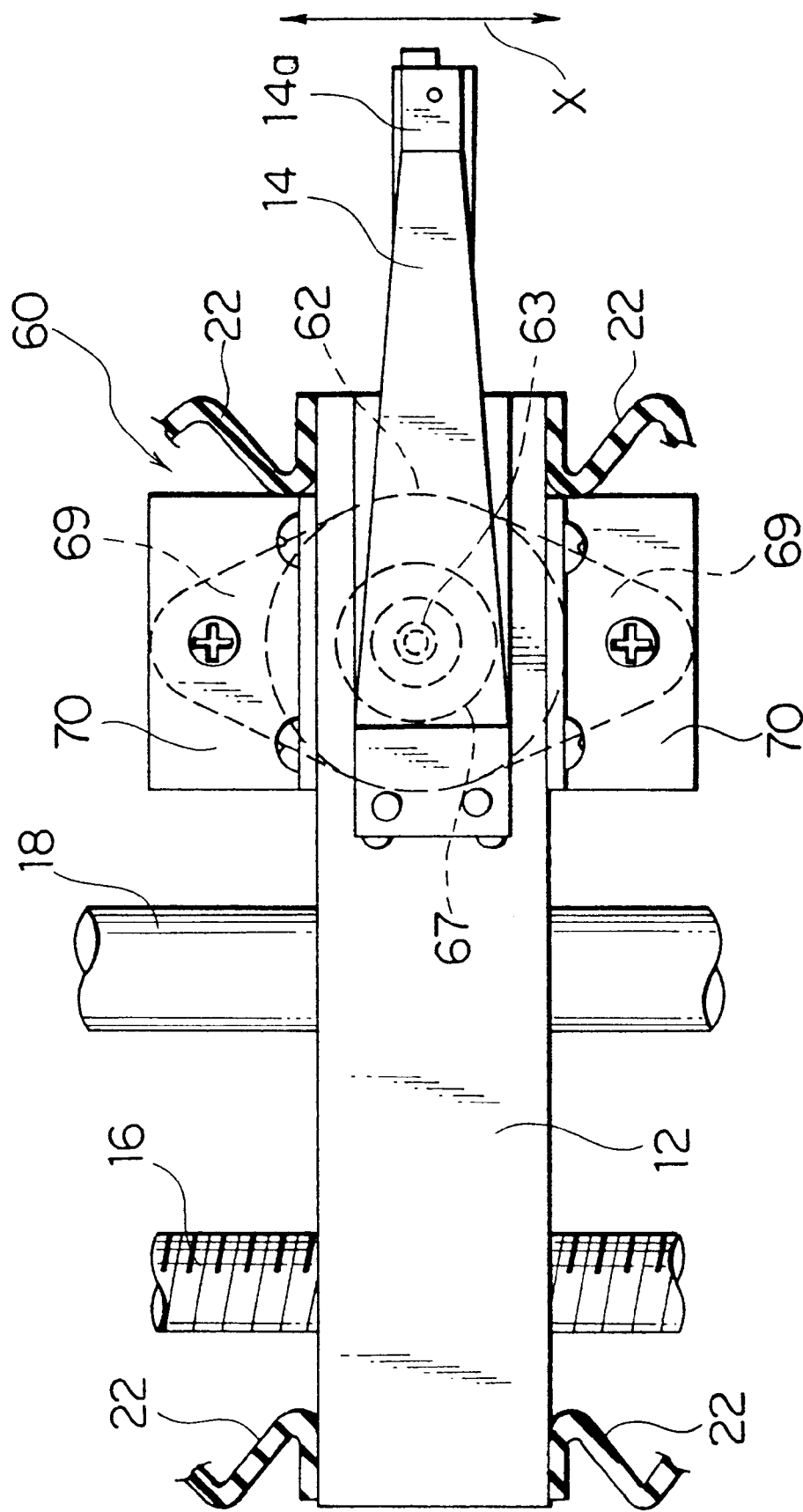
FIG. 12 is a plan view to show a third embodiment of the second drive mechanism.
Figure 13:
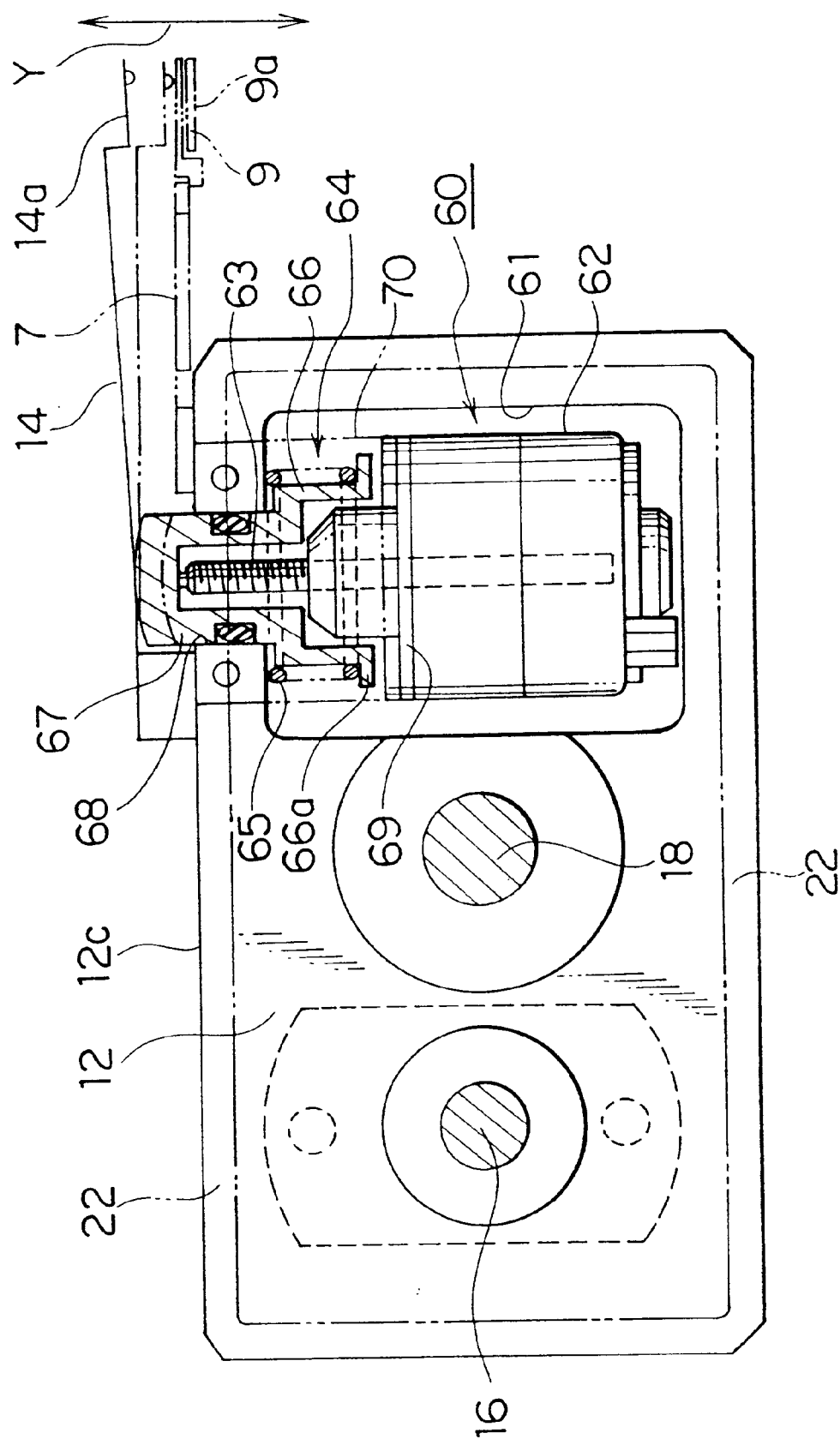
FIG. 13 is a side view of FIG. 12.

A third embodiment of the second drive mechanism 60 is next described referring to FIG. 12 and FIG. 13. Same or like constituent portions as those in the above embodiments will be denoted by the same reference numerals, and description thereof will be omitted.

The second drive mechanism 60 for driving the second optical fibers 9 in the Y directions is composed mainly of a motor body 62 encased in a receiving space portion 61 of the base stage 12, a spiral spindle 63 arranged to project out from the motor body 62 or go into the motor body 62, and an optical fiber access mechanism 64 moving back and forth in the Y directions by cooperative action with the spiral spindle 63.

The optical fiber access mechanism 64 is provided with a cuplike movable element 66 energized by a compression spring 65 and letting the spiral spindle 63 be inserted thereinto. The movable element 66 is always urged against the spiral spindle 63 by the spring 65 disposed between a wall surface of the receiving space portion 61 and a flange portion 66a of the movable element 66. An actuator head 67 is formed in the uppermost portion of the movable element 66, and the actuator head 53 is inserted into a through hole 68 piercing from the receiving space portion 61 to the top surface 12c of the base stage 12 and is disposed at a position where it is in contact with the back face of the first movable arm 14. Thus, the first movable arm 14 being resilient can be driven to follow movement of the actuator head 67. For fixing the motor body 62 in the receiving space portion 61, mounting work can be facilitated by fastening an L-shape support piece 70 fixed on the base stage 12 to a flange portion 69 formed on a side face of the motor body 62 with screws or the like, which is preferred.

The arrangement that the motor body 62 is fixed as incorporated with the base stage 12, as described above, can simplify the structure and can reduce the cost, and in addition, the movement of the movable element 66 can be directly controlled by the spiral spindle 63 projecting from the motor body 62, which enables fine adjustment with accuracy.

Now, the operation of the optical switch utilizing the second drive mechanism 60 is explained referring to FIG. 1 to FIG. 3, FIG. 12, and FIG. 13.

For removing the tip ends 9a of the second optical fibers 9 from the fiber introducing grooves 6, the motor body 62 is driven to project the spiral spindle 63 by a predetermined amount. As a result, as shown in FIG. 13, the spiral spindle 63 pushes up the actuator head 67 of the movable element 66 against the elastic force of the spring 65, and further pushes the first movable arm 14 as well.

After that, for optically coupling the second optical fibers 9 with first optical fibers 2 arbitrarily selected, the motor 21 is driven for a predetermined time, whereby the external thread shaft 16 is rotated by a predetermined amount to feed the base stage 12 by an arbitrary amount in the X directions. After that, the motor 21 is stopped to stop the base stage 12 at the position.

Then the motor body 62 is driven to reverse the spiral spindle 63, whereby the spiral spindle 63 is retracted into the motor body 62. As a result, the actuator head 67 of the movable element 66 is lowered to the position represented by the chain double-dashed line. On that occasion, the resilient force of the first movable arm 14 is released to push down the free end of the second movable arm 7 by the pressing portion 14a. Thus, the tip ends 9a of the second optical fibers 9 are inserted into the fiber introducing grooves 6, thereby achieving optical coupling of the second optical fibers 9 with the first optical fibers 2 arbitrarily selected.

A fourth embodiment of the second drive mechanism 80 is next explained referring to FIG. 14 to FIG. 21. Same or like constituent portions as those in the above embodiments will be denoted by the same reference numerals, and description thereof will be omitted.

Figure 15:
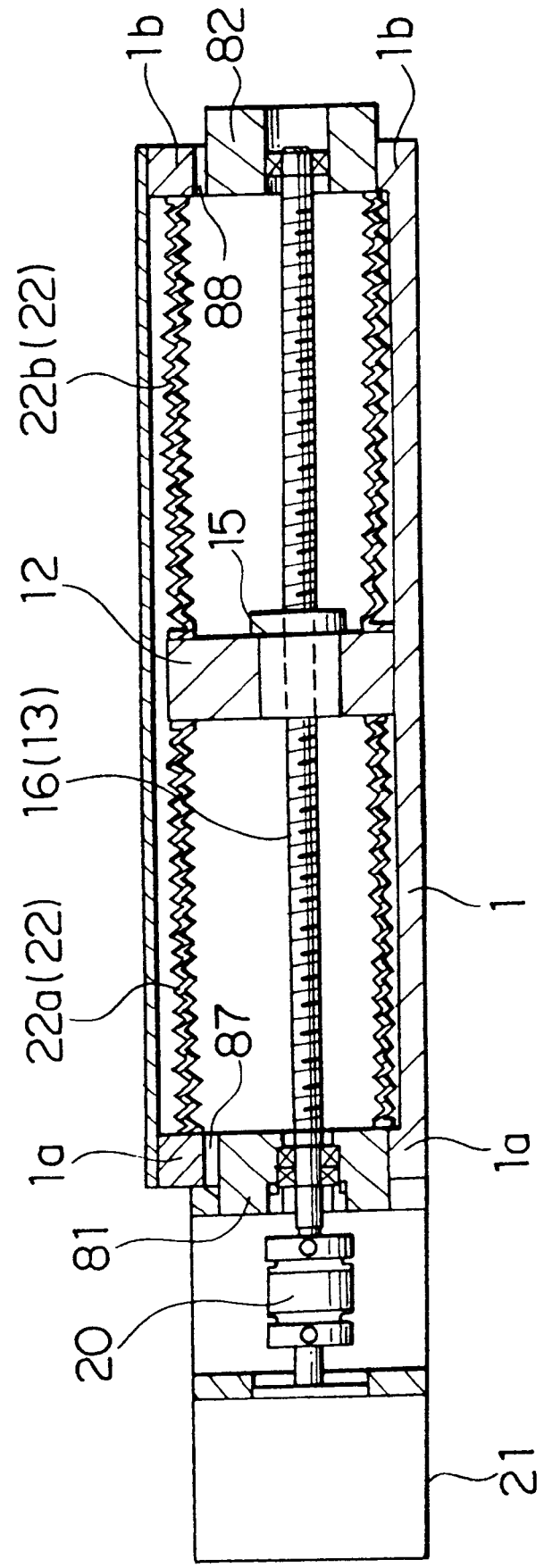
FIG. 15 is a cross section along XV—XV line in FIG. 14.
Figure 16:
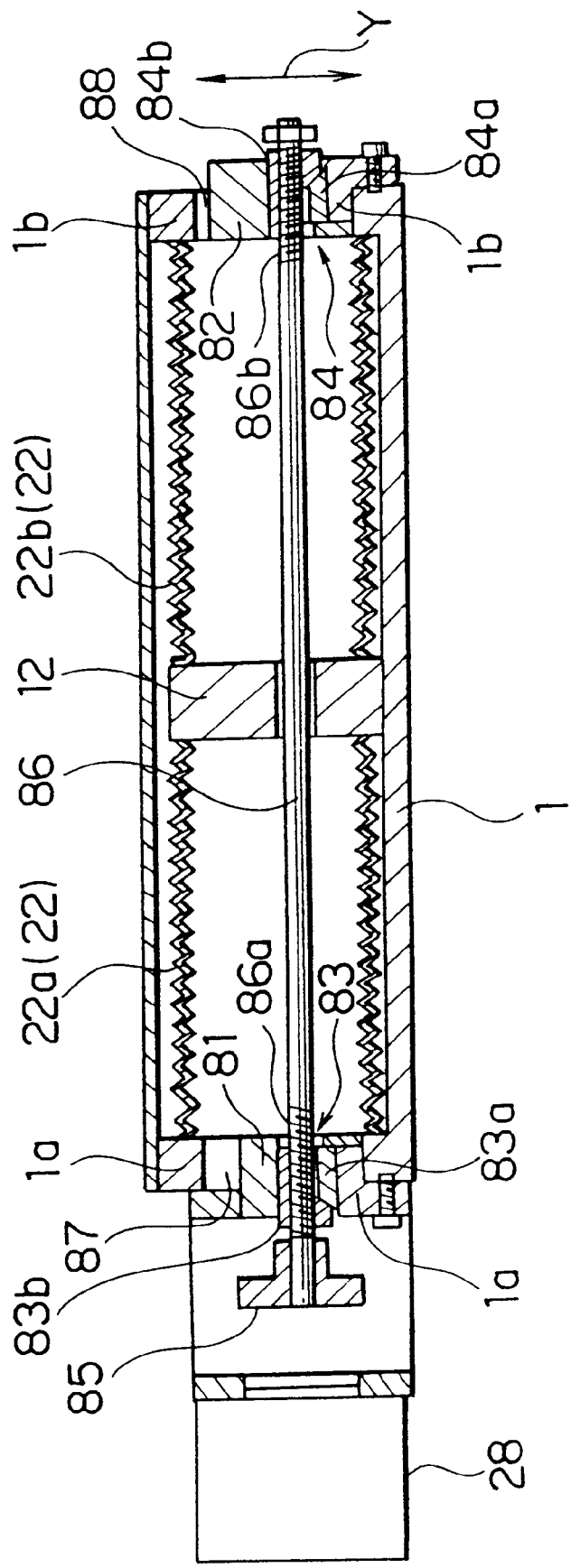
FIG. 16 is a cross section along XVI—XVI line in FIG. 14.

The second drive mechanism 80 is composed mainly of first and second support members 81, 82 supporting the both ends of the slide guide portion 13 as described previously and engaging with the both sides 1a, 1b of the sealing case 1, as shown in FIG. 15, wedge mechanisms 83, 84 interposed between the side 1a and the first support member 81 and between the side 1b and the second support member 82 and moving the first and second support members 81, 82 back and forth in the Y directions, wedge moving means 85 for actuating the wedge mechanisms 83, 84, and a connecting shaft 86 for interconnecting the wedge mechanism 83 with 84 and extending in the Y directions as piercing the base stage 12, as shown in FIG. 16.

The slide guide portion 13 is composed of the external thread shaft 16 extending in the X directions and meshed with the internal thread portion 15 provided in the base stage 12, and the guide shaft 18 extending in parallel with the external thread shaft 16 and piercing the thrust bearing 17 provided in the base stage 12, as described previously, and the external thread shaft 16 is rotatably fixed to the first and second support members 81, 82 while the guide shaft 18 is secured to the first and second support members 81, 82.

Figure 14:
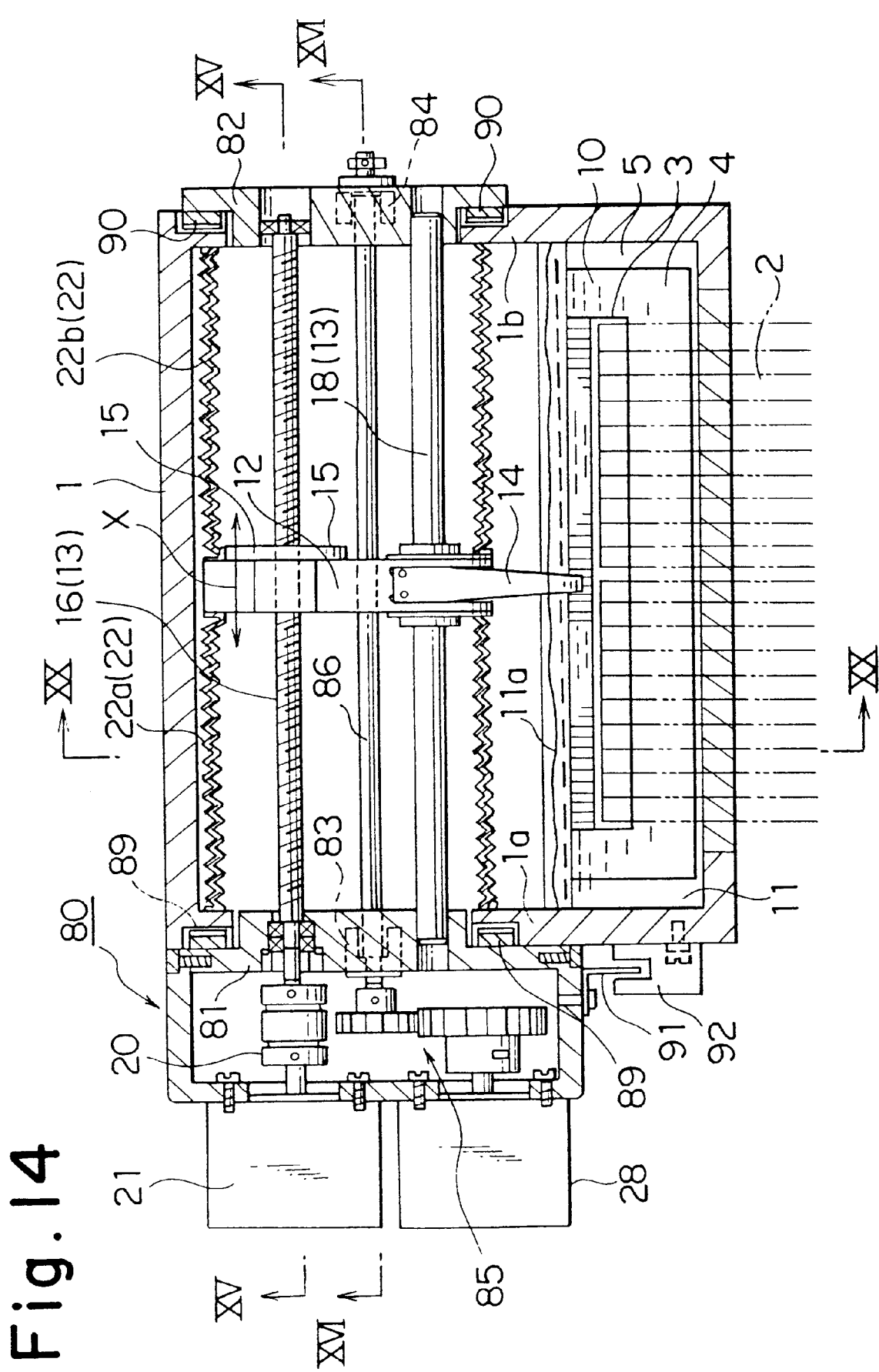
FIG. 14 is a cross section to show another embodiment of the optical switch of the present invention including a fourth embodiment of the second drive mechanism.
Figure 20:
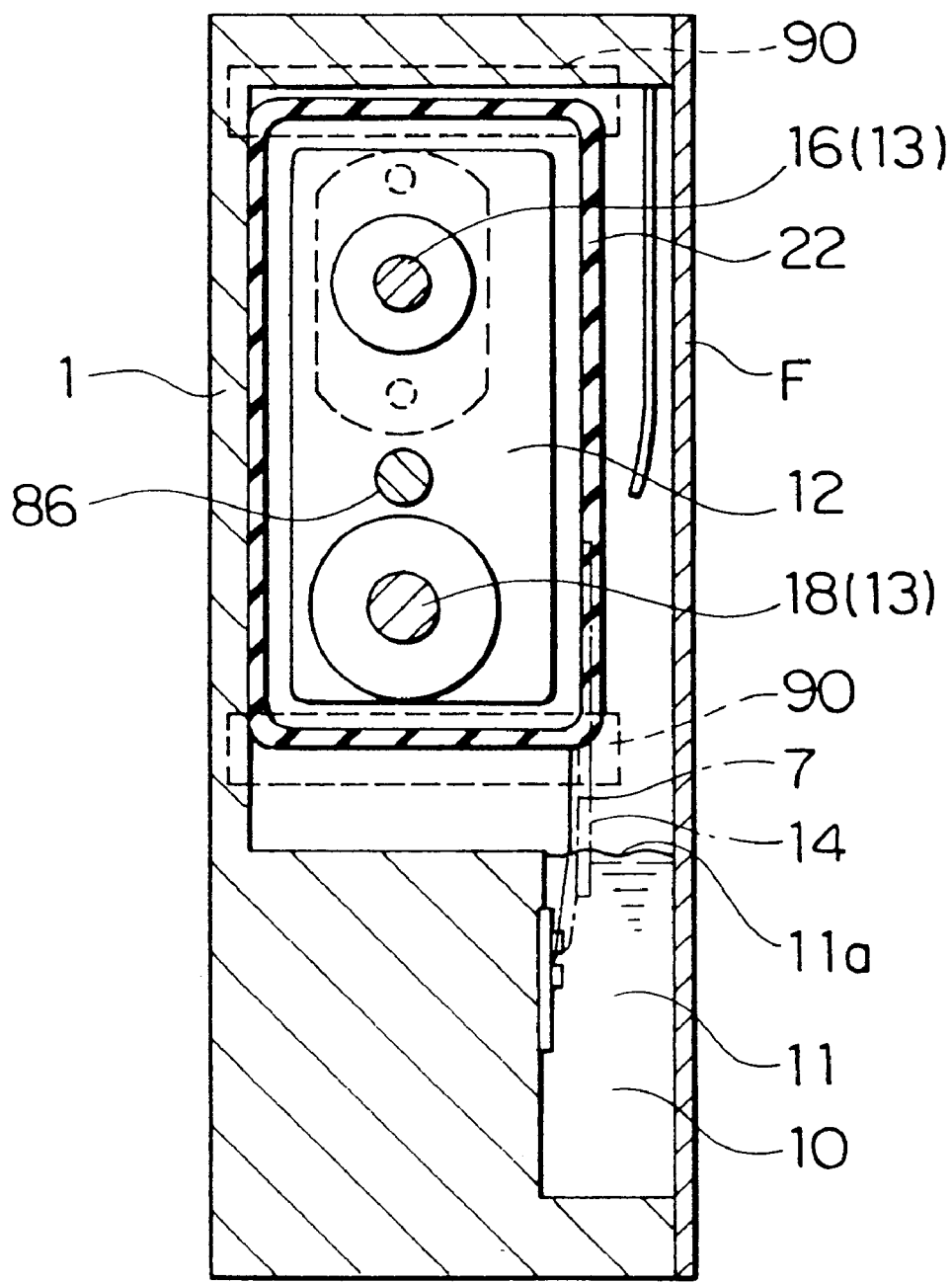
FIG. 20 is a cross section along XX—XX line in FIG. 14.

The first and second support members 81, 82 are set in slide space portions 87, 88 formed in the both sides 1a, 1b of the sealing case 1, as shown in FIG. 15 and FIG. 16, and are arranged as movable in the Y directions. Further, as shown in FIG. 14 and FIG. 20, linear guides 89, 90 extending in the Y directions are fixed to the first and second support members 81, 82, and interposition of these linear guides 89, 90 permits the first and second support members 81, 82 to slide smoothly relative to the sealing case 1 in the Y directions. The second support member 81 is formed in a box shape to encase the coupling 20 and wedge moving means 85, whereby wear powder produced by the wedge moving means 85 can be confined in the second support member 81.

Figure 17:
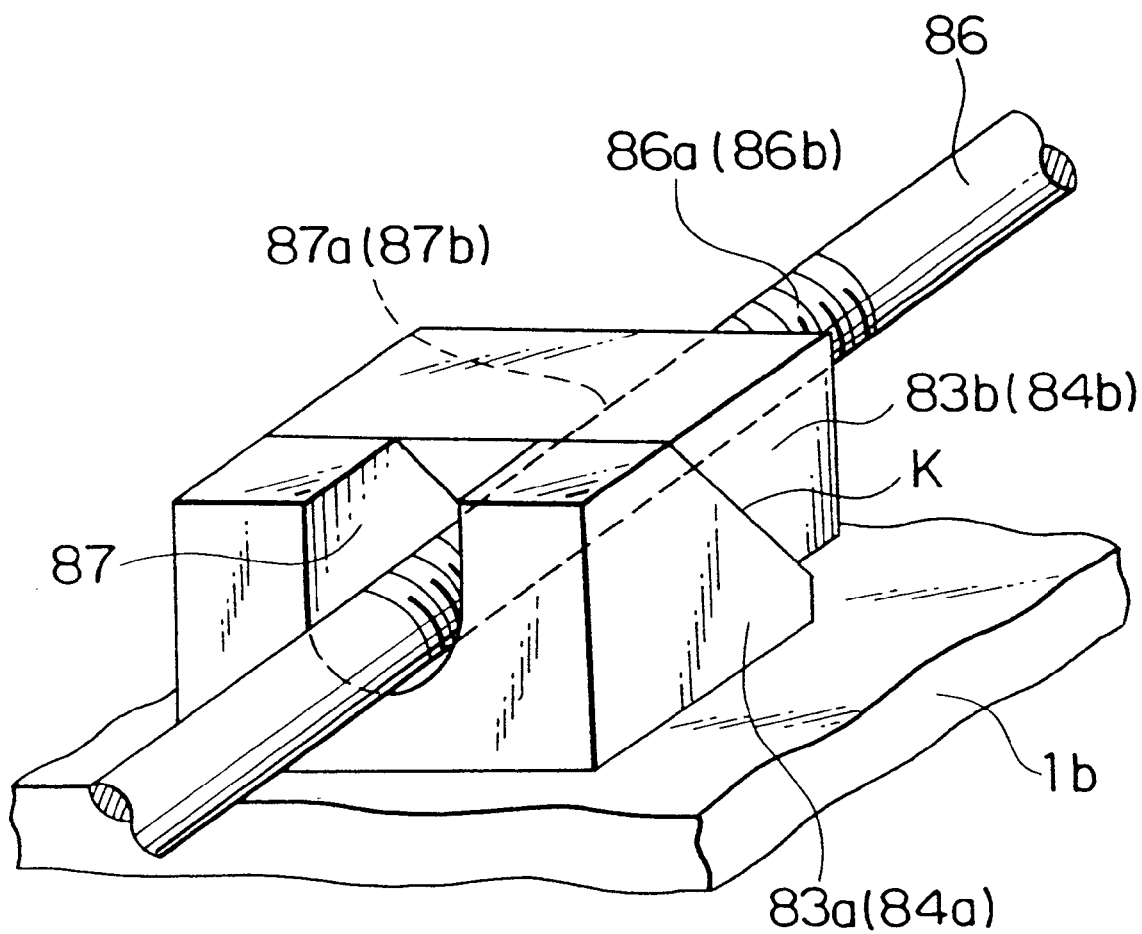
FIG. 17 is a perspective view to show a wedge mechanism composing the major part of FIG. 14.
Figure 18:
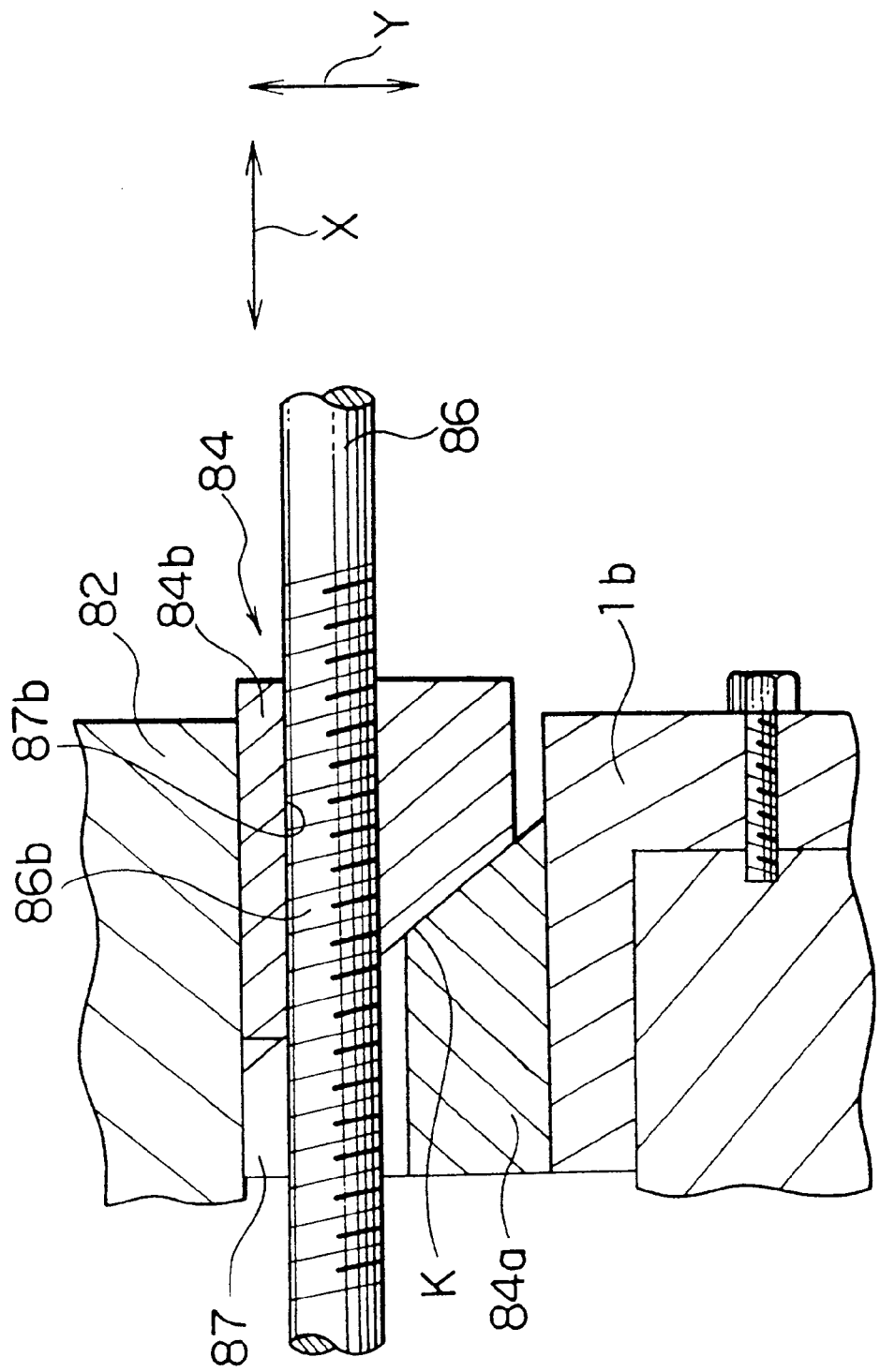
FIG. 18 is a cross section to show the wedge mechanism upon optical coupling.
Figure 19:
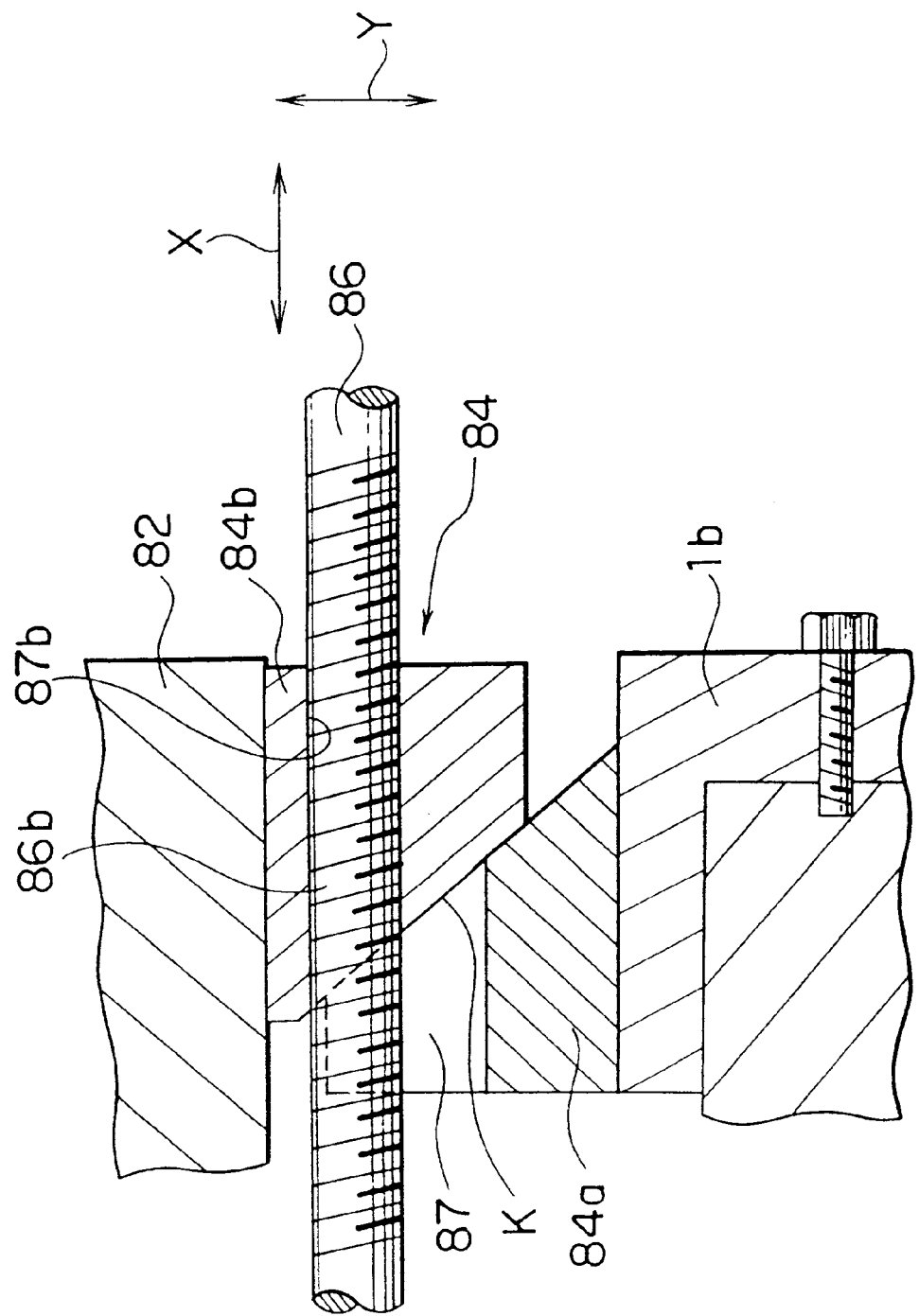
FIG. 19 is a cross section to show the wedge mechanism upon release of optical coupling.

As shown in FIG. 16, the wedge mechanism 83, 84 is composed of a first wedge body 83a, 84a of a trapezoid cross section fixed to the side 1a, 1b, and a second wedge body 83b, 84b of a trapezoid cross section mounted on the first wedge body 83a, 84a through wedge surface K making a predetermined angle, and the wedge mechanisms 83 and 84 are in a mirror-image relation with respect to a plane perpendicular to the axis of the connecting shaft 86. Further, the second wedge bodies 83b, 84b are in contact with the first and second support members 81, 82 and are mounted thereto so as to be slidable in the X directions. As shown in FIG. 17 to FIG. 19, a cut-out 87 for the connecting shaft 86 to be set therethrough is formed in the center of the first wedge body 83a, 84a, and an internal thread portion 87a, 87b meshed with an external thread portion 86a, 86b formed on either end of the connecting shaft 86 is formed in the center of the second wedge body 83b, 84b.

Here, the external thread portions 86a and 86b are threaded in mutually opposite directions as observed in the axial direction. It is also the case for the internal thread portions 87a, 87b. Therefore, when the connecting shaft 86 is rotated in an arbitrary direction, the second wedge bodies 83b, 84b can be moved up and down in the same direction relative to the first wedge bodies 83a, 84a through cooperative action of the external thread portions 86a, 86b and internal thread portions 87a, 87b.

Figure 21:
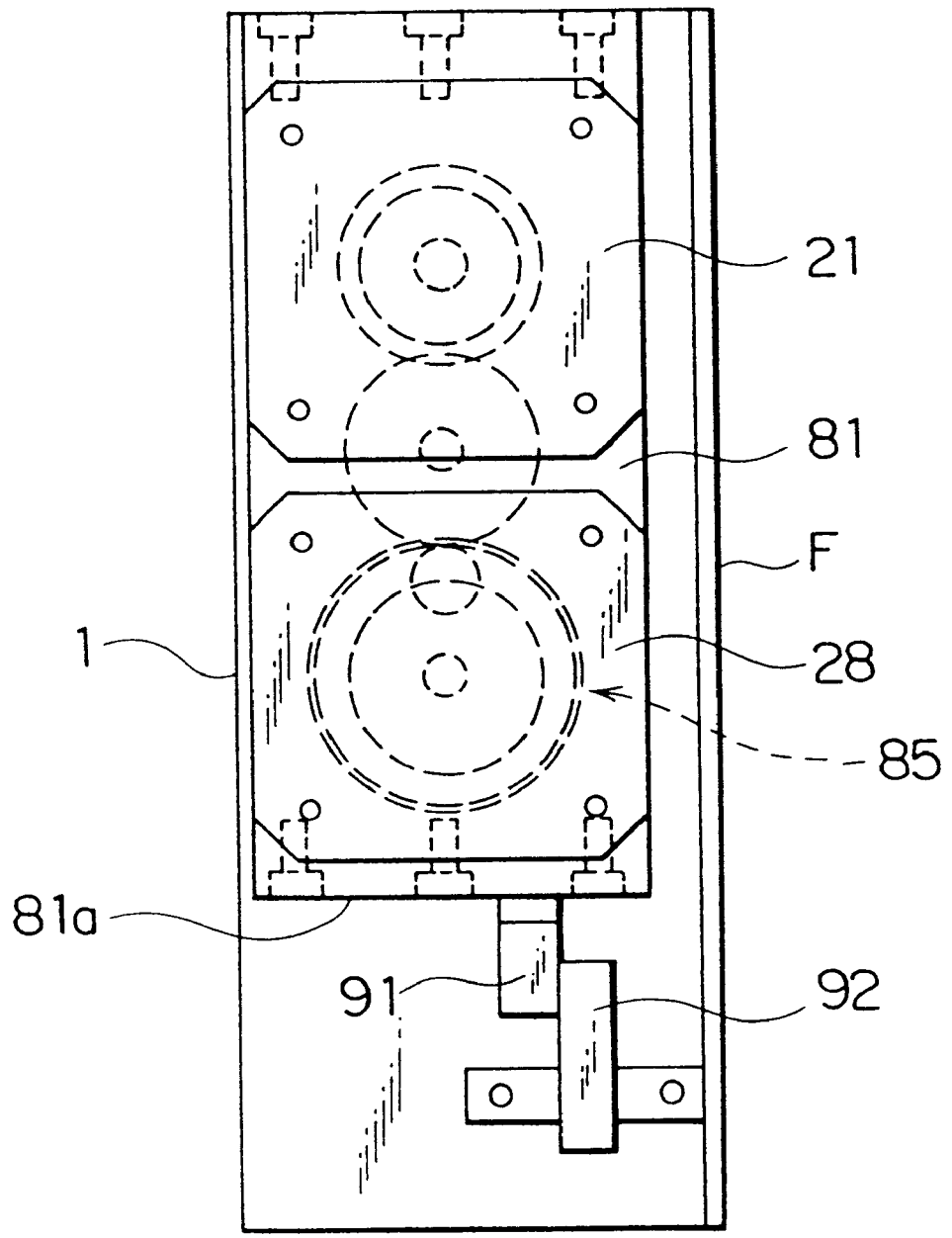
FIG. 21 is a side view of FIG. 14.

As shown in FIG. 14, the connecting shaft 86 is driven by the wedge moving means 85 encased in the second support member 81 of the box shape, for example by a gear mechanism, and the wedge moving means 85 is driven by the motor 28 fixed to the outer surface of the second support member 81. As shown in FIG. 21, a photosensor 91 for detecting Y-directional positions of the first and second support members 81, 82 is fixed to the side face 81a of the second support member 81, and a switch bar 92 is fixed on the sealing case 1. Therefore, the Y-directional positions of the first and second support members 81, 82 can be detected relative to the sealing case 1 through cooperative action of the photosensor 91 and switch bar 92. A preferred structure of detecting means for detecting the X-directional position of the base stage 12 is the one shown in FIG. 1.

The slide guide portion 13 and connecting shaft 86 as described above are surrounded by the sealing cover 22, and this sealing cover 22 is composed of the first sealing cover 22a of bellows extending between one side surface 12a of the base stage 12 and the side 1a facing it, and the second sealing cover 22a of bellows extending between the other side face 12b of the base stage 12 and the side 1b facing it. Thus, utilizing the sealing cover 22, the slide guide portion 13 and connecting shaft 86 can be isolated in the sealing case 1, so that wear powder produced by movable contact between these members and the base stage 12 can be confined in the sealing cover 22. Further, the second movable arm 7 is always energized by the elastic force of the first movable arm 14, which ensures the optical coupling between the first optical fibers 2 and the second optical fibers 9.

Now, the operation of the optical switch utilizing the second drive mechanism 80 is explained referring to FIG. 2, FIG. 3, and FIG. 14 to FIG. 21.

For removing the tip ends 9a of the second optical fibers 9 from the fiber introducing grooves 6, the motor 28 is driven to rotate the external thread portions 86a, 86b of the connecting shaft 86 through the wedge moving means 85 by a predetermined amount. As a result, as shown in FIG. 19, the second wedge bodies 83b, 84b ascend in the Y direction relative to the first wedge bodies 83a, 84a, thereby raising the first and second support members 81, 82 relative to the sealing case 1. On this occasion, the slide guide portion 13 also ascends and the base stage 12 also ascends following it, which raises the second movable arm 7 fixed to the base stage 12 as well, thereby taking the tip ends 9a of the second optical fibers 9 out of the fiber introducing grooves 6. After that, for optically coupling the second optical fibers 9 with first optical fibers 2 arbitrarily selected, the motor 21 is driven for a predetermined time to rotate the external thread shaft 16 by a predetermined amount, thereby feeding the base stage 12 by an arbitrary amount in the X direction. After that, the motor 21 is stopped to stop the base stage 12 at the position.

Then the motor 28 is reversed to rotate the connecting shaft 86 by a predetermined amount in the opposite direction, thereby lowering the second wedge bodies 83b, 84b relative to the first wedge bodies 83a, 84a in the Y direction, as shown in FIG. 18, to lower the first and second support members 81, 82 relative to the sealing case 1. On this occasion, the slide guide portion 13 also descends, and the base stage 12 and second movable arm 7 also descend following it. Since the second movable arm 7 is energized by the first movable arm 14, the tip ends 9a of the second optical fibers 9 are surely inserted into the fiber introducing grooves 6, thereby achieving optical coupling of the second optical fibers 9 with first optical fibers 2 arbitrarily selected.

In the fourth embodiment, for convenience' sake, the terms, ascend or descend, are used, but they correspond to advance or recede in the horizontal directions when the optical switch is used in an upright posture.

The present invention is by no means limited to the above-discussed embodiments, and, for example, the sealing cover 22 may be constructed not in the bellows form, but in a rubber body which is likely to be elastically deformed.

Next stated are effects in the first embodiment of the optical switch as discussed above.

Namely, the oil sump recess 10 encasing the tip ends 2a of the first optical fibers 2 and the tip ends 9a of the second optical fibers 9 is formed in the lower part of the sealing case 1, so that a charge amount of the antireflection agent can be a necessary minimum, which does not increase the weight of the apparatus itself, which can decrease the charging time of the antireflection agent, and which can decrease the production cost. Since wear powder produced by friction between the slide guide portion 13 and the base stage 12 can be confined in the sealing case 1 by the arrangement that the slide guide portion 13 is surrounded by the sealing cover 22, the wear powder can be prevented from mixing in the oil sum recess 10 and from affecting optical coupling between fibers. Further, because the external thread shaft 16 extends in the arrangement direction of the first fibers 2, the second optical fibers 9 can be fed at stable accuracy in the arrangement direction of the first optical fibers 2.

The second embodiment of the optical switch of the present invention is explained in the following.

Figure 22:
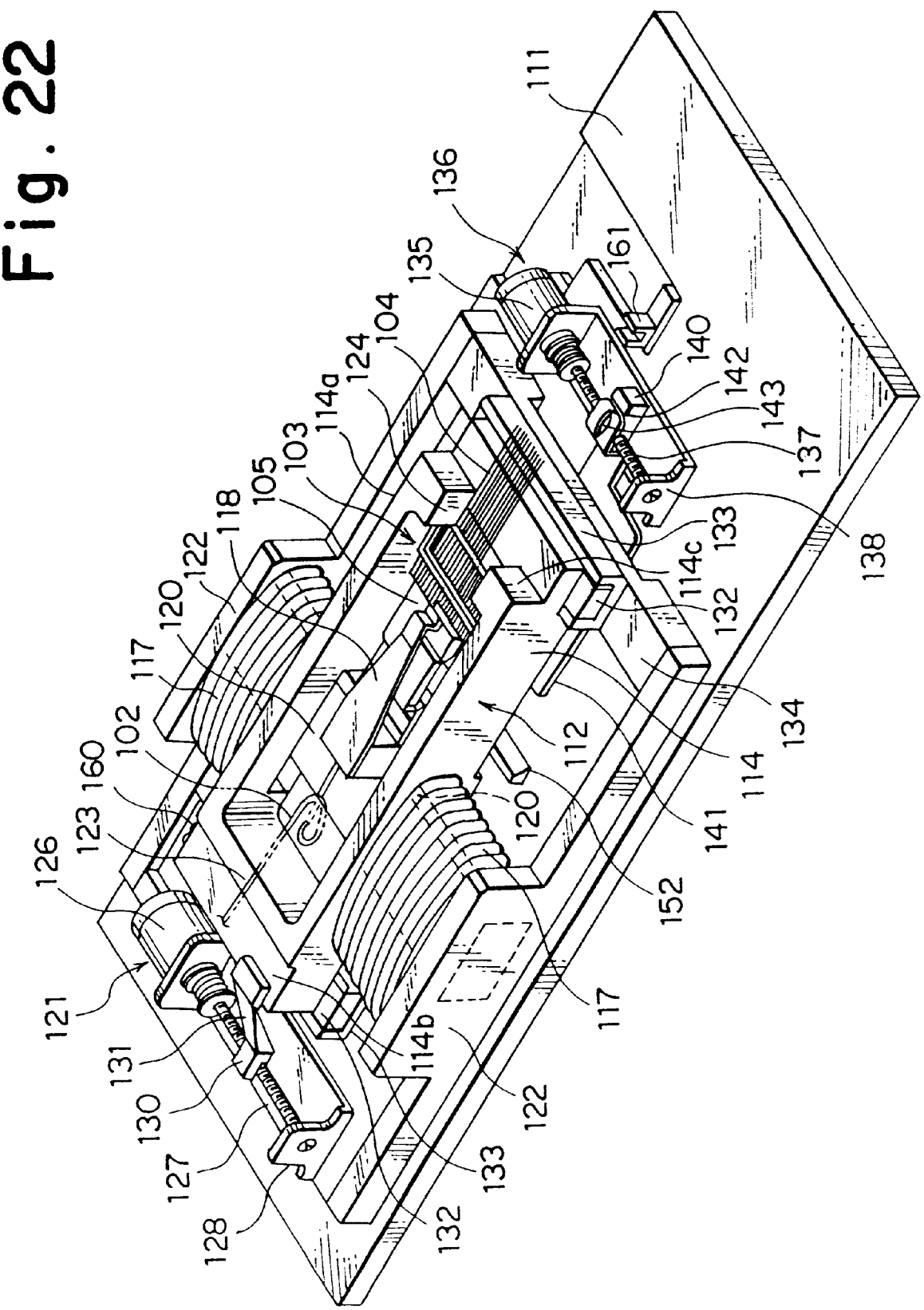
FIG. 22 is a perspective view to show a second embodiment of the optical switch.
Figure 23:
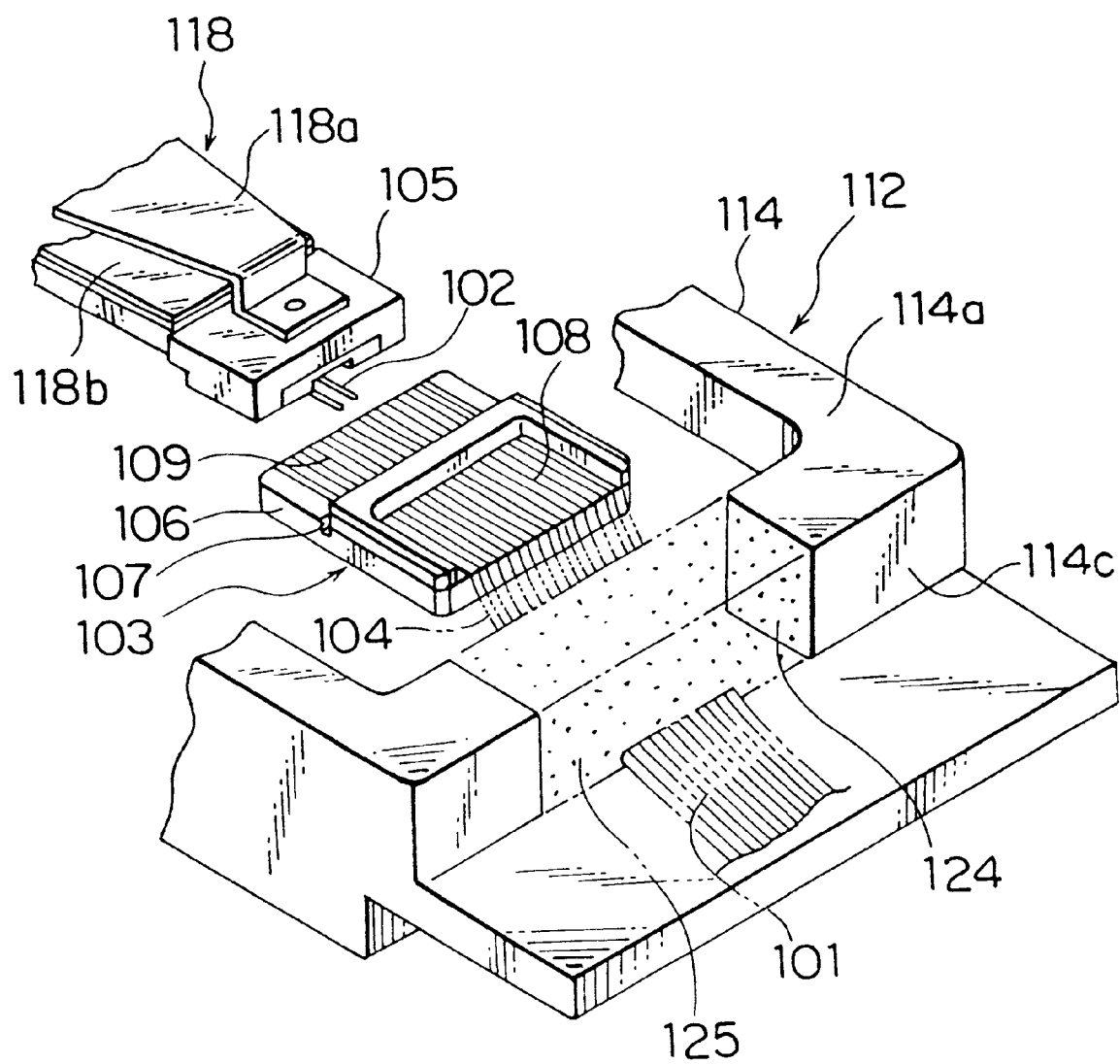
FIG. 23 is a partial perspective view to show an enlarged structure of the optical coupling portion between second optical fibers and first optical fibers.

In FIG. 22, a sealing case 112 is supported so as to be movable on a base 111. FIG. 22 shows a state of the sealing case 112 from which a cap is removed. Within the sealing case 112 there are encased two paths of second optical fibers (master-side optical fibers) 102, and first optical fibers (n-side optical fibers) 104 to be optically coupled with the second optical fibers 102.

The sealing case 112 is composed, as shown in each drawing, of a bottom wall 113, a surrounding wall 114 standing up from the edges of the bottom wall 113, a cap 115 mounted in liquid sealing on the top edge faces of the surrounding wall 114, and two bellows covers 117 disposed in hermetic seal outside first openings formed in both side walls 114a of the surrounding wall 114.

Describing in more detail, the second optical fibers 102 are mounted on a movable head 105 in the sealing case 112, and the movable head 105 is attached to a tip of a movable arm 118. The movable arm 118 is composed of plate springs 118a, 118b in two up and down steps arranged in parallel, and base ends thereof are mounted on a support plate 120.

This movable arm 118 can be vertically bent through the two up and down plate springs 118a, 118b, and the movable head 105 holding the second optical fibers 102 is lifted up when the movable arm 118 is lifted up by a second drive mechanism 136 as described later.

Figure 25:
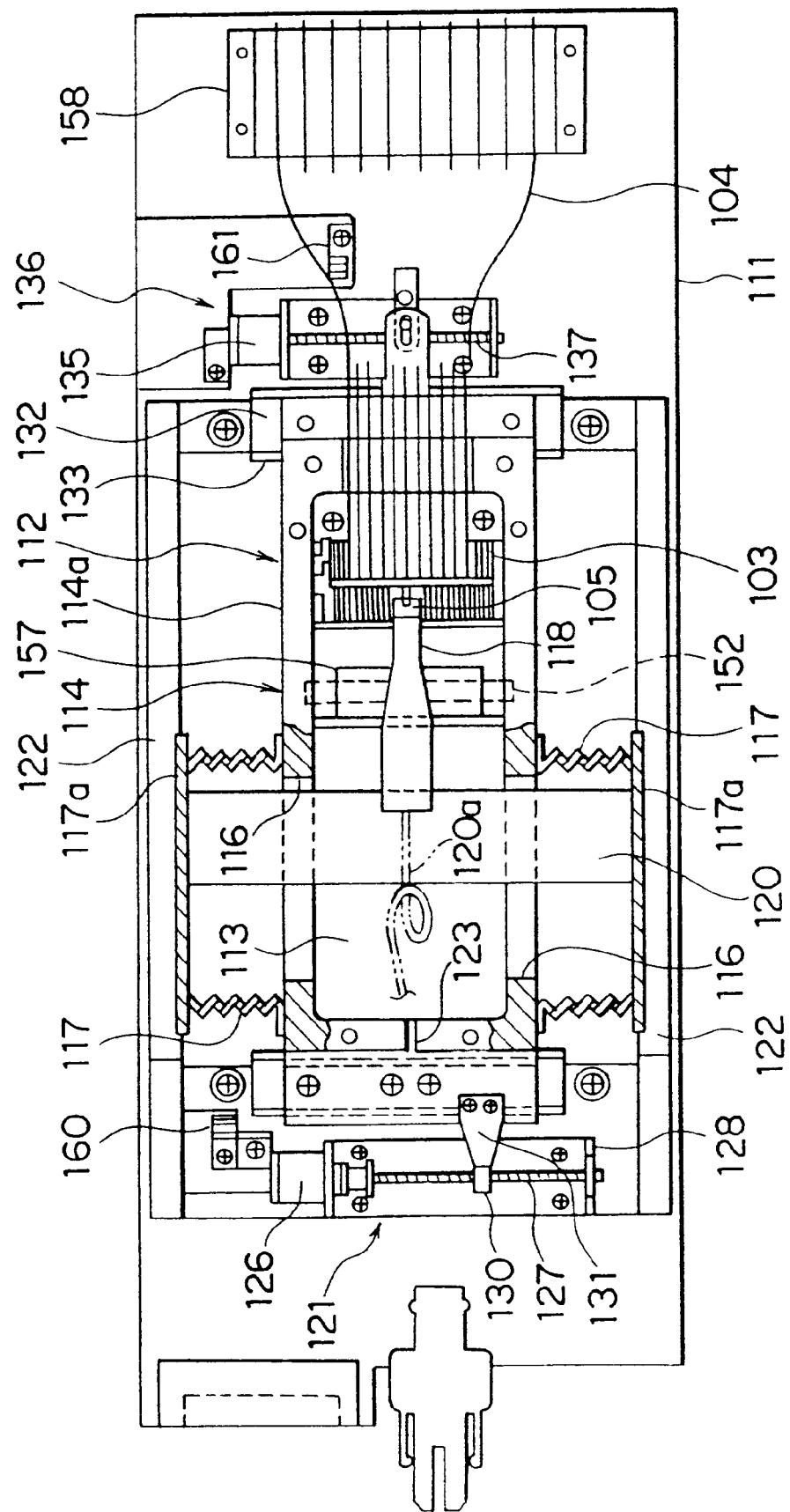
FIG. 25 is a plan view, partly in transverse cross section, to show a sealing case of FIG. 24 from which a cover is taken away.

The support plate 120 is enclosed in the sealing case 112 and pierces the first openings 116 on the both sides of the surrounding wall 114 into the left and right bellows covers 117, and both ends thereof are secured together with end walls 117a of the bellows covers 117 to upright plates 122 standing up from the base 111 (FIG. 25).

Also, a recess 123 is formed on the top end face of rear wall 114b of the surrounding wall 114, and the second optical fibers 102 are drawn out backward through the recess 123. The recess 123 is closed by a cover 115, whereby the second optical fibers 102 are guided in liquid sealing out of the sealing case 112 (FIG. 22).

A cut-out 124 is formed in a front wall end 114c of the surrounding wall 114. A multipath optical fiber tape 101 is guided to an optical fiber arranging member 103 disposed in the sealing case 112, through the cut-out 124. This cut-out 124 is filled in liquid sealing with a filling 125 of an elastic body recessed only in the passage of the multipath optical fiber tape 101, whereby the cut-out 124 is hermetically sealed.

The sealing case 112 can be horizontally moved in the arrangement direction of optical fibers on the base 111 by a first drive mechanism 121 with a motor 126 as a drive source. The motor 126 is set on the base 111, and a screw shaft 127 connected to a motor shaft is horizontally arranged on the base 111 through a bearing plate 128. A nut member 130 is in mesh with the screw shaft 127, and an arm 131 integral with the nut member 130 is connected to the rear top surface of the sealing case 112.

Guide blocks 132 are provided on front-end and rear-end bottom surfaces of the surrounding wall 114 (lower parts of longitudinal ends of the sealing case 112 in FIG. 22). The guide blocks 132 are slidably fit in guide grooves in U-shape linear guide members 133 fixed to the top surface of the base 111 as openings thereof face up. The linear guide member 133 on the right side in FIG. 22 is mounted through a support stage 134 on the base 111.

Accordingly, when the screw shaft 127 rotates forward or backward with drive of the motor 126, the nut member 130 moves back and forth along the screw shaft 127 to horizontally move the sealing case 112 through the arm 131. This movement is carried out on a stable basis as keeping a predetermined posture because the guide blocks 132 move in the guide grooves of the linear guide members 133.

When the sealing case 112 horizontally moves, the bellows cover 117 on the front side of movement contracts while the bellows cover 117 on the opposite side expands. Thus, the left and right bellow covers 117, 117 alternately expand or contract when the sealing case 112 is translated.

Since the optical fiber arranging member 103 supporting the first optical fibers 4 is unitarily disposed in the sealing case 112 as described above, the optical fiber arranging member 103 moves unitarily with the sealing case 112 with horizontal movement of the sealing case 112. In contrast to it, because the second optical fibers 102 are fixed to the support plate 120 through the movable head 105 and movable arm 118 so as not to move unitarily with the sealing case 112, the second optical fibers 102 relatively move in the arrangement direction of the first optical fibers 104 with horizontal movement of the sealing case 112, thereby switching optical coupling.

Figure 30:
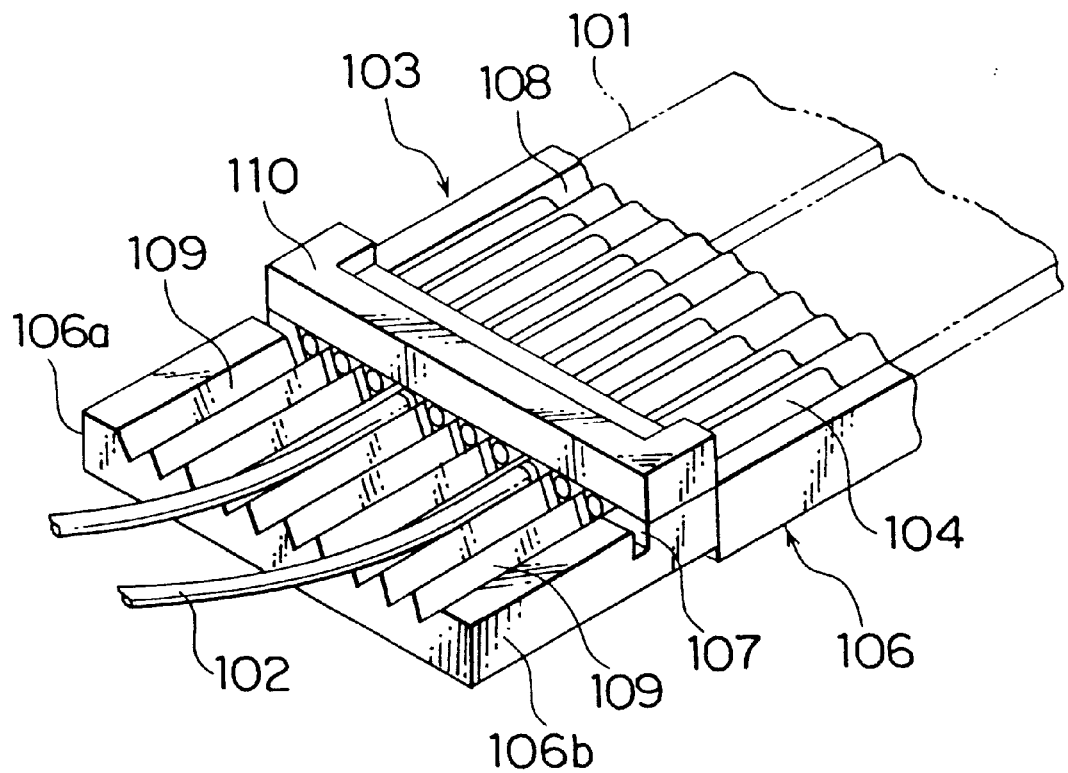
FIG. 30 is a perspective view of the optical fiber arranging member.
Figure 31:
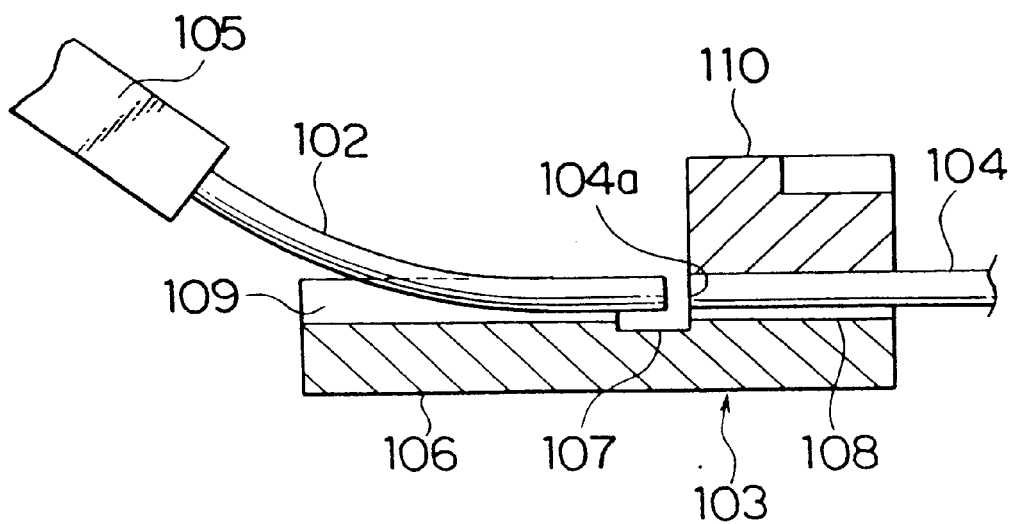
FIG. 31 is a cross section of FIG. 30.

Here, the structure of the optical fiber arranging member 103 is explained referring to FIG. 30 and FIG. 31.

The optical fiber arranging member 103 is composed of a slit 107 formed on the top surface of a base plate 106, fiber fixing grooves 108 and fiber introducing grooves 109 extending on the both sides of the slit 107 in a direction perpendicular to the longitudinal direction of the slit 107, first optical fibers 104 fit in the fiber fixing grooves 108, and a cover plate 110 for securing the first optical fibers 104 as pushing into the fiber fixing grooves 108.

The base plate 106 is rectangular as seen from the top of FIG. 30, and the slit 107 extends from one side surface 106a to the other side surface 106b of the base plate 106. A cross section of the slit 107 is approximately U-shaped. On the other hand, there are a multiplicity of (for example 80, some of which are illustrated) fiber fixing grooves 108 and fiber introducing grooves 109 juxtaposed at constant pitch intervals (for example, 0.25 mm) from one side face (reference end face) 106a of the top surface.

The fiber fixing grooves 108 and the fiber introducing grooves 109 are V grooves in the embodiment, and are arranged so that longitudinal extension lines of the respective V grooves coincide with each other. The first optical fibers 104 led out from the optical fiber tape 101 are inserted into the fiber fixing grooves 108 from the rear of the grooves, and are arranged so that the fiber tip facets 104a are aligned on a same plane with one vertical wall of the slit 107.

The above first optical fibers 104 are inscribed in bottom side walls of the V grooves and are held in this state with an adhesive. A silicon cover plate 110 is bonded to the top surface of the base plate 106 to protect the first optical fibers 104 fixed to the fiber fixing grooves 108. Since the cover plate 110 is bonded to the base plate 106 as exposing the tip facets 104a of the first optical fibers 104, no trouble will be caused in connection between the first optical fibers 104 and the second optical fibers 102. Since the first optical fibers 104 are fixed in the bottom portions of the V grooves deep enough to embed the optical fibers, the cover plate 110 is bonded to the top surface of the base plate 106 in almost surface contact.

In the above structure, the movable head 105 shown in FIG. 1 is moved by the second drive mechanism 136 in the directions of the depth of the fiber introducing grooves 109 (in the Y directions), and further, the optical fiber arranging member 103 is moved by the first drive mechanism 121 in the fiber arrangement directions (in the X directions) together with the sealing case 112 horizontally moving, whereby the second optical fibers 102 can be removed from the fiber introducing grooves 109 and then can be moved over the crests of the grooves to other fiber introducing grooves 109, thereby switching optical coupling between the second optical fibers 102 and the first optical fibers 104.

Figure 28:
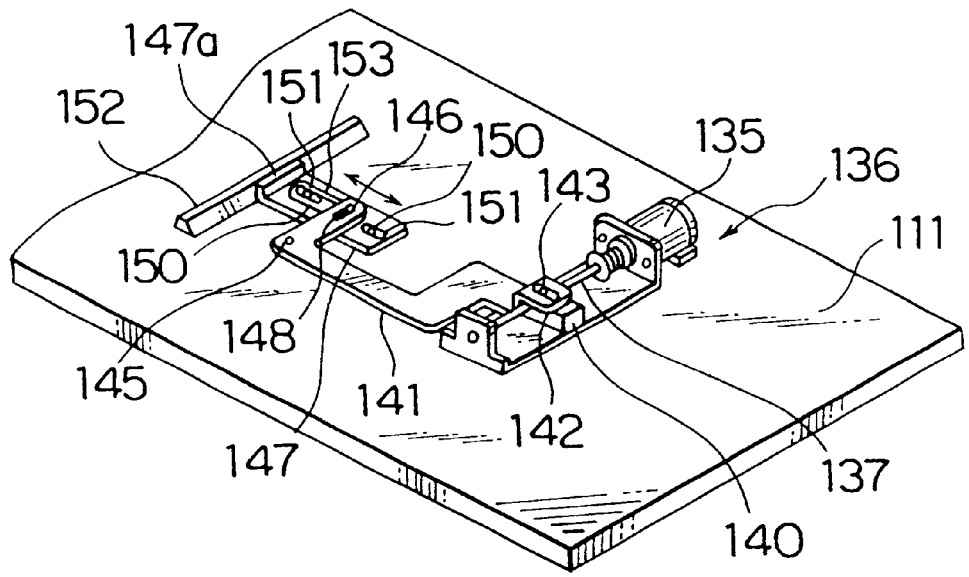
FIG. 28 is a perspective view of the second drive mechanism.
Figure 29:
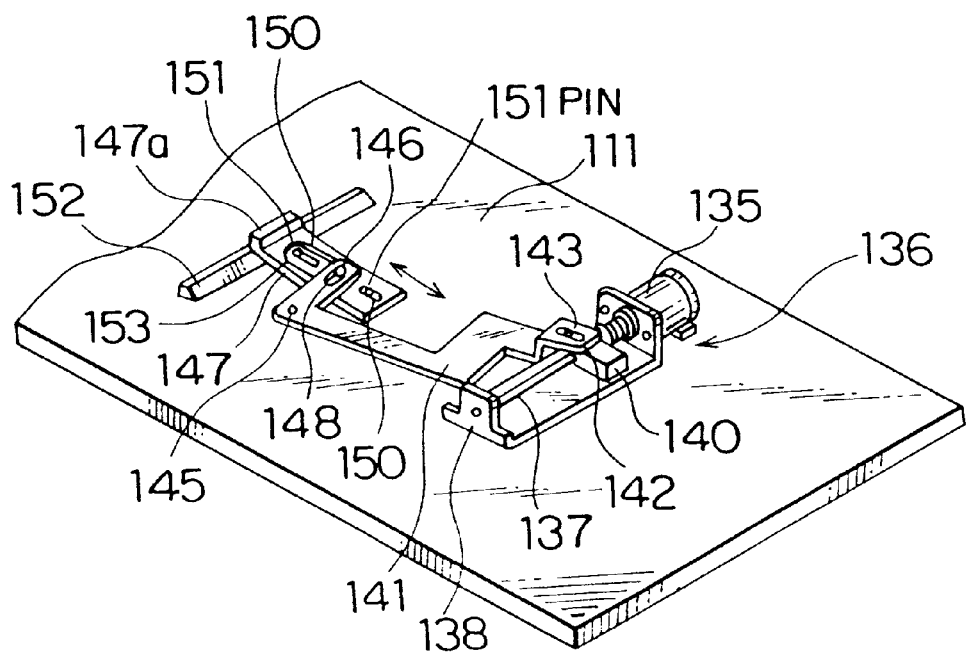
FIG. 29 is a perspective view of the second drive mechanism.

In the present embodiment, the lifting operation of the second optical fibers 102 is performed by the second drive mechanism 136 with the motor 135 as a drive source. This is explained referring to FIG. 22, FIG. 24, and FIG. 25. The motor 135 is installed on the base 111, and a screw shaft 137 connected with a motor shaft is horizontally arranged on the base 111 through a bearing plate 138. A nut member 140 is in mesh with the screw shaft 137, and a pin 143 standing up from the nut member 140 is in engagement with an elongate hole 142 formed in an end portion of a rocking lever 141. The rocking lever 141 is hook-shaped as shown in FIG. 28 and FIG. 29, and a corner thereof is journaled on a vertical shaft 145 vertically planted on the base 111. An elongate hole 148 is formed in an end portion of the rocking lever 141, and the rocking lever 141 is connected to a slide plate 147 through a connecting pin 146 in loose fit with the elongate hole 148.

The slide plate 147 has two elongate guide holes 151, and guide pins 150 standing up from the base 111 are in loose fit with the respective elongate guide holes 151, whereby moving directions of the slide plate 147 are restricted to the directions of the arrow in FIG. 28 and FIG. 29.

Meanwhile, a rod slope guide 152 in a trapezoid cross section is fixed to the top surface of the base 111, and the tip 147a of the slide plate 147 runs over the slope guide 152 to be lifted when the slide plate 147 advances as shown in FIG. 29. Conversely, the tip 147a descends when the slide plate 147 recedes as shown in FIG. 28. Here, the tip 147a is provided with a spring property by a U-shape groove 153 formed in the slide plate 147.

Further, the tip 147a of the slide plate 147 is located in the lower part of the sealing case 112, as shown in FIG. 27. A second opening 156 is formed in the bottom wall 113 of the sealing case 112, and bellows 155 is attached to the second opening 156 so as to hermetically seal the second opening 156. Then a moving block 154 is supported by the bellows 155 as piercing the bellows 155 in liquid sealing. In this manner, the bellows 155 and moving block 154 section the inside from the outside of the sealing case 112 and the moving block 154 can ascend or descend through expansion or contraction of the bellows 155. The top surface of the movable block 154 is in contact with the bottom surface of a receiver 157 mounted in the middle part of the movable arm 118 supporting the second optical fibers 102, and hanging down therefrom.

In the above structure, as the screw shaft 137 rotates forward or backward with drive of the motor 135, the nut member 140 moves back and forth along the screw shaft 137 to move the slide plate 147 forward or backward through the rocking lever 141. Then the slide plate 147 advances to run over the slope guide 152, whereby the tip 147a lifts up the movable block 154 and the movable block 154 in turn lifts up the tip side of the movable arm 118 through the receiver 157 against the spring force of the plate spring.

In summary, when the second optical fibers 102 are optically coupled with the first optical fibers 104, the second optical fibers 102 are urged in the fiber introducing grooves 109 of the V grooves by the downward spring force of the movable arm 118 so as to be held in stable optical coupling with the first optical fibers 104. In contrast to it, upon switching the optical coupling, the movable arm 118 is lifted by the movable block 154 and receiver 157, so that the second optical fibers 102 are held a little higher than the crests of the V grooves of the fiber introducing grooves 109.

In this state the first drive mechanism 121 moves the optical fiber arranging member 103 together with the sealing case 112 in the fiber arrangement direction and thereafter the movable block 154 is lowered, whereby the second optical fibers 102 are introduced into other fiber introducing grooves 109, thus completing switching of optical coupling.

Also, a plurality of sensors 160, 161 are set on the base 111, one sensor 160 detects the operation of the first drive mechanism 21, another sensor 161 detects the operation of the second drive mechanism 136, and signals therefrom are output to a control unit (not shown) to perform automatic control of optical switch.

As described above, the present embodiment is so arranged that the antireflection agent of silicone oil is filled in the sealing case 112, in which only the second optical fibers 102, first optical fibers 104, and the support mechanism thereof are encased, and that the other components are disposed outside the sealing case 112, such as the first drive mechanism 121 including the motor 126 for moving the sealing case 112, the second drive mechanism 136 including the motor 135 for moving the second optical fibers 102 up and down, the sensors 160, 161 for detecting motions thereof, etc.

Figure 24:
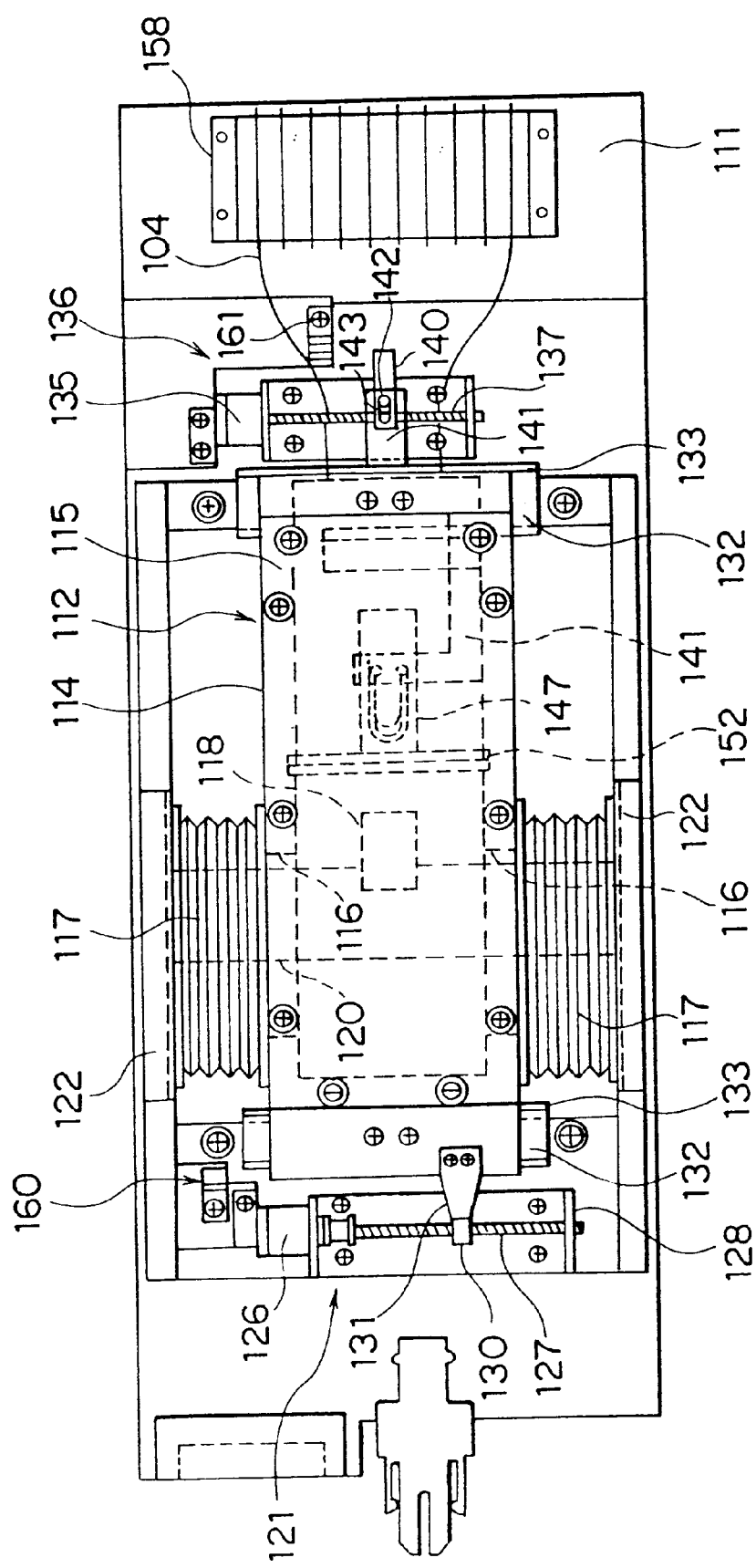
FIG. 24 is a plan view of the optical switch.

Accordingly, the present embodiment can prevent wear powder produced in the moving contact portions of the drive mechanisms from intruding into the sealing case 112, whereby the antireflection effect of the silicone oil can be kept without being affected. Since the sensors 160, 161 are located outside the sealing case 112, the sensor function is not lowered due to the wear powder in the silicone oil. In FIG. 24, reference numeral 158 designates a support stage for the first optical fibers 104.

The above embodiment showed an example in which the second optical fibers 102 moved up and down and the first optical fibers 104 moved in the fiber arrangement directions to effect switching of optical coupling, but the present invention is not to this example. For example, a possible arrangement is such that the second optical fibers 102 move up and down and also move in the fiber arrangement directions, the first optical fibers 104 are fixed, these second optical fibers 102 and first optical fibers 104 are encased in the sealing case 112, and a drive mechanism for driving the second optical fibers 102 is installed outside the sealing case 112 (though not shown).

Next described are effects in the second embodiment of the optical switch as described above.

Particularly, because in the present embodiment the drive mechanisms for moving the sealing case 112 and the optical fibers, the sensors, and so on are disposed outside the sealing case 112, the wear powder etc. produced in the movable contact portions of the drive mechanisms can be prevented from floating in the antireflection agent, thus fully exhibiting the intrinsic property of the antireflection agent, i.e., decreasing optical coupling losses.

A third embodiment of the optical switch of the present invention is next described by reference to the drawings.

Figure 32:
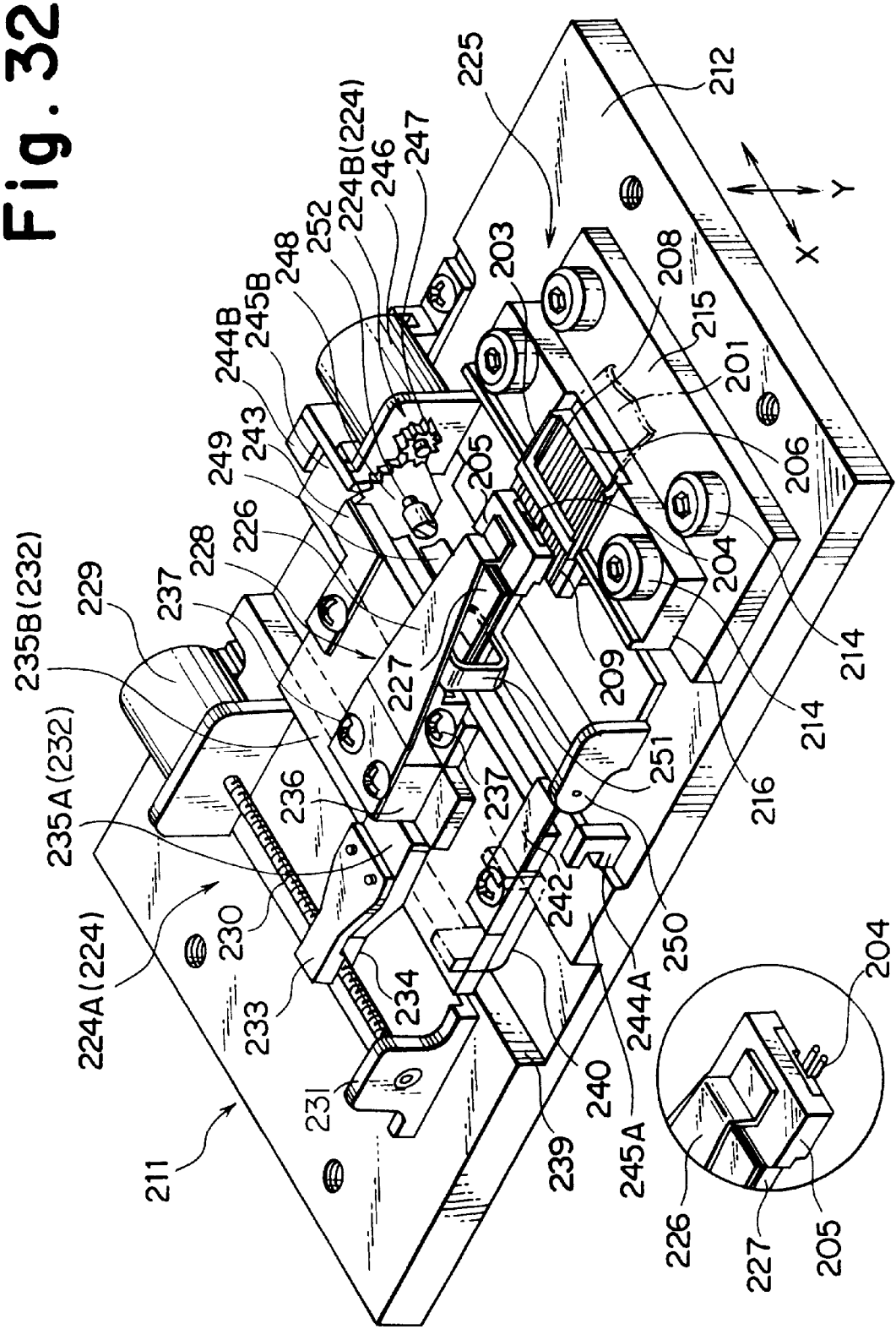
FIG. 32 is an overall perspective view to show a third embodiment of the optical switch of the present invention.

As shown in FIG. 32, an optical switch 211 is provided with an optical fiber arranging member 203 and a drive mechanism 224 for second optical fibers 204 on the master side, on the top surface of base 212.

The optical fiber arranging member 203 is mounted on a first support stage 216. The first support stage 216 is mounted with securing screws 214 to a second support stage 215, and the second support stage 215 is fixed with securing screws 214 on the base 212. The optical fiber arranging member (optical fiber unit) 203 has a base plate 206 having first fiber fixing grooves 208 and second fiber fixing grooves (fiber introducing grooves) 209 on the top surface thereof, and first optical fibers 202 in a multipath optical fiber tape 201 are fixed in the first fiber fixing grooves 208.

The second optical fibers 204 are supported on a movable head 205 driven by a drive mechanism 224 (as detailed later) and are arranged to move in the arrangement directions of the first optical fibers 202 (or the X directions) and in the directions (or the Y directions) perpendicular to the fiber arrangement directions (or the X directions).

Figure 38:
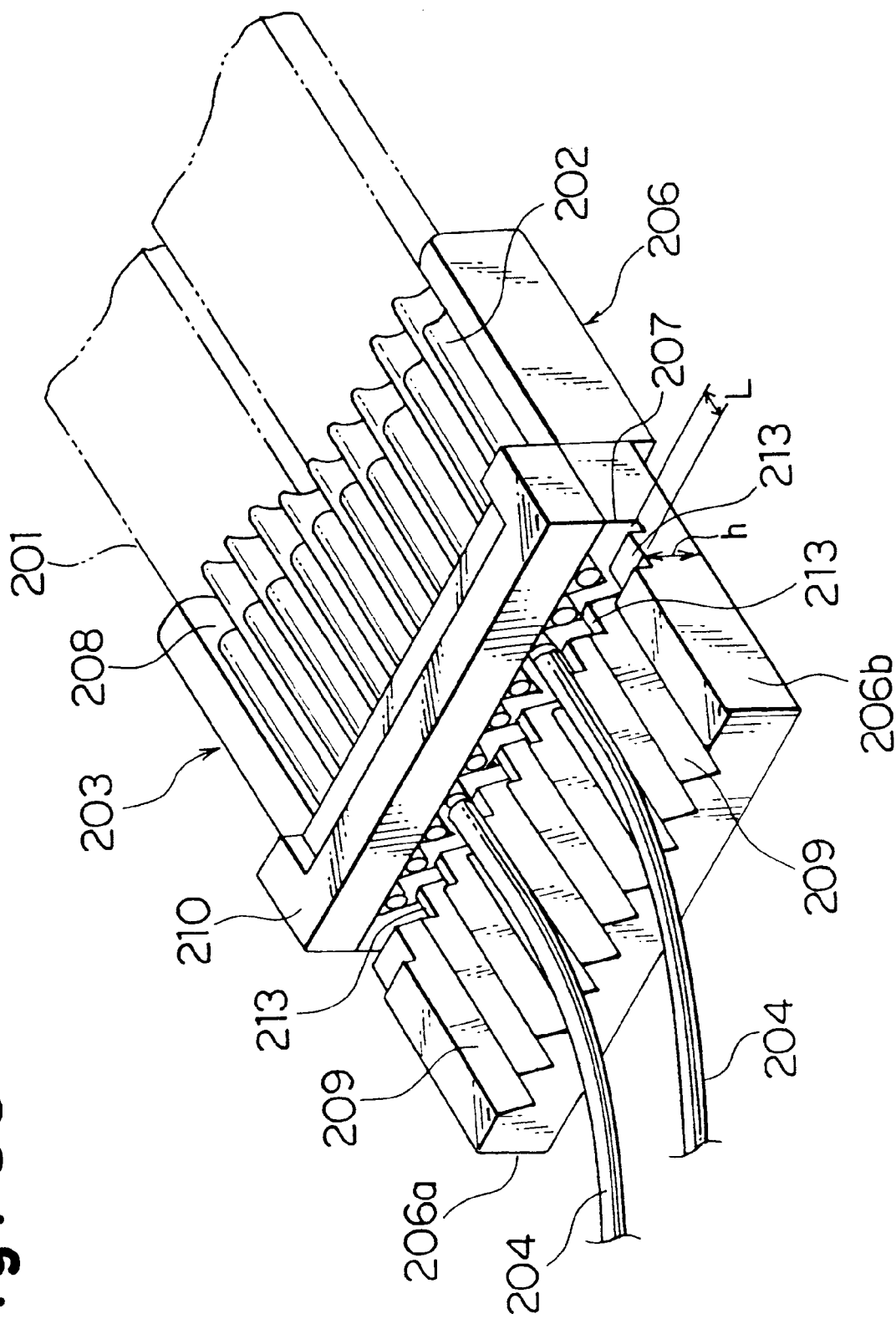
FIG. 38 is a perspective view of an optical fiber arranging member enlarged.
Figure 39:
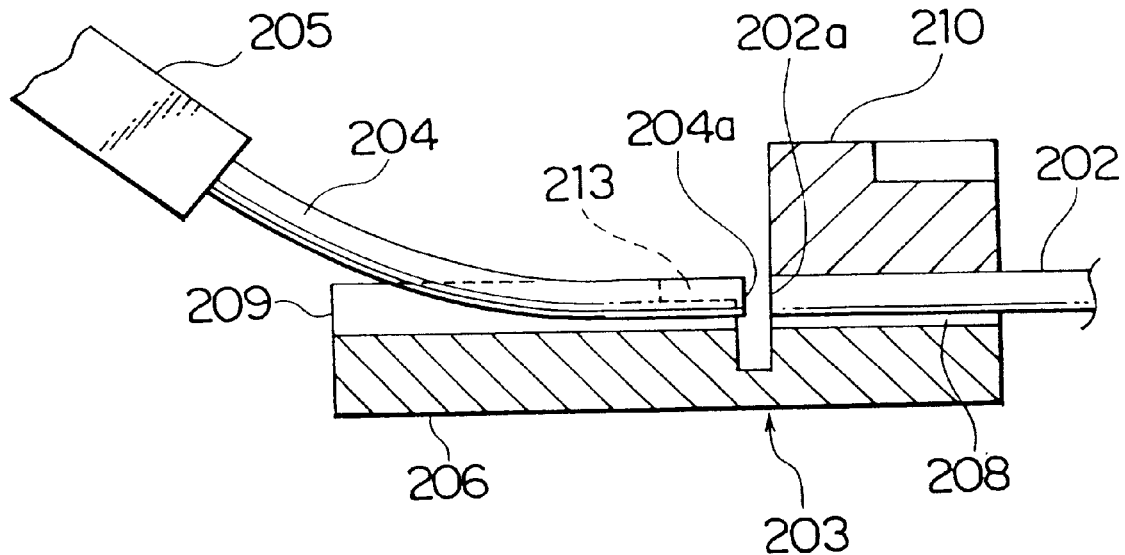
FIG. 39 is a longitudinal cross section of FIG. 38.
Figure 40:
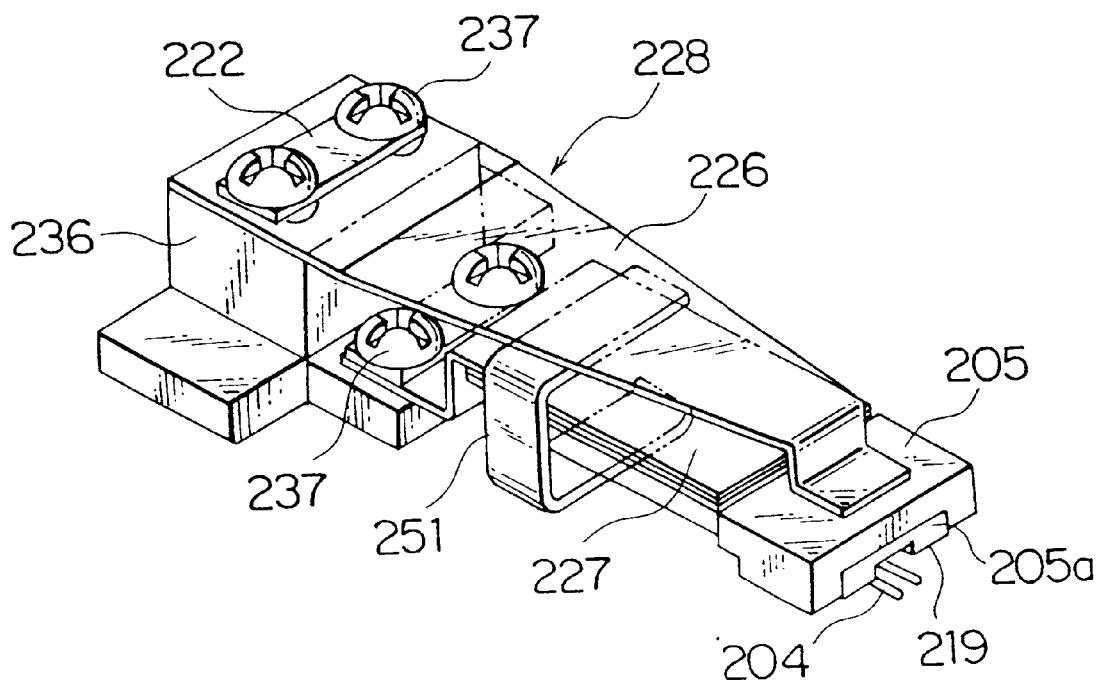
FIG. 40 is a perspective view of a movable arm with a movable head attached thereto.
Figure 41:
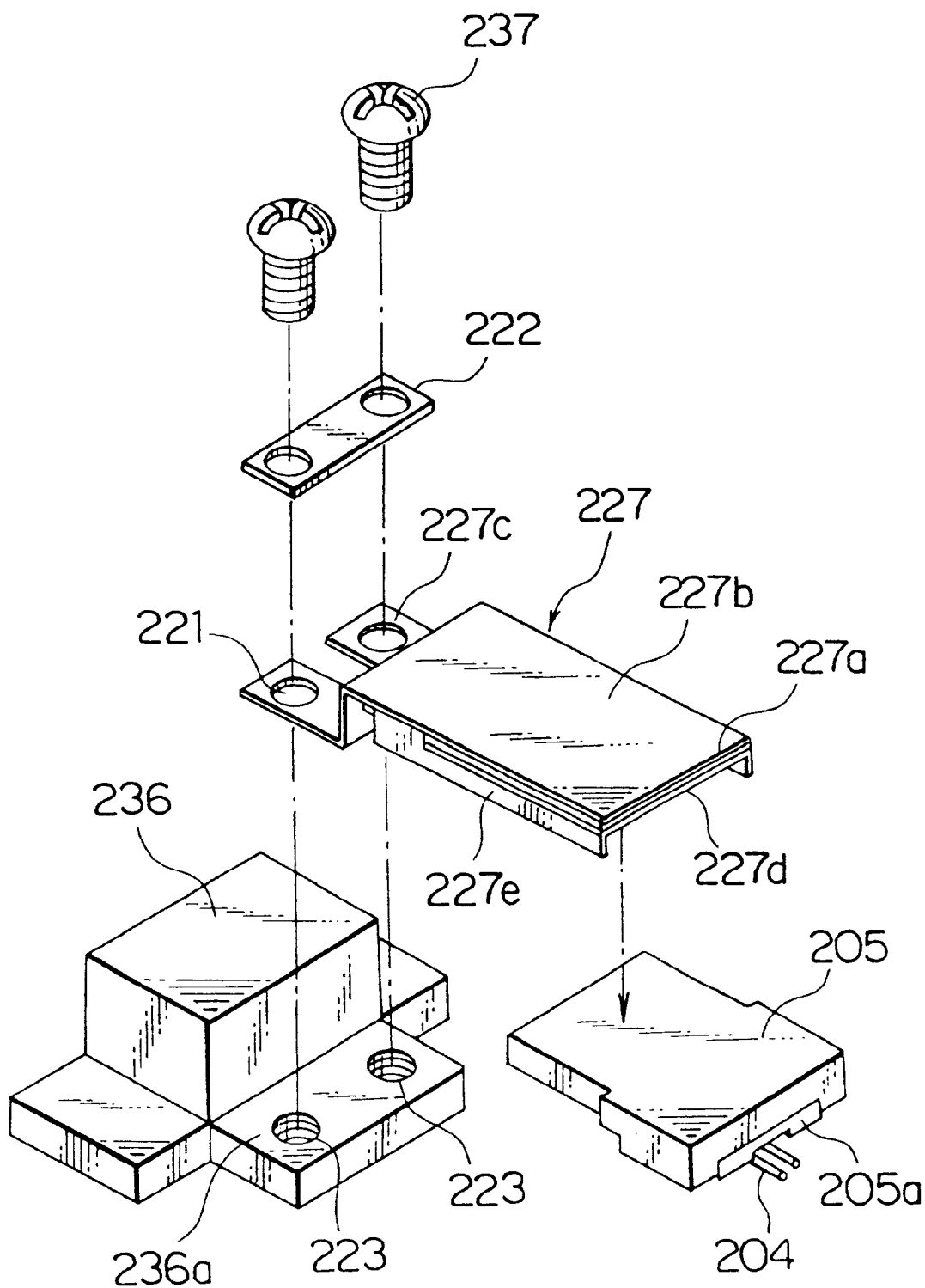
FIG. 41 is an exploded perspective view to show a second movable arm, a movable head, and a mount stage.
Figure 42:
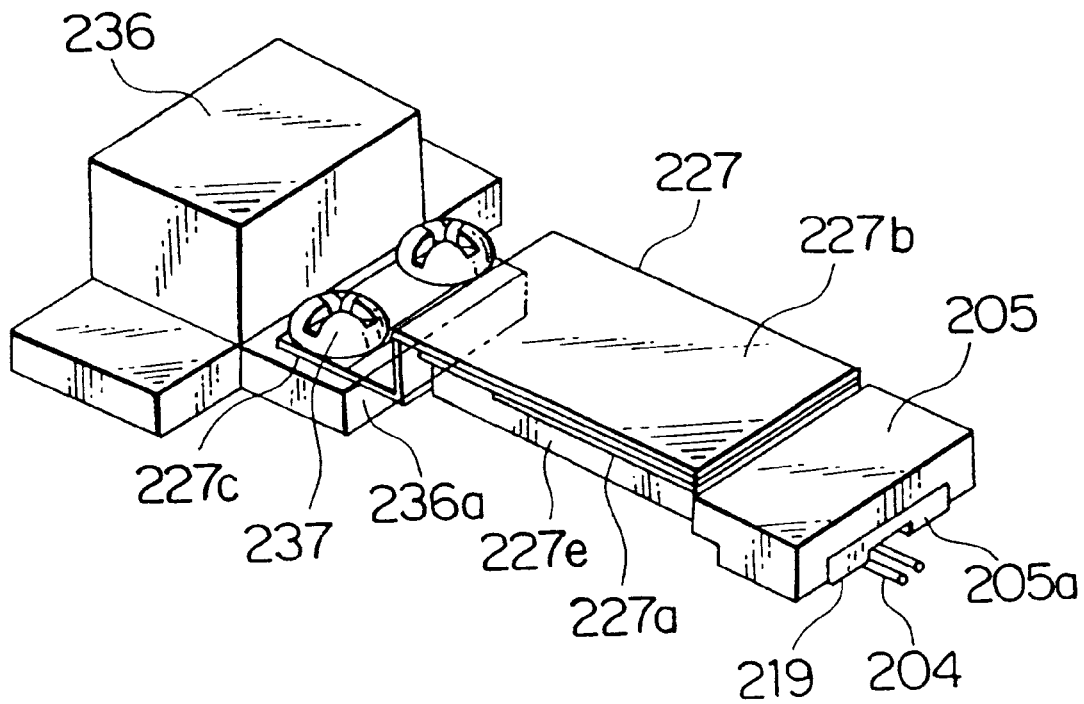
FIG. 42 is a perspective view of assembly of FIG. 41.
Figure 43:
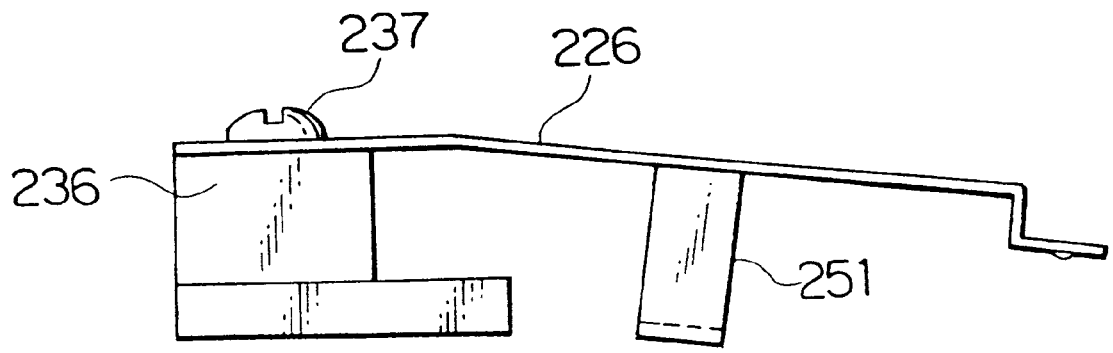
FIG. 43 is a side view to show a state in which a first movable arm is attached to the mount stage.
Figure 44:
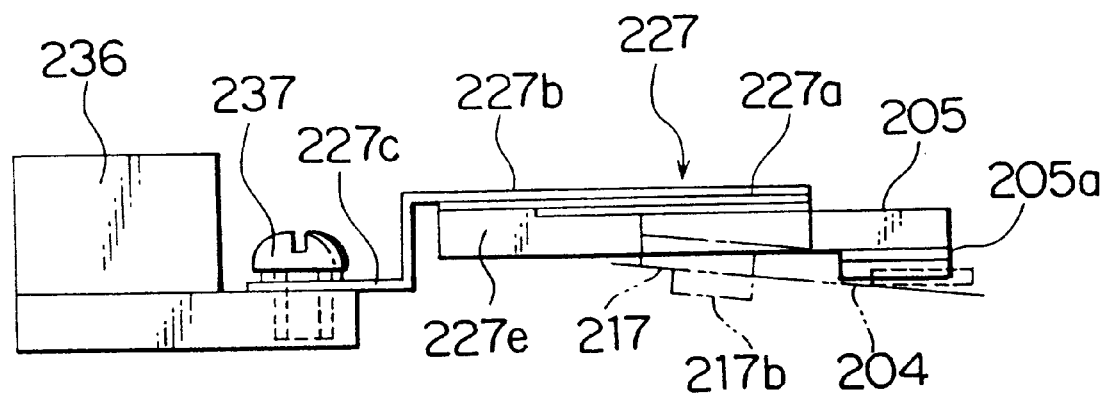
FIG. 44 is a side view to show a state in which the second movable arm with a movable head is attached to the mount stage.
Figure 45:
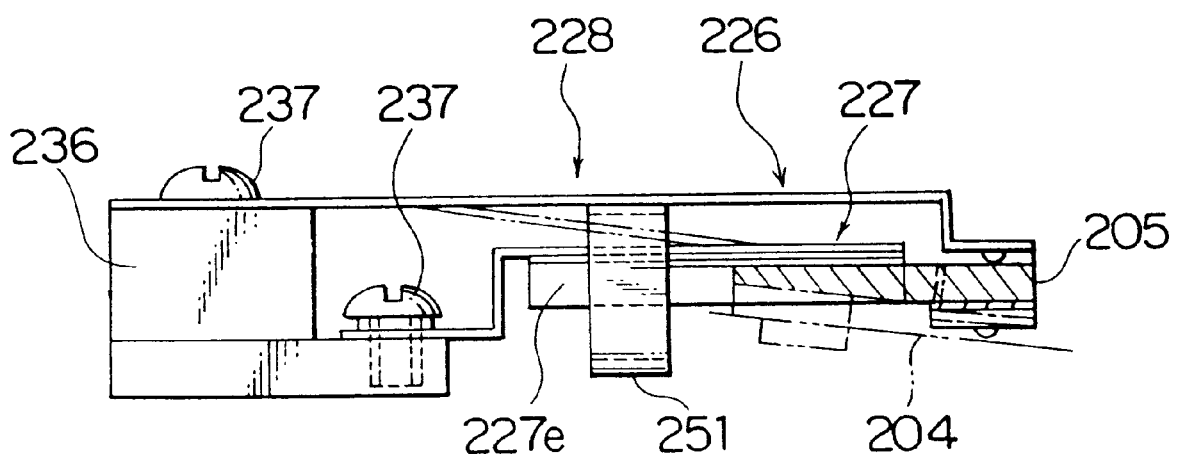
FIG. 45 is a side view to show an assembled state of the first movable arm of FIG. 43 and the second movable arm of FIG. 44.

As shown in FIG. 38 and FIG. 39, the optical fiber arranging member 203 is composed of a base plate 206, a separate groove 207 formed on the top surface of the base 206, first fiber fixing grooves 208 and second fiber fixing grooves 209 arranged on the both sides of the separate groove 207 as extending in the direction perpendicular to the longitudinal direction of the separate groove 207, and a cover plate 210 for pressing the first optical fibers 202 from the top.

The base plate 206 is approximately rectangular as shown in FIG. 38, and the separate groove 207 extends from one side surface 206a to the other side surface 206b of the base plate 206. A cross section of the separate groove 207 is approximately U-shaped. On the other hand, a multiplicity of (for example, 80, some of which are illustrated) first fiber fixing grooves 208 and second fiber fixing grooves 209 are arranged at constant pitch intervals (for example, 0.25 mm) from one side surface (reference end face) 206a of the base plate 206.

Further, the first and second optical fiber fixing grooves 208, 209 are V grooves in this embodiment, and are arranged so that longitudinal extension lines thereof along the respective fiber fixing grooves 208 and 209 coincide with each other. The first optical fibers 202 exposed from the optical fiber tape 201 are inserted into the first fiber fixing grooves 208 from the rear of the fiber fixing grooves 208, and are arranged so that fiber tip faces 202a are aligned on a same plane with one vertical wall of the separate groove 207. The separate groove 207 is approximately U-shaped as described above and the depth thereof is a little deeper than the fiber fixing grooves.

The above first optical fibers 202 are inscribed in side walls of the bottom parts of the V grooves, and are held in this state with an adhesive. Also, the silicon cover plate 210 is bonded to the top surface of the base plate 206 to protect the first optical fibers 202 fixed in the first fiber fixing grooves 208. Since the cover plate 210 is bonded to the base plate 206 as exposing the tip faces of the first optical fibers 202, there is no trouble with connection to the second optical fibers 204. Further, since the V grooves are deep enough to fully embed the first optical fibers 202, the cover plate 210 is bonded in an almost surface contact state to the top surface of the base plate 206.

Figure 33:
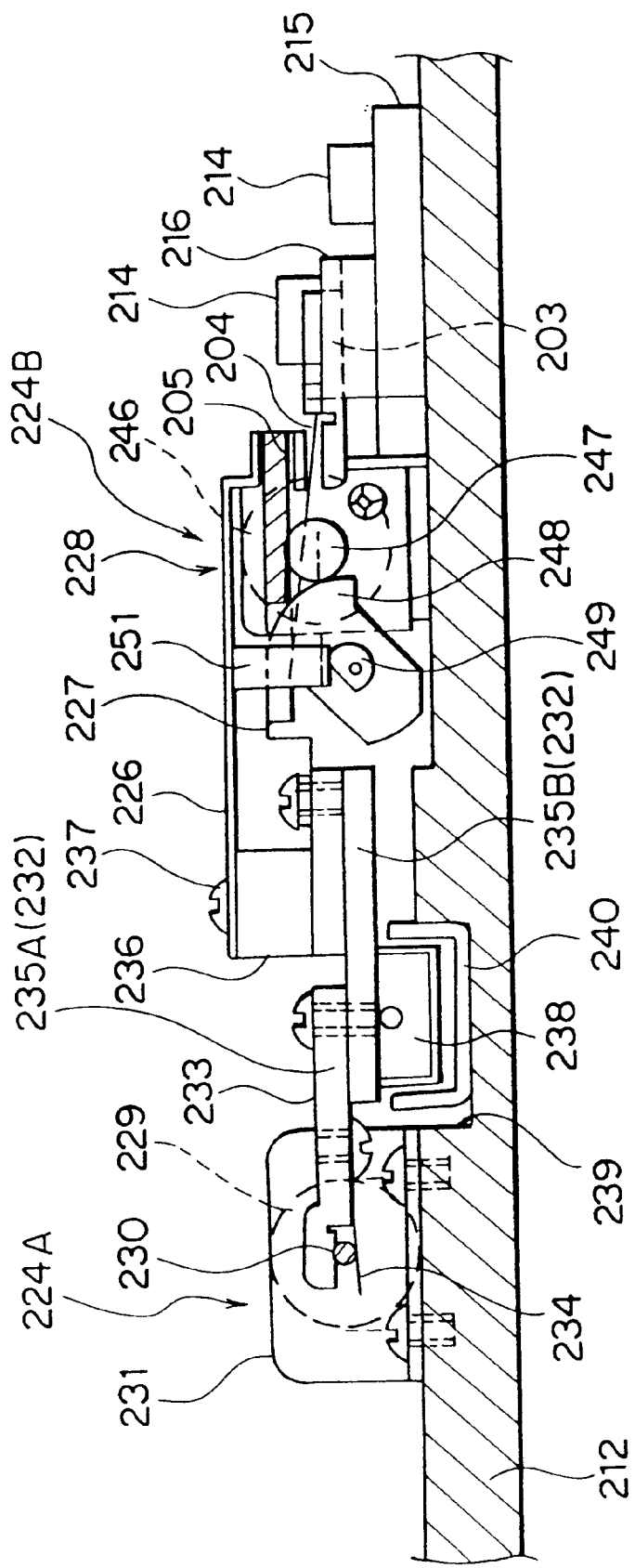
FIG. 33 is a cross section of FIG. 32.
Figure 34:
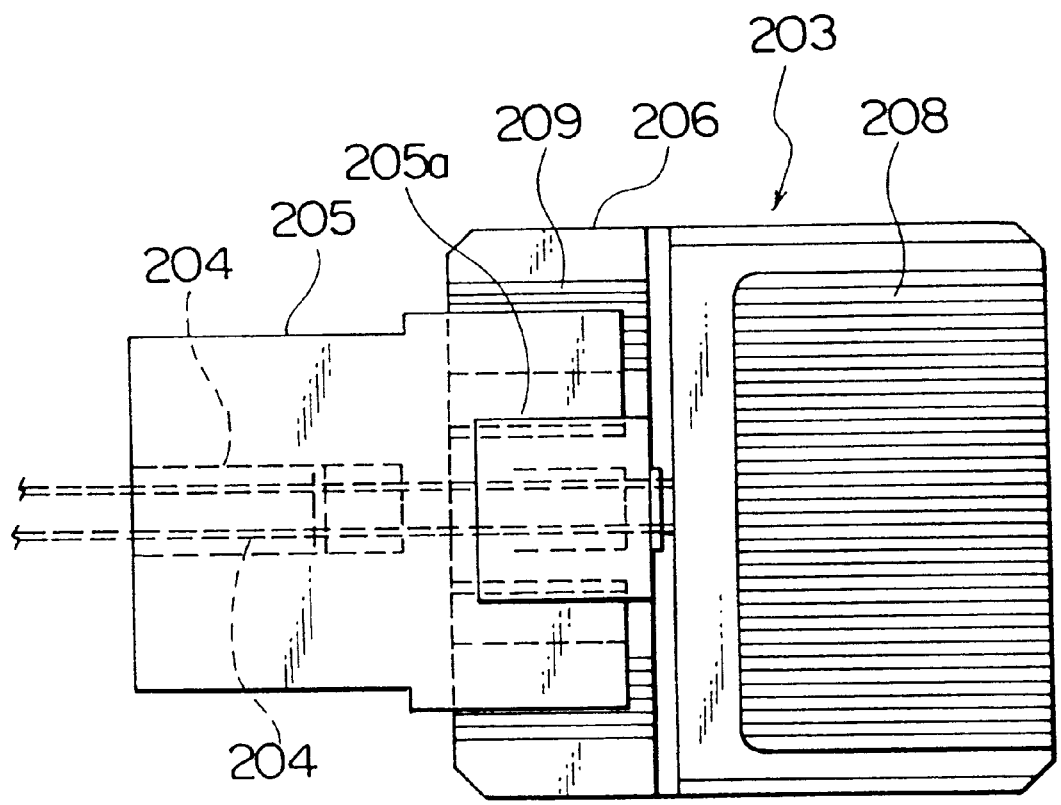
FIG. 34 is a plan view of part A in FIG. 32.

As shown in FIG. 38, steps 213 are formed at the tip ends of the second fiber fixing grooves 209 by cutting the crests of the V grooves; the steps 213 are next to the separate groove 207, and have a width L throughout the entire length, and a predetermined height h from the bottom of the base plate 206. Therefore, when the second optical fibers 204 are inserted into the second fiber fixing grooves 209 to make optical coupling between the second optical fibers 204 and the first optical fibers 202, the second optical fibers 204 project from the steps 213 as shown in FIG. 33. Then the second optical fibers 204 projecting from the steps 213 are urged against the steps 213 by a fiber stop 257 (FIG. 35), so that the second optical fibers 204 are surely secured in the second fiber fixing grooves 209. In the present embodiment, the second optical fibers 204 include a plurality of (for example, two, six, or eight) optical fibers attached in a set to the movable head 205 and moving together, so that a plurality of optical paths can be switched at a time.

The base plate 206 of the above optical fiber arranging member 203 is made of a Si material, and in molding thereof, the top surface of a base plate 206 is cut by a diamond cutter or the like from one side surface 206a to the other side surface 206b to form the separate groove 207 and steps 213. Also, the top surface is cut in a plurality of V grooves by the diamond cutter or the like along the direction perpendicular to the longitudinal direction of the separate groove 207 and steps 213 to form the first and second fiber fixing grooves 208, 209. Then the elongate base plate 206 is cut in an appropriate length, thereby easily producing the base plate 206 in the predetermined length as shown. Also, it can be produced with high accuracy by the photoetching technology (though not shown).

In the illustrated example the first and second fiber fixing grooves 208, 209 are formed in a single base plate 206, but another possible arrangement may be constructed in such a structure that the first and second fiber fixing grooves 208, 209 are formed on top surfaces of two base plates juxtaposed next to each other and the fiber fixing grooves 208, 209 are arranged to be aligned on same lines.

Here, the movable head 205 shown in FIG. 32 moves in the directions (the Y directions) perpendicular to the arrangement directions of the second fiber fixing grooves 209 within a predetermined range, and also moves in the arrangement directions (the X directions) of the second fiber fixing grooves 209, whereby the second optical fibers 204 can leave the second fiber fixing grooves 209 and can move over the crests of the fiber fixing grooves into other second fiber fixing grooves 209. As a consequence, the optical coupling between the first optical fibers 202 and the second optical fibers 204 can be suitably switched.

Further, the second optical fibers 204 extending above the steps 213 of the second fiber fixing grooves 209 are pressed by the fiber stop 257 (FIG. 35) to be surely fixed in the second fiber fixing grooves 209. This keeps the second fibers 204 from floating from the second fiber fixing grooves 209 with application of external stress, whereby the second fibers 204 can be surely optically coupled with the first optical fibers 202.

Incidentally, the second optical fibers 204 are supported on the movable head 205, as described above; the movable head 205 can be accurately positioned to the optical fiber arranging member 203 by the special ideas for the structure of the movable head 205 and the supporting means of the second optical fibers 204 to the movable head 205, and the structure of the optical fiber arranging member 203 corresponding thereto. Further, the movable head 205 is stationary in the arrangement directions of optical fibers with application of external stress, thus achieving the structure that can stably hold the second optical fibers 204 in the second fiber fixing grooves 209.

Figure 35:
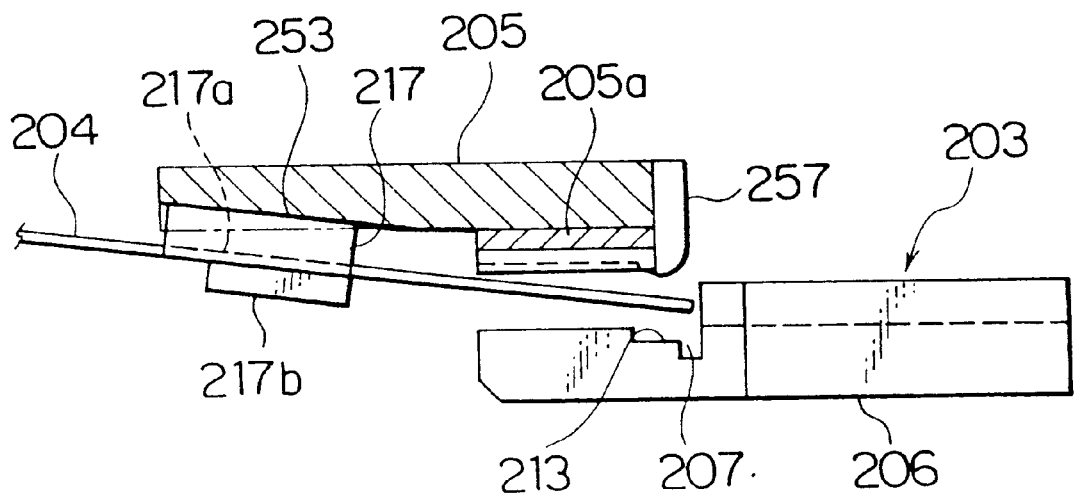
FIG. 35 is a side cross section of FIG. 34.
Figure 36:
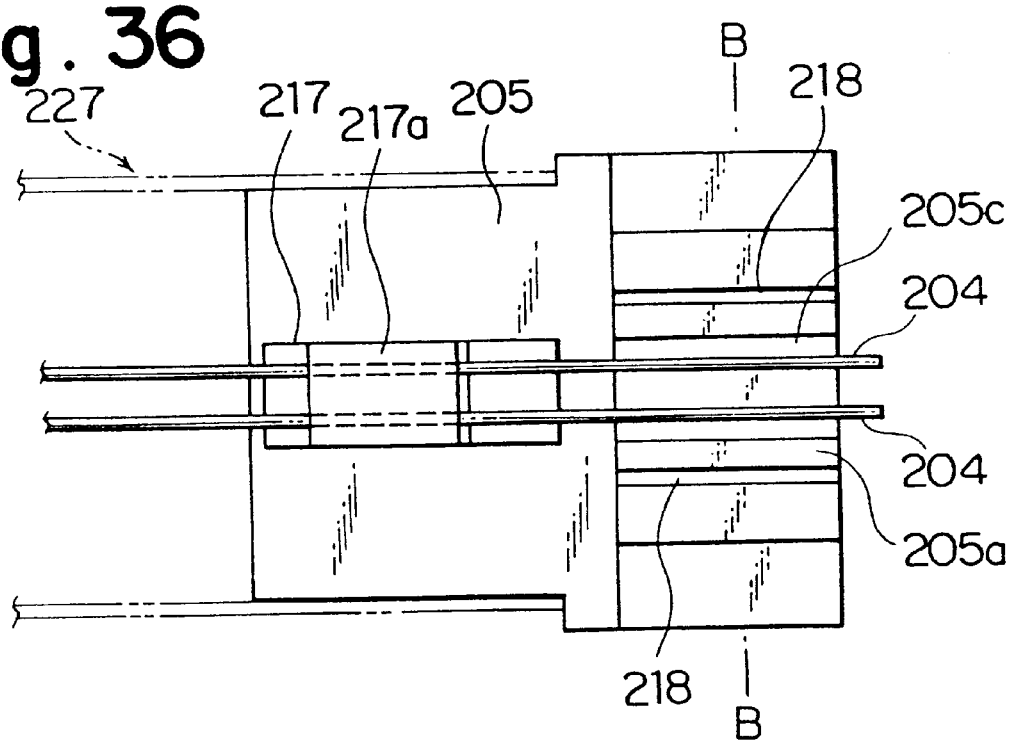
FIG. 36 is a bottom plan view of an enlarged movable head.

In the present embodiment it is preferred to arrange the movable head 205 and optical fiber arranging member 203 in the following structure. As shown in FIG. 34 to FIG. 37, a fiber fixing block 217 is mounted in a front-down state to a slant surface 253 formed by cutting the bottom rear part of the movable head 205 (FIG. 35). The second optical fibers 204 are fit in fitting grooves 217a in the bottom surface of the fiber fixing block 217, a stop plate 217b is put on the outer peripheries of fibers, and the stop plate 217b is bonded to the fiber fixing block 217 with an adhesive. As a result, the second optical fibers 204 are arranged at constant intervals to the movable head 205 and the tip ends of the second optical fibers 204 can be mounted as inclined in a front-down state.

Figure 37A:
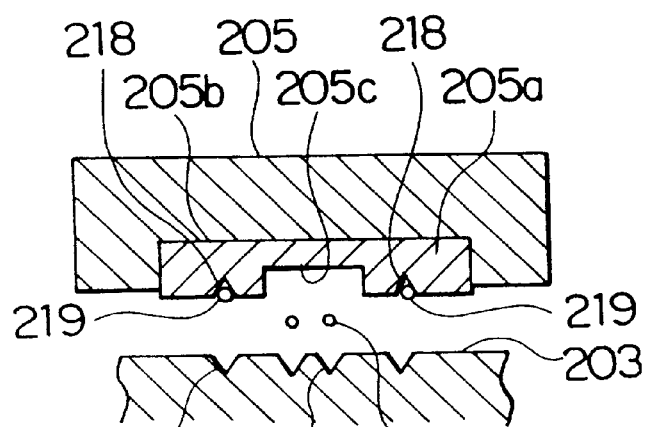
FIG. 37A is a cross section along B—B line in FIG. 36.

As shown in FIG. 37A, a pair of pin fixing grooves 218 of V grooves parallel to the second optical fibers 204 are formed by cutting outside the two second optical fibers 204 in the tip end of the bottom surface of the movable head 205. A pair of guide pins (positioning members) 219 made of a hard metal material are fit and secured in the pin fixing grooves 218, and a portion of the outer periphery of each guide pin 219 projects from the bottom surface of the movable head 205. In FIG. 37A the pin fixing grooves 218 are formed in the fixing block 205a and the fixing block 205a is fixed in a recess 205b of the movable head 205, and this arrangement is for convenience of fabrication. Also, when the second optical fibers 204 are inserted into the second fiber fixing grooves 209, the second optical fibers 204 are bent, and thus, a recess 205c is formed as an escape space thereof in the fixing block 205a.

On the other hand, guide grooves (engaging portions) 220 of V grooves for the above guide pins 219 to fit are formed in parallel with the second fiber fixing grooves 209 in the optical fiber arranging member 203.

Accordingly, when the movable head 205 is lowered from above the optical fiber arranging member 203, the tip ends of the second optical fibers 204 come to fit in the second fiber fixing grooves 209 as being bent with the fixed portions to the fiber fixing block 217 as a fulcrum, so as to be optically coupled with the first optical fibers 202. Further lowering the movable head 205, the guide pins 219 projecting from the bottom surface of the movable head 205 come to fit in the guide grooves 220. Supposing in this state a push-down force is continuously applied to the movable head 205 through the movable arm 228, the movable head 205 is kept stationary in the X directions even with application of external stress on the movable head 205 in the arrangement directions (the X directions) of the first optical fibers 202 because the guide pins 219 made of the hard metal are in mesh with the guide grooves 220, whereby optical coupling can be surely held between the first and second optical fibers 202, 204.

Cross sections of the guide pins 219 and guide grooves (engaging portions) 220 may be not only of recessed shapes, but also of projected shapes. In case of the engaging portions 220 being projected, positioning recesses (not shown) are preferably formed in the movable head 205 instead of the guide pins. Further, there is no restriction on the number of guide pins 219. The example shown in FIG. 37A includes two parallel guide pins arranged at a predetermined interval, but the intended purpose can be achieved simply by even one guide pin 219. In case of a single guide pin 219, appropriate support means is preferably added for preventing the movable head 205 from being inclined.

Figure 37B:
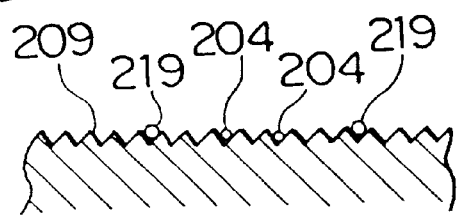
FIG. 37B is a drawing to show an engagement relation between guide pins and second fiber fixing grooves as a modification of FIG. 37A.

FIG. 37B shows an embodiment in which the second fiber fixing grooves 209 are also used for the guide grooves to fit with the guide pins 219. In case of FIG. 37B, the width of openings of V grooves of the second fiber fixing grooves 209 is set to about 250 m$\mu$. Further, the outer diameter of optical fibers is about 125 $\mu$m, and the outer diameter of the guide pins 219 is set to 230 to 250 $\mu$m. According to the structure of FIG. 37B, because the second fiber fixing grooves 209 also serve as the guide grooves, the second optical fibers 204 can fit in the second fiber fixing grooves 209 in a sufficient depth, and the guide pins 219 can also fit in the second fiber fixing grooves 209 in part thereof.

Continuously applying a slight pressing force from above the movable head 205 while parts of guide pins 219 are fit in the second fiber fixing grooves 209, the movable head 205 is kept stationary in the X directions even with application of external stress on the movable head 205 in the fiber arrangement directions (the X directions) to be accurately positioned, thus achieving the intended purpose.

The movable head 205 is located at the tip of the movable arm 228, the movable arm 228 is composed of first movable arm 226 and second movable arm 227 having elasticity, and the first movable arm 226 and second movable arm 227 are arranged up and down with a gap. The base end of the movable arm 228 is fixed to a mount stage 236 provided in a second movable member 235B of the second drive mechanism 224A and is interlocked with a first motor 229 as a drive source.

The drive mechanism 224 for moving the movable arm 228 will be described in detail.

First described is a first drive mechanism 224A for driving the movable arm 228 in the arrangement directions of the first optical fibers 202. As shown in FIG. 32 and FIG. 33, the first drive mechanism 224A is provided with the first motor 229 as a drive source, the first motor 229 is disposed on one side end of the base 212, and a screw shaft 230 connected to a motor shaft of the first motor 229 is horizontally set on the base 212 through a bearing plate 231. This screw shaft 230 is interlocked with a first movable member 235A composing a part of the movable member 232. Namely, there are provided a stop arm 233 and an engaging wire 234 with spring property at the rear end (the left end in FIG. 32) of the first movable member 235A, the stop arm 233 holds the screw shaft 230, and the engaging wire 234 is engaged with a screw groove in the screw shaft 230. Accordingly, with forward and backward rotation of the screw shaft 230, the first movable member 235A moves left and right along the screw shaft 230.

The first movable member 235A is fixed on the top surface of the second movable member 235B of a plane plate composing a part of the movable member 232. A block mount stage 236 is fixed on the top surface of the second movable member 235B, and each of the base ends of the first movable arm 226 and second movable arm 227 of the movable arm 228 is fixed with plural securing screws 237 to the mount stage 236.

As shown in FIG. 33, a guide block 238 is provided on the bottom surface of the second movable member 235B of a plane plate. This guide block 238 is slidably fit in an opening portion of a U-shaped guide member 240 fixed in a guide groove 239 on the top surface of the base 212.

Accordingly, as shown in FIG. 32, the guide block 238 moves along the guide member 240, whereby the second movable member 235B stably moves as keeping a predetermined posture. First shield plate 242 and second shield plate 243 are fixed to the both ends of the top surface of the second movable member 235B. Also, a pair of left and right, optical, first and second limit sensors 244A, 244B are provided on the base 212. Here, when the first shield plate 242 interrupts light from the first limit sensor 244A, movement toward one side of the second movable member 235B is stopped. Also, when the second shield plate 243 interrupts light from the second limit sensor 244B, movement toward the other side of the second movable member 235B is stopped and the position of the origin of the second movable member 235B is detected. Each stopper denoted by numeral 245A, 245B is a member for mechanically and forcibly stopping left-and-right (X-directional) movement of the second movable member 235B by coming into contact with the side surface of the second movable member 235B when the first and second unit sensors 244A, 244B are out of order.

A first embodiment of the first and second movable arms 226, 227 composing the movable arm 228 is shown in FIG. 40 to FIG. 45. Referring to these drawings, the first movable arm 226 is formed from a metal plate with spring property, and the base end thereof is fixed with securing screws 237 on the top surface of the mount stage 236. The first movable arm 226 is formed to decrease the width toward the tip in order to increase the flexibility, and a bent portion provided at the tip of the first movable arm 226 is arranged to press the top surface of the movable head 205. Also, a nearly C-shaped receiver 251 is fixed at the middle position of the bottom surface of the first movable arm 226.

A second movable arm 227 is constructed in a laminate structure of a plurality of thin plate springs, and the laminate plate springs 227a are arranged in a zigzag fashion by alternately spot-welding the both end portions of the laminate plate springs 227a. Further, the base end portion of the uppermost plate spring 227b is hook-shaped, and holes 221 perforating bent portions 227c are positioned with respect to screw holes 223 in a front projecting portion 236a of the mount stage 236, and securing screws 237 are screwed into the screw holes 223 through a washer 222, thereby securing the uppermost plate spring 227b to the mount stage 236.

Further, a pair of left and right bent portions 227e are formed on either side of the lowermost plate spring 227d, a rear portion of the movable head 205 is fit to an internal wall surface of each bent portion 227e, and thereafter the movable head 225 is fixed to the bent portions 227e with an adhesive. Since the second movable arm 227 has the structure of the plate springs 227a connected in a zigzag fashion as described above, the zigzag intermediate layers formed between the uppermost plate spring 227b and the lowermost plate spring 227d become expandable or contractible, whereby the movable head 205 can be softly and elastically supported. Particularly, because the present embodiment employs the spring structure of plural plate springs arranged in lamination and in a zigzag connection, the spring length can be kept substantially long in a smaller space and a soft spring with more flexibility can be constructed, thereby enabling smooth elastic support of the movable head 205.

Accordingly, as shown in FIG. 32, the movable head 205 is supported by the tip of the second movable arm 227, and thus is driven by the second drive mechanism 224B in the arrangement directions of the first optical fibers 202 (in the Y directions). The second drive mechanism 224B is provided with a second motor 246 as a drive source for moving the movable arm 228 in the Y directions, and the second motor 246 is disposed on one side end of the base 211.

A sector gear 248 is in mesh with a motor pinion 247 of the second motor 246. This sector gear 248 is fixed on a shaft 252 projecting from an end portion of an actuator rod 249, and the actuator rod 249 is formed from a shaft with an offset axis or a shaft of a non-circular cross section. The both end shafts 252 of the actuator rod 249 are supported by a bearing plate 250 fixed on the base 212.

A C-shape receiver 251 is fixed on the bottom surface of the first movable arm 226, and the bottom surface of the receiver 251 is arranged as slidable in press contact with the peripheral surface of the actuator rod 249. Thus, driving the second motor 246, the actuator rod 249 rotates by a predetermined angle about the shafts 252 through the motor pinion 247 and sector gear 248. As a result, the actuator rod 249 performs the cam operation about the shafts 252 to move the receiver 251 in press contact with the peripheral surface of the actuator rod 249 up and down. Therefore, the first movable arm 226 and second movable arm 227 move together up and down, which moves the movable head 205 for the second optical fibers 204 up and down.

Namely, when the actuator rod 249 rotates to lower the point of action thereof, the movable arm 228 also descends by its own elasticity, whereby the second optical fibers 209 are pressed against groove bottoms of the second fiber fixing grooves 204. This pressing state is also held when the second motor 246 is in a non-operating state. On the other hand, when the actuator rod 249 further rotates to raise the point of action thereof, the movable arm 228 is lifted up through the receiver 251 against the elasticity, whereby the second optical fibers 204 supported by the movable head 205 leave the second fiber fixing grooves 209. When the movable head 205 is lowered, the guide pins 219 come to engage with the guide grooves 220, which certainly prevents deviation of the movable head 205 in the fiber arrangement directions.

As described above, with the driving mechanism 224 in the present embodiment, driving the first motor 229 composing a part of the structure of the first drive mechanism 224A and the second motor 246 composing a part of the structure of the second drive mechanism 224B, the movable head 205 supporting the second optical fibers 204 can move in the arrangement directions of the first optical fibers 202 (in the X directions) and in the directions (the Y directions) perpendicular to the arrangement directions (the X directions) of the first optical fibers 202, whereby the second optical fibers 204 can be removed from a set of grooves out of the second fiber fixing grooves 209 and smoothly move toward other second fiber fixing grooves 209, thereby switching optical connection between the first optical fibers 202 and the second optical fibers 204.

The present embodiment is arranged to transmit the motion of the actuator shaft 249 rotated by the second motor 246 through the receiver 251 to the first movable arm 226 and then to transmit it through the first movable arm 226 to the second movable arm 227. The invention, however, may employ such an arrangement that the rotation of motion of the actuator rod 249 is directly transmitted to the second movable arm 227, and in case of such an arrangement, the first movable arm 226 can be omitted (though not shown).

A second embodiment of the movable arm is next described referring to FIG. 51 to FIG. 57.

In the second embodiment, the structure of second movable arm 298 is different from that of the second movable arm 227 in the first embodiment.

Figure 51:
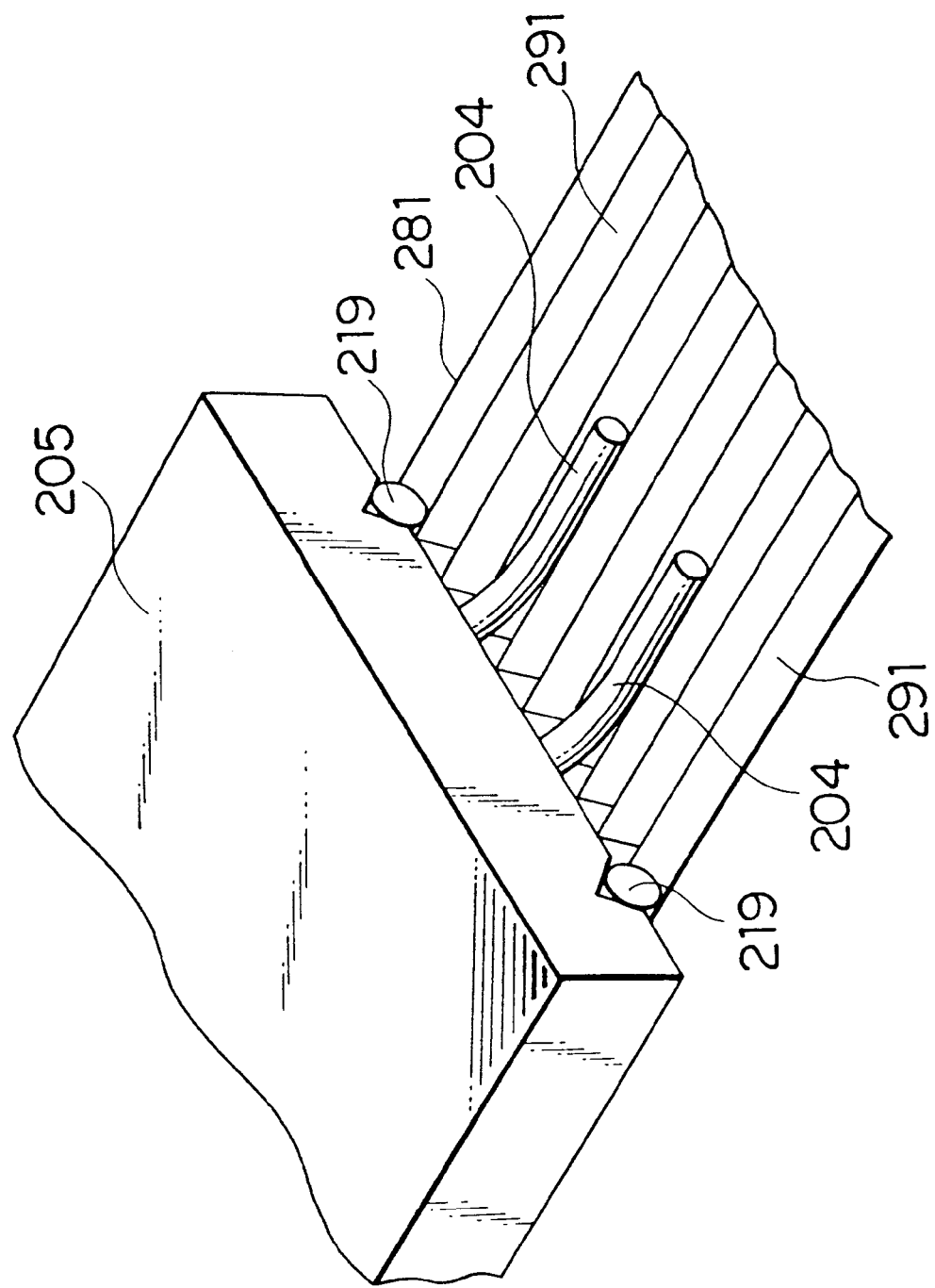
FIG. 51 is a perspective view to show an engagement relation between the second optical fibers and guide pins supported by the movable head, and the fiber introducing grooves.
Figure 53A:
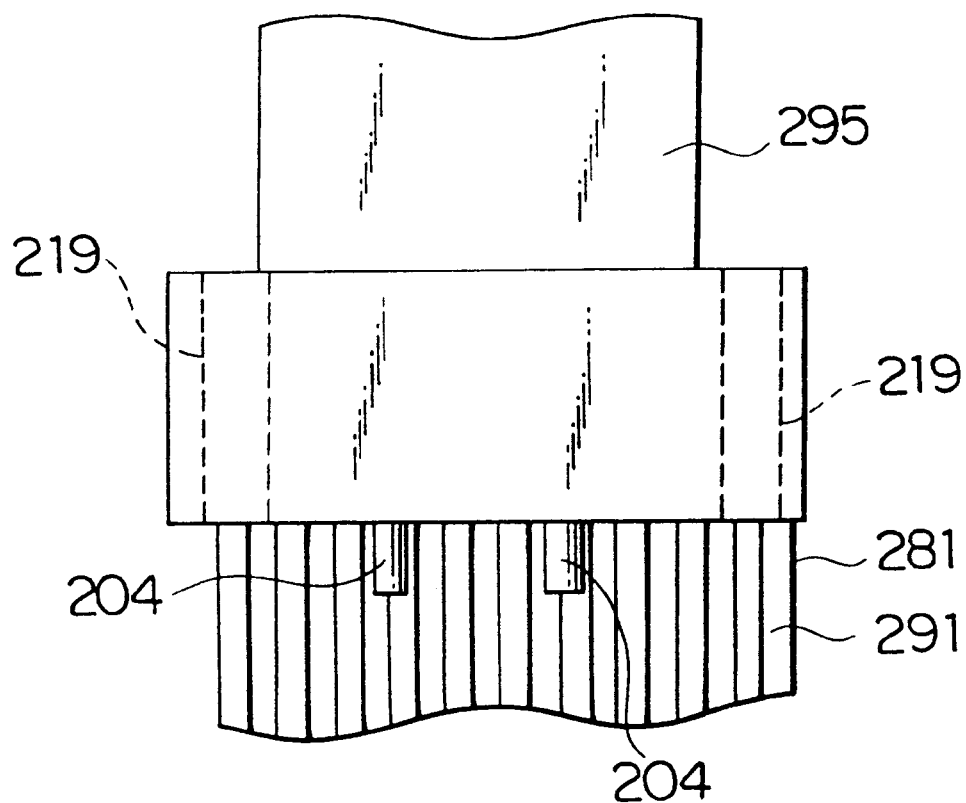
FIGS. 53A and 53B are plan view and front elevation to show a state of initial engagement between the second optical fibers and guide pins supported by the movable head, and the fiber introducing grooves.
Figure 53B:
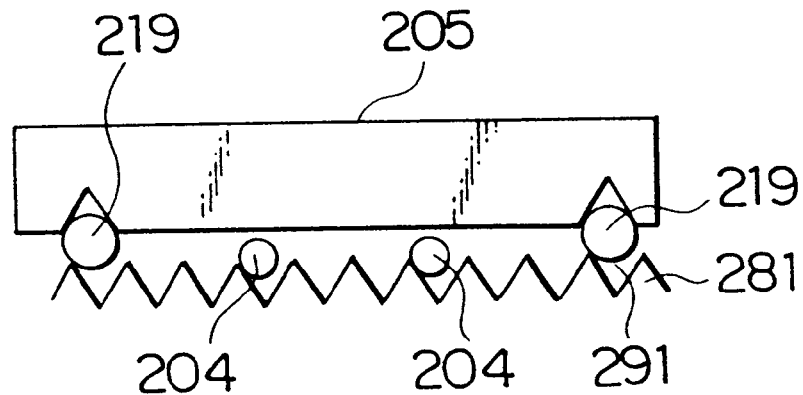

It is first described with reference to FIG. 51 to FIG. 57. FIG. 51 is a partial, enlarged, perspective view of the movable head 205 in the optical switch of the V groove guide method. Guide pins 219 for positioning are attached to the movable head 205, and by pressing the movable head 205 in the Y directions, the guide pins 219 are fixed in the fiber introducing grooves 291 of a V-groove shape in the optical fiber arranging member 281, whereby the second optical fibers 204 are positioned as aligned in optical axis with the first optical fibers (not shown).

As shown in FIG. 52, a plate spring 295 composing the movable arm connects the movable head 205 with a mount stage 236 provided in the second movable member 235B of the first drive mechanism 224A. Provided in a spring base end 261 of this plate spring 295 are fixing portions 267 for fixing the plate spring 295 to the mount stage 236 provided in the second movable member 235B of the first drive mechanism 224A, and screw insertion holes 262 are formed in the fixing portions 267. A vertical portion 263 rising from the ends of the fixing portions 267 is formed in the spring base end 261, and a spring body portion 264 extends horizontally from the upper end of the vertical portion 263. This spring body portion 264 is constructed in a lamination structure of a plurality of plate springs, and has a zigzag portion 265 formed by welding one end portions of plate springs in upper and lower layers in a zigzag fashion, and a portion extending forward from the lower end of the zigzag portion 265 composes a movable head mount portion 266.

Figure 54A:
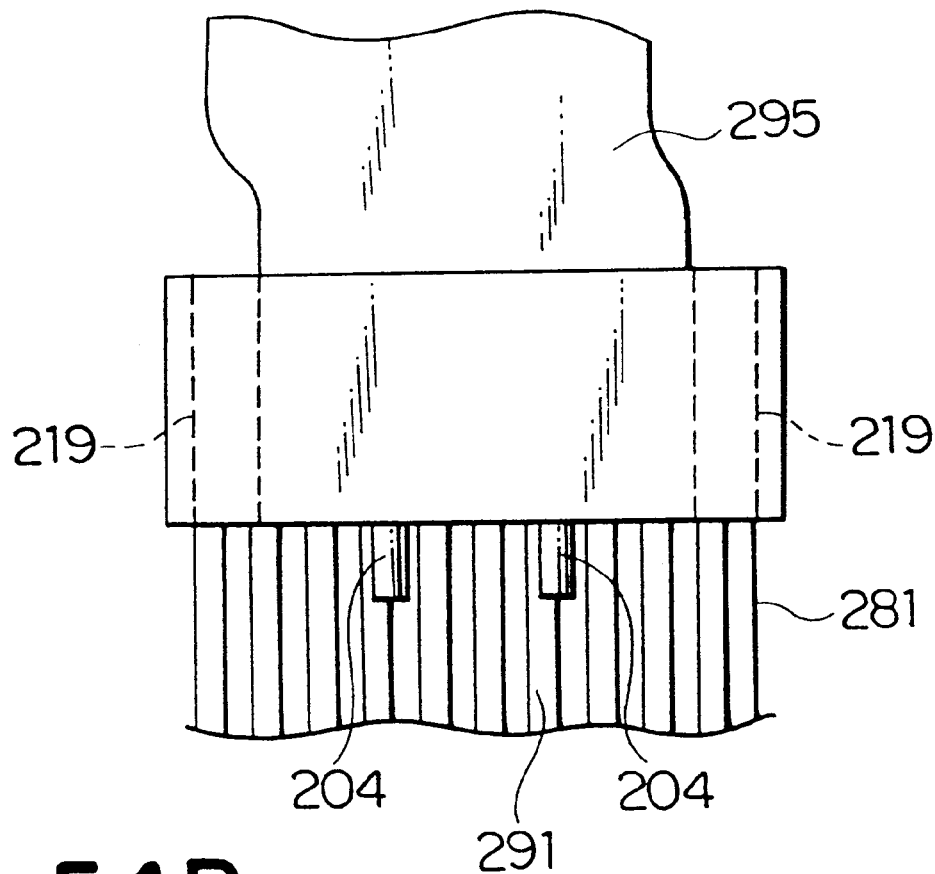
FIGS. 54A and 54B are plan view and front elevation to show a state of engagement between the second optical fibers and guide pins supported by the movable head, and the fiber introducing grooves.
Figure 54B:
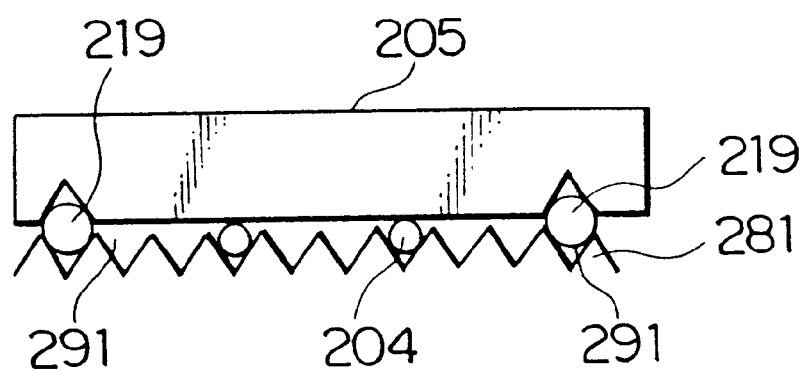

The above plate spring 295 has flexibility in the X directions and in the Y directions as shown by dashed lines in FIGS. 52A and 52B, so that the movable head 205 has flexibility in the directions. Accordingly, even if the movable head 205 is positioned as deviated from centers of predetermined fiber introducing grooves 291 (FIG. 53), the moving head 205 is urged in the Y direction in FIG. 52A so as to smoothly position the guide pins 219 in the centers of grooves along the slopes of the fiber introducing grooves 291 (FIG. 54).

Figure 55:
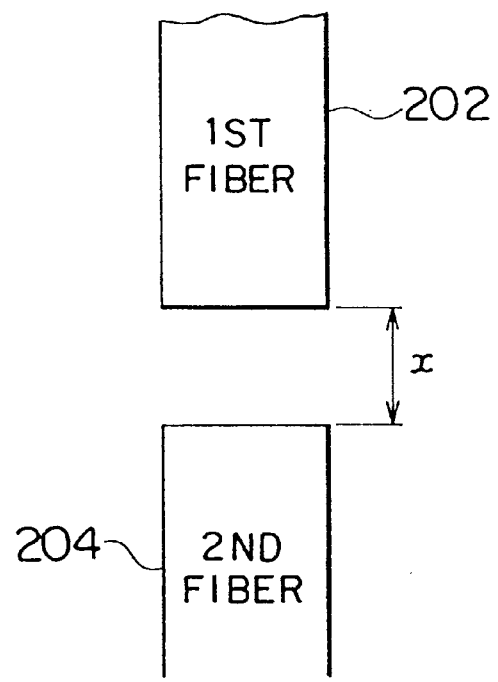
FIG. 55 is a schematic drawing to show an end face separation in a state in which optical axes of first and second optical fibers are aligned.
Figure 56:
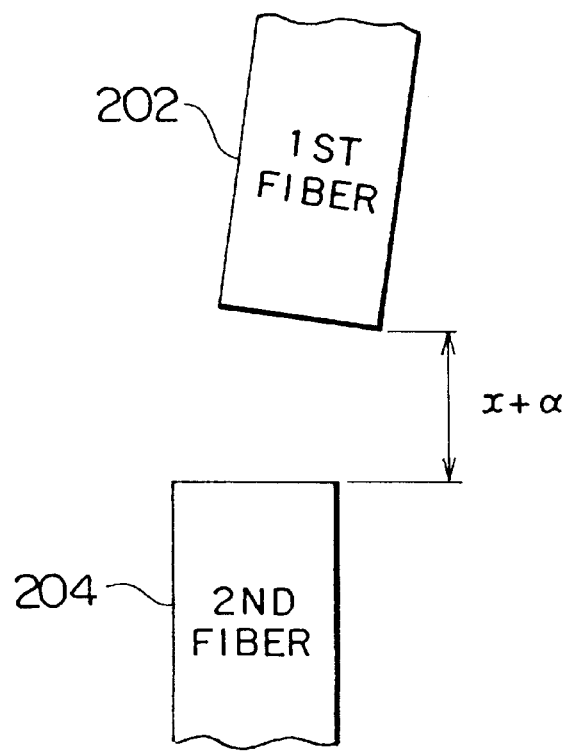
FIG. 56 is a schematic drawing to show an end face separation in a state in which optical axes of first and second optical fibers are inclined to each other.

Incidentally, since the plate spring 295 having the above zigzag portion 265 is constructed in the laminate structure of a plurality of spring plate members of plane plates, there is a possibility of positional deviation of the movable head 205 when it is placed under high-temperature environments because deformation due to thermal expansion of the plate spring 295 itself or deformation due to thermal expansion of peripheral structures surrounding the plate spring 295 is transmitted to the movable head mount portion 266. When this positional deviation occurs because of thermal expansion of peripheral structures around the plate spring 295, the optical axes are likely to be inclined to each other in the end face portions of the first and second fibers 202, 204 as shown in FIG. 55 and FIG. 56, which would cause variations of the end face separation x to x+α, thus raising a problem that the optical characteristics become unstable.

When the plate spring 295 itself is thermally expanded, the plate spring 295 is deformed as shown by the dashed line in FIG. 57. In this case, the movable head 205, provided on the movable head mount portion 266 at the tip of plate spring 295, also has positional deviation; then, even if the movable head 205 is positioned to the predetermined fiber introducing grooves 291, the end face separation would change between the first and second optical fibers 202, 204, resulting in adversely affecting the optical characteristics.

In the next place, a third embodiment of the movable arm solving the above problems is explained by reference to FIG. 46 to FIG. 50. Same or like constituent portions as those in the second embodiment of the movable arm as described above will be denoted by the same reference numerals.

In this embodiment, the movable arm 297 is constructed in an assembly of the first movable arm 226 and the second movable arm 296, and a fixing portion 267 of the first movable arm 226 and the second movable arm 296 is fixed to the mount stage 236 provided in the second movable member 235B of the first drive mechanism 224A. When the mount stage 236 is moved back and forth in the directions of the arrow in FIG. 15, the movable head 205, attached to the tip of the second movable arm 296, moves in the fiber arrangement directions, thereby switching the optical paths.

Describing in further detail, one end of the second movable arm 296 has a spring base end 261 of plate, a wing fixing portion 267 is formed in the spring base end 261, and screw insertion holes 262 are formed through the fixing portion 267. Then securing screws 269 are inserted into the screw insertion holes 262 to be meshed with screw holes 271 formed in a lower projecting portion 270 of the mount stage 236, thereby fixing the second movable arm 296 to the mount base 236.

A vertical portion 263 rising from the tip of the fixing portion 267 is integrally formed in the spring base end 261 of the second movable arm 296, a spring body portion 264 extending forward is integrally formed from the upper end of the vertical portion 263, and a movable head mount portion 266 for fixing the movable head 205 is formed at the fore end of the spring body portion 264.

Figure 48:
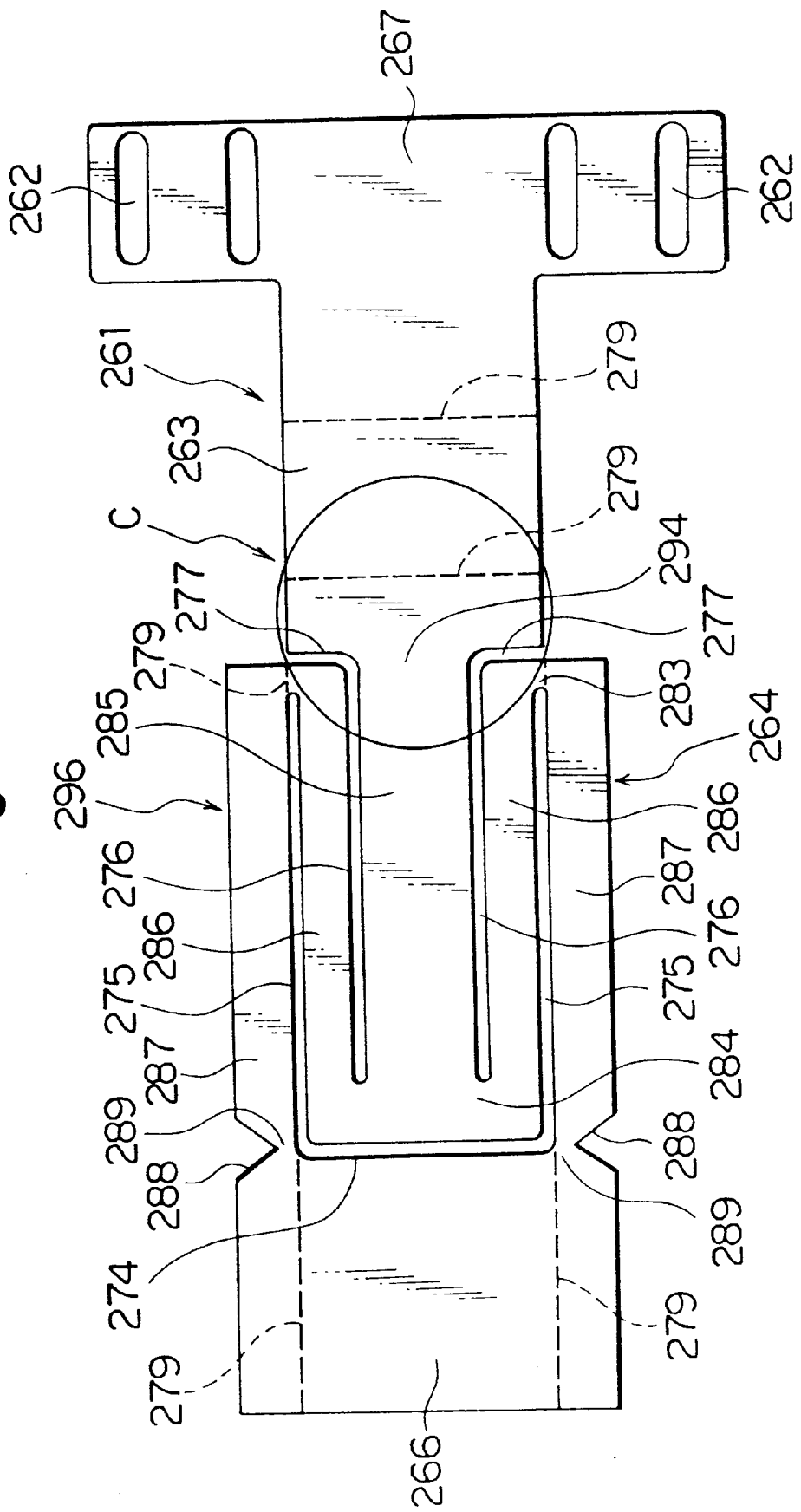
FIG. 48 is a developed plan view of a plate spring composing the second movable arm.

The second movable arm 296 is formed by blanking of a spring plate of a plane plate, as shown in FIG. 48. The spring body portion 264 as described above is provided with first flexible portions 287 extending from the movable head mount portion 266 toward the spring base end 261 and integrally formed through first connecting portions 289 with one end of the movable head mount portion 266, a second flexible portion 285 extending from the spring base end 261 to the movable head mount portion 266 and integrally formed through a second connecting portion 294 with one end of the spring base end 261, and third flexible portions 286 connecting the tips of the first flexible portions 287 with the tip of the second flexible portion 285 through third connecting portions 283 and fourth connecting portions 284.

The first flexible portions 287 as described above are comprised of two strips parallel to each other, which are located outermost of the plate body portion 264 on the both sides of the plate body portion 264. The second flexible portion 285 is comprised of one straight strip, which is located at the center of the spring body portion 264. The third flexible portions 286 are comprised of two strips parallel to each other, and are located between the first flexible portions 287 and the second flexible portion 285.

Here, the first flexible portions 287 and the third flexible portions 286 are separated from each other through first slit portions 275 extending in the longitudinal direction of the spring body portion 264, while the second flexible portion 285 and the third flexible portions 286 are separated from each other through second slit portions 276 extending in the longitudinal direction of the spring body portion 264. Also, a third slit portion 274 is formed as bridging between the ends of two first slit portions 275 on the side of the movable head mount portion 266, and at the ends of two second slit portions 276 fourth slit portions 277 are formed as extending toward the both sides of the spring body portion 264 and reaching the outside of the second movable arm 296. Further, this third slit portion 274 is located closer to the movable head mount portion 266 than the fourth connecting portions 284 and the fourth slit portions 277 are located closer to the spring base end 261 than the third connecting portions 283. Accordingly, between the spring base end 261 and the movable head mount portion 266, the spring body portion 264 is formed in an S-shape structure continuously connected by the one first flexible portion 287, one third flexible portion 286, and center second flexible portion 285 and in another S-shape structure continuously connected by the other first flexible portion 287, other third flexible portion 286, and center second flexible portion 285.

Figure 50:
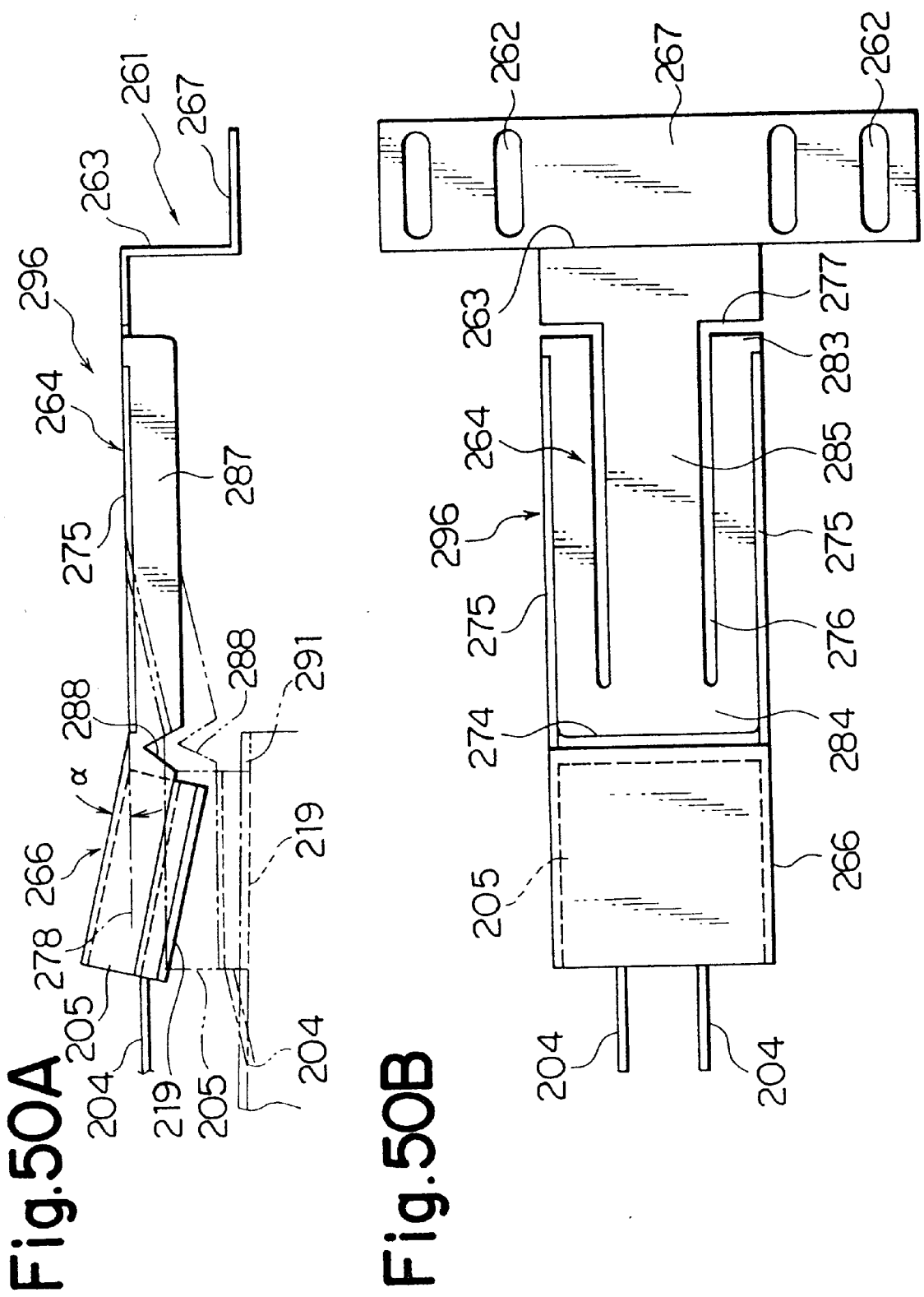
FIGS. 50A and 50B are side view and plan view to show the second movable arm.

Also, bent portions 279 are provided on the both sides of the second movable arm 296, and because the bent portions 279 are provided on extensions of the first slit portions 275, the first slit portions 275 are located at corners when the second movable arm 296 is formed by bending as shown in FIG. 50. Further, V-shape cut-outs 288 are formed between the spring body portion 264 and the movable head mount portion 266, and the cut-outs 288 are formed near the first connecting portions 289.

Figure 49:
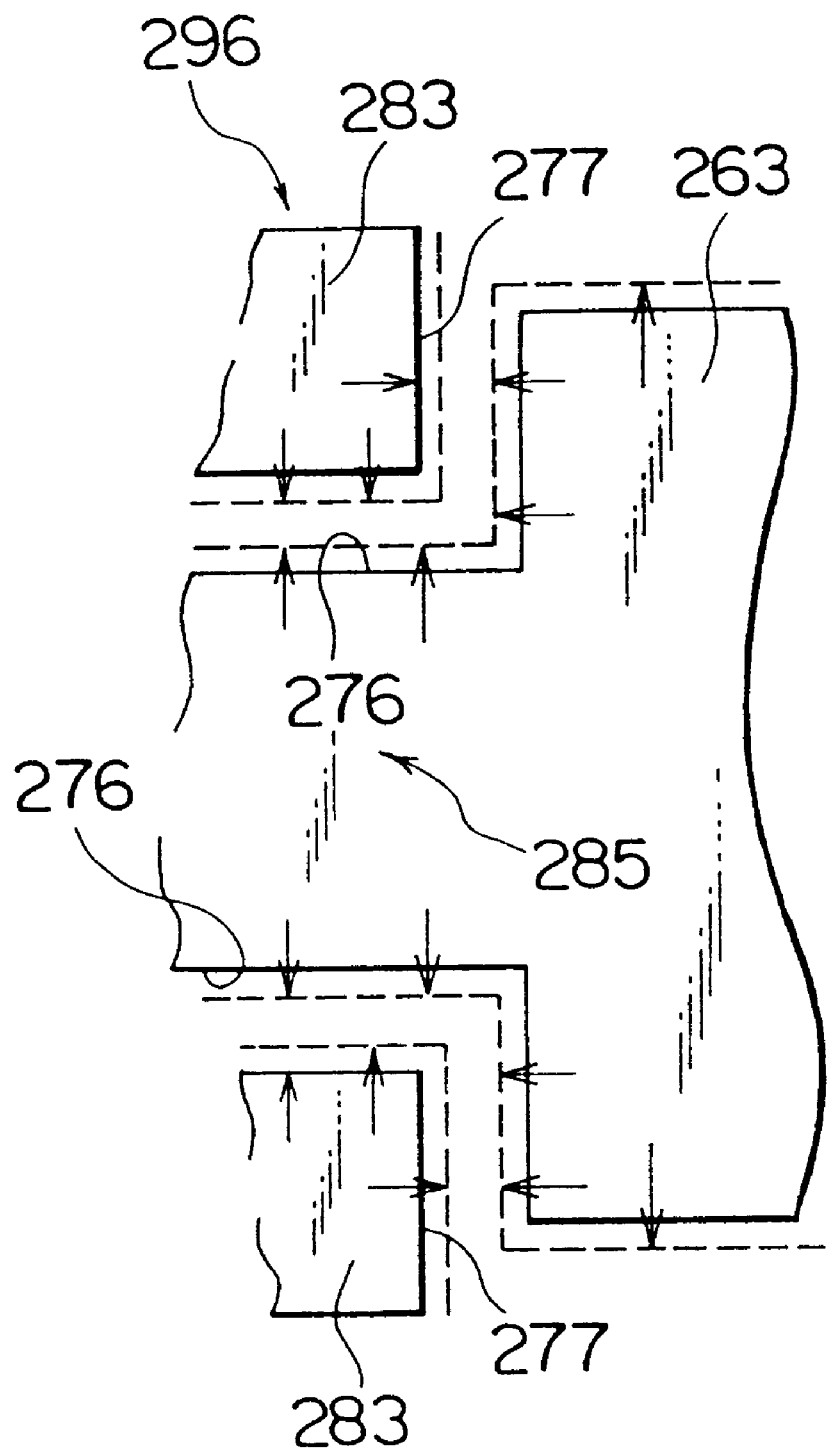
FIG. 49 is an enlarged drawing of inside of circle C in FIG. 48.

Now, in FIG. 49, supposing a pressing force in the Y direction is applied to the movable head mount portion 266, the first, second, and third flexible portions 287, 285, 286 of the spring body portion 264 are elastically deformed into a zigzag shape. As a result, the second movable arm 296 can become a spring mechanism with flexibility.

Figure 46:
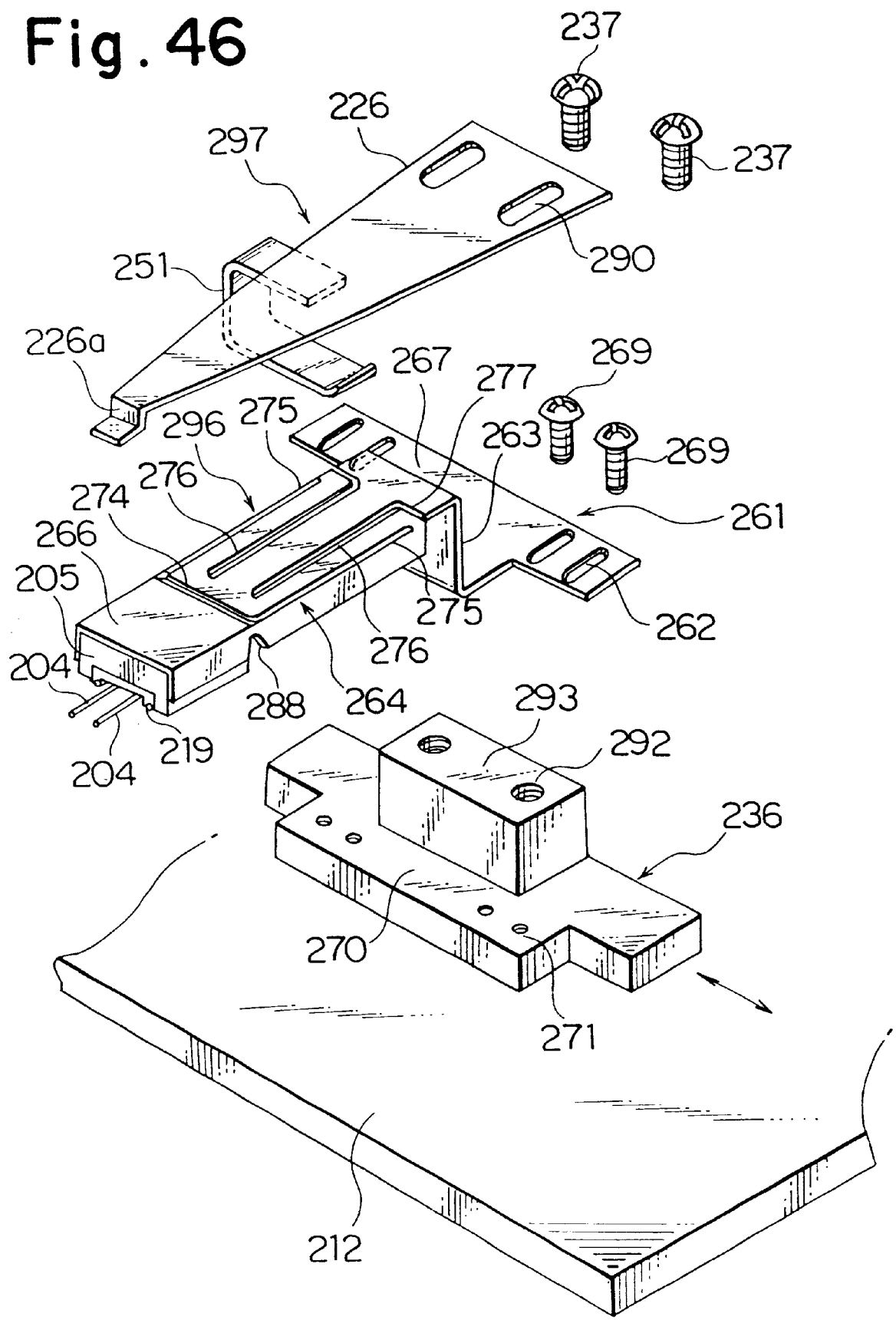
FIG. 46 is an exploded perspective view of the movable arm.
Figure 47:
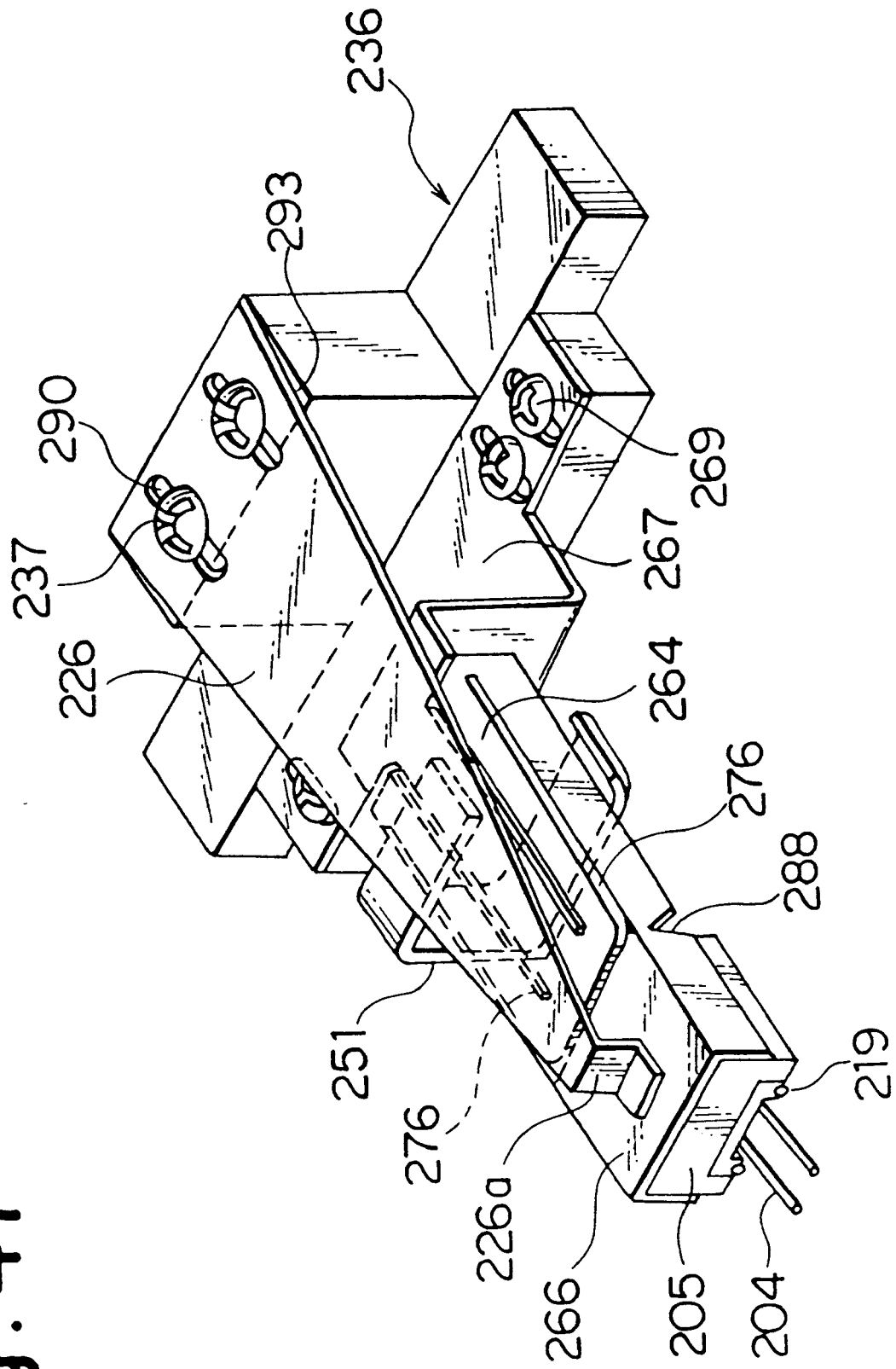
FIG. 47 is a perspective view to show an assembled state of the movable arm of FIG. 46.

As shown in FIG. 46 and FIG. 47, the tip of the first movable arm 226 having a C-shape receiver 251 is positioned on the top surface of the movable head mount portion 266 of the second movable arm 296. Screw insertion holes 290 are formed in the base end of the first movable arm 226, and securing screws 237 are inserted into the screw insertion holes 290 and the securing screws 237 are screwed into screw holes 292 formed in a raised top surface 293 of the mount stage 236 to secure the base end of the first movable arm 226 to the mount stage 236.

In the present embodiment, similarly as in the first embodiment of the movable arm, the tip end of the first movable arm 226 moves up and down through the receiver 251 in contact therewith with rotation of the actuator rod 249 (FIG. 32), thereby moving the movable head mount portion 266 of the second movable arm 296 up and down. On this occasion, the second movable arm 296 is bent in accordance with the movable head mount portion 266, but because the second movable arm 296 is formed from a spring plate and has the first to fourth slit portions 275 to 277 formed therein, X-directional and Y-directional stiffness is lower than a plate spring formed without slit portions and in the same dimensions, which increases flexibility to that extent.

As described above, the second movable arm 296 requires just a small force for deformation in the X directions and the Y directions in FIG. 32 because it has lower stiffness. Thus, a compact second motor 246 can be used to press the movable head 205 of FIG. 32 against the second fiber fixing grooves 209, thereby miniaturizing the optical switch to that extent.

Further, because the second movable arm 296 has low stiffness in the X directions, the guide pins 219 are smoothly positioned along the V grooves even if the second movable arm 296 is positioned to the second fiber fixing grooves 209 in a somewhat offset state of positioning of the movable head 205, thereby improving positioning accuracy of the second optical fibers 204.

Further, because the first to fourth slit portions 274 to 277 are formed in the second movable arm 296, the slit portions work to absorb deformation due to thermal expansion. FIG. 49 shows an enlarged view of the circle in FIG. 48, and shows a state of deformation due to thermal expansion, of the second movable arm 296 in the outstanding portion. As shown in FIG. 49, with thermal expansion of the second movable arm 296, thermally expanded portions are arranged to effectively avoid deformation thereof, as indicated by the dotted lines, through a clearance between the third and fourth slit portions 274, 277, so that the deformation can be prevented from reaching the movable head mount portion 266. Therefore, the movable head 205 is stationary in the longitudinal direction of optical fibers and variations become decreased in end face separation between the first and second optical fibers 202, 204.

FIG. 50 is a drawing to show a modification of the second movable arm 296. In this modification, the movable head mount portion 266 of the second movable arm 296 is preliminarily inclined upward by a predetermined angle α relative to the spring body portion 264. This is for taking account of that the movable head 205 descends as getting parallel to the fiber introducing grooves 291 when the movable head 205 having the guide pins 219 on the bottom surface is pushed down as indicated by the chain double-dashed lines in FIG. 50.

Namely, the movable head mount portion 266 is arranged as inclined upward by the predetermined angle a in a non-pressed state of the movable head 205, so that the guide pins 219 are also inclined upward. After the movable head mount portion 266 is pressed down from the state indicated by the solid lines in FIG. 50, it comes to the position of the chain double-dashed lines in the same drawing, whereby the movable head 205 becomes parallel to the second fiber fixing grooves 209. Thus, the movable head 205 and guide pins 219 can always contact the second fiber fixing grooves 209, whereby the movable head 205 can be positioned with accuracy to the second fiber fixing grooves 209.

The movable arm 297 in the embodiment shown in FIG. 50 may employ such a structure that the motion of the actuator shaft 249 rotated by the second motor 246 shown in FIG. 32 is directly transmitted to the second movable arm 296, and in case of this structure, the first movable arm 226 can be omitted (though not shown).

Also, this embodiment employs the first movable arm 226 in the same structure as the first embodiment of the movable arm, wherein the tip of the first movable arm 226 is positioned on the top surface of the movable head mount portion 266 in the second movable arm 296. In this case, there occurs a doubt that deformation due to thermal expansion in the longitudinal direction of the first movable arm 226 could affect the second movable arm 296. With regard to this point, because the first movable arm 226 has a right-angle step 226a that can absorb thermal expansion in the longitudinal direction thereof and the movable head 206 is attached not to the first movable arm 226, but to the second movable arm 296, little deformation due to thermal expansion of the first movable arm 226 affects the movable head mount portion 266 at the tip of the second movable arm 296, thereby avoiding degradation of the operation and effects based on the above structure of the second movable arm 296.

The above embodiments each showed the examples of the drive mechanism 224 for optical switch in which the optical fiber arranging member 203 is constructed in a single step. The present invention, however, is by no means limited to the examples, but it can be applied to optical switch apparatus constructed in such an arrangement that the optical fiber arranging member 203 is formed in multiple steps and a drive mechanism (not shown) using a two-dimensional or three-dimensional moving stage is used to switch optical connection between the second optical fibers and the first optical fibers in the respective steps.

Next described are the effects in the third embodiment of the optical switch as described above.

When the master-side second optical fibers 204 are guided into the fiber introducing grooves 209 to be optically coupled with the multipath-side first optical fibers 202, the positioning members 219 provided in the movable head 205 supporting the second optical fibers 204 come to fit with the fiber introducing grooves 209 or the engaging portions 220 provided along the fiber introducing grooves 209, which presents the effect that with application of external stress in the fiber arrangement directions on the second optical fibers 204, no deviation of optical axis occurs in the optical coupling portion, whereby optical coupling between optical fibers facing in end facets can be securely maintained. Also, because the movable head 205, in which the positioning members 219 are provided, has flexibility, the second optical fibers 204 can be smoothly introduced into the fiber introducing grooves 209; and because the movable head 205 is urged downward by the elasticity of the movable arm 228 to be surely pressed against the fiber introducing grooves 209, stable optical coupling of optical fibers can be realized even when a force acts in the direction to separate the second optical fibers 204 from the fiber introducing grooves 209.

Since the second movable arm 227 is constructed in the structure of the plate spring that can expand or contract in the zigzag form, the stiffness of the second movable arm 222 can be decreased to increase flexibility and the movable head 205 can be smoothly pressed toward the fiber introducing grooves 209 with a small force, thereby enabling miniaturization of actuator and in turn miniaturization of optical switch. The above effects are further enhanced when the second movable arm 298 is formed by bending a single plate spring with slit portions.

Further, in case of the second movable arm 298 having the slit portions, even if it is deformed due to thermal expansion, the deformation is smoothly absorbed by the slit portions. Thus, there occurs no variations in end face separation between the first and second fibers 202 and 204, whereby the variations in optical characteristics can be minimized.

Here, the optical switches according to the present invention can achieve the following effects because of the above structures thereof.

Namely, because the antireflection agent is interposed in the optical coupling portion between the master-side second optical fibers and the multipath-side first optical fibers, diffusion of light can be suppressed even if the fiber end facets of the optical fibers opposed to each other are not in contact with each other, thus presenting the effect of decreasing the optical coupling losses; in addition, because the antireflection agent is confined in the sealing case, it is prevented from escaping in vapor and dust or the like is prevented from intruding into the sealing case. Therefore, the invention can realize stabilization of optical characteristics in optically coupling the first optical fibers with the second optical fibers, improvement in reliability of optical coupling, and improvement in positioning accuracy upon optical coupling.

The present invention was described in detail specifically with the preferred embodiments, but it should be noted that the invention involves modifications and changes thereof in the range not departing from the true spirit and scope of the invention.

We claim:

1. An optical switch comprising an optical fiber arranging member in which tip ends of a plurality of first optical fibers are juxtaposed, a movable arm facing the optical fiber arranging member and fixing a tip end of a second optical fiber, and a drive mechanism for driving at least one of said optical fiber arranging member and said movable arm, for switching of optical connection, in a direction of arrangement of said first optical fibers and in a direction perpendicular to the direction of arrangement of said first optical fibers to optically couple said second optical fiber with said first optical fiber, wherein said optical fiber arranging member and said movable arm are encased in a sealing case and an antireflection agent is filled in the sealing case and said antireflection agent is silicone oil.

2. The optical switch according to claim 1, wherein said optical fiber arranging member is encased in a lower portion of said sealing case hermetically closed, the tip ends of said first optical fibers are juxtaposed on said first optical fiber arranging member, said movable arm is made to extend in a vertical direction, the tip end of said second optical fiber is fixed to said movable arm, and an oil sump recess for encasing said tip ends of said first optical fibers and said tip end of said second optical fiber is formed in the lower portion of said sealing case.

3. An optical switch comprising an optical fiber arranging member in which tip ends of a plurality of first optical fibers are juxtaposed, a movable arm facing the optical fiber arranging member and fixing a tip end of second optical fiber, and a drive mechanism for driving at least one of said optical fiber arranging member and said movable arm, for switching of optical connection, in a direction of arrangement of said first optical fibers and in a direction perpendicular to the direction of arrangement of said first optical fibers to optically couple said second optical fiber with said first optical fiber, wherein said optical fiber arranging member and said movable arm are encased in a sealing case and an antireflection agent is filled in the sealing case, a slide guide portion for engaging with a base stage to which said movable arm is fixed and for drive-guiding said movable arm in said direction of arrangement is disposed in a upper portion in said sealing case and wherein a sealing cover surrounds at least said slide guide portion, and said slide guide portion comprises an external thread shaft extending in said direction of arrangement between both side portions of said sealing case and meshing with an internal thread portion provided in said base stage, and a guide shaft extending in parallel with said external thread shaft and guiding said base stage in said direction of arrangement.

4. The optical switch according to claim 3, wherein said sealing cover is constructed of bellows extending between said base stage and side portions of said sealing case.

5. The optical switch according to claim 3, wherein a movable element for driving said movable arm in the direction perpendicular to said direction of arrangement is disposed inside said base stage.

6. An optical switch comprising an optical fiber arranging member in which tip ends of a plurality of first optical fibers are juxtaposed, a movable arm facing the optical fiber arranging member and fixing a tip end of a second optical fiber, and a drive mechanism for driving at least one of said optical fiber arranging member and said movable arm, for switching of optical connection, in a direction of arrangement of said first optical fibers and in a direction perpendicular to the direction of arrangement of said first optical fibers to optically couple said second optical fiber with said first optical fiber, wherein said optical fiber arranging member and said movable arm are encased in a sealing case and an antireflection agent is filled in the sealing case, said optical switch further comprises:

a first movable arm composing a part of said movable arm and having elasticity;

a second movable arm composing a part of said movable arm and energized by said first movable arm;

a base stage fixing a base end of said movable arm and disposed in said sealing case so as to be slidable in the direction of arrangement of said first optical fibers;

an external thread shaft extending in the direction of arrangement of said first optical fibers between both side portions of said sealing case and meshing with an internal thread portion provided in said base stage; and a movable element disposed in a receiving space portion formed inside said base stage and facing said first movable arm, said movable element moving into or out of said base stage in the direction perpendicular to the direction of arrangement of said first optical fibers to drive said pressing arm.

7. The optical switch according to claim 6, comprising a cam shaft extending in parallel with said external thread shaft and engaging with said movable element to drive said movable element in the direction perpendicular to said direction or arrangement, wherein said cam shaft is disposed between a first flange and a second flange formed in said movable element and said movable element is driven in the direction perpendicular to said direction of arrangement by cooperative action of said first and second flanges and said cam shaft.

8. The optical switch according to claim 7, wherein a compression spring urges one end of said movable element against said second movable arm and wherein a first restraining wall to get into contact with said first flange by an urging force of said compression spring so as to retrain movement of said movable element is formed in said receiving space portion.

9. The optical switch according to claim 6, wherein said movable element is divided into a first portion and a second portion through a connecting portion, the optical switch has a cam shaft extending in parallel with said external thread shaft, said cam shaft and said first portion work in cooperation to drive said movable element in the direction perpendicular to said direction of arrangement, the optical switch has a latch mechanism facing said second portion and fixed to said base stage, and said latch mechanism and said second portion work in cooperation to lock said movable element.

10. The optical switch according to claim 9, wherein said latch mechanism comprises a latch portion formed in a tip portion of said second portion, and a pawl portion latch-engaging therewith.

11. The optical switch according to claim 6, wherein a motor body is fixed in said receiving space portion, a spiral spindle moving into or out of said motor body is made to face said movable element, and said movable element is driven by said spiral spindle in the direction perpendicular to said direction of arrangement.

12. An optical switch comprising an optical fiber arranging member in which tip ends of a plurality of first optical fibers are juxtaposed, a movable arm facing the optical fiber arranging member and fixing a tip end of a second optical fiber, and a drive mechanism for driving at least one of said optical fiber arranging member and said movable arm, for switching of optical connection, in a direction of arrangement of said first optical fibers and in a direction perpendicular to the direction of arrangement of said first optical fibers to optically couple said second optical fiber with said first optical fiber, wherein said optical fiber arranging member and said movable arm are encased in a sealing case, said optical fiber arranging member is in an antireflection agent in the sealing case and said driving mechanism is separated from said antireflection agent.

13. The optical switch according to claim 12, comprising:

a first movable arm composing a part of said movable arm and having elasticity;

a second movable arm composing a part of said movable arm and energized by said first movable arm;

a base stage fixing said movable arm and disposed in said sealing case so as to be slidable in the direction of arrangement of said first optical fibers;

an external thread shaft extending in the direction of arrangement of said first optical fibers between both side portions of said sealing case and meshing with an internal thread portion provided in said base stage;

first and second support members rotatably supporting both ends of the external thread shaft and engaging with both side portions of said sealing case; and a wedge mechanism interposed between said first and second support members and said both side portions to move said first and second support members back and forth in the direction perpendicular to said direction of arrangement.

14. The optical switch according to claim 13, wherein said wedge mechanism comprises first wedge bodies in a trapezoid cross section fixed to said both side portions, and second wedge bodies in a trapezoid cross section mounted on said wedge bodies through wedge surfaces and slidably contacting to said first and second support members.

15. The optical switch according to claim 13, comprising a connecting shaft piercing said base stage and extending in parallel with said external thread shaft to be meshed with said second wedge bodies to drive said second wedge bodies simultaneously and in a same direction, and wedge moving means encased in said second support member of a box, shape for rotating the connecting shaft.

16. The optical switch according to claim 13, wherein a linear guide extending in the direction perpendicular to said direction of arrangement is interposed between said first and second support members and said both side portions.

17. The optical switch according to claim 12, wherein said drive mechanism is disposed outside said sealing case.

18. The optical switch according to claim 17, wherein said drive mechanism comprises a first drive mechanism for moving the optical fiber arranging member fixing said first optical fibers, and a second drive mechanism for moving said second optical fiber in the direction perpendicular to the direction of arrangement of said first optical fibers.

19. The optical switch according to claim 18, wherein said optical fiber arranging member is fixed unitarily to said sealing case and said first drive mechanism moves said first optical fibers in said direction of arrangement by moving said sealing case.

20. The optical switch according to claim 19, wherein said sealing case has first openings on both side walls located in said direction of arrangement, the optical switch comprises a support plate exposed between said both side walls and arranged through said first openings, both ends of said support plate being fixed to side walls standing on a base on which said sealing case is mounted and said support plate being set in liquid sealing by bellows covers closing said first openings, and a movable arm supporting said second optical fiber in said sealing case, and wherein said movable arm is mounted on said support plate.

21. The optical switch according to claim 19 or 20, wherein said sealing case has a second opening on a bottom portion thereof, the optical switch further comprises a moving member disposed through said second opening and moving in the direction perpendicular to said direction of arrangement by said second drive mechanism, and wherein a gap between said moving member and said second opening is kept in liquid sealing by a bellows portion.

22. The optical switch according to claim 17, wherein said sealing case is comprised of a bottom wall, a surrounding wall, a cover for closing a top surface of the surrounding wall, and bellows covers connected to both side walls of said surrounding wall so as to make the inside communicate with the first openings formed on said both side walls, in said sealing case the movable arm supporting said second optical fiber is mounted on a support plate which extends through said first openings into said left and right bellows covers and both ends of which are supported by side walls standing on a base, said first optical fibers are held by the optical fiber arranging member unitarily disposed in said sealing case, and an output portion of a drive mechanism for moving said second optical fiber in the direction perpendicular to said direction of arrangement is arranged to be interlocked with said movable arm through a movable block supported in liquid sealing to pierce a flexible wall closing the second opening in said bottom wall.

23. The optical switch according to claim 17, wherein said optical switch is provided with a sensor for detecting a motion of said drive mechanism outside said sealing case.

24. The optical switch according to claim 12, wherein said optical fiber arranging member has a first base plate on a top surface of which a plurality of fiber fixing grooves for fixing a plurality of first optical fibers are formed, and a second base plate on a top surface of which a plurality of fiber introducing grooves for introducing the second optical fiber is formed as located on extension lines of said fiber fixing grooves, and wherein said movable arm has a movable head facing said optical fiber arranging member and fixing the tip end of said second optical fiber, and a positioning member provided in the movable head and engaging with said fiber introducing groove.

25. The optical switch according to claim 12, wherein said optical fiber arranging member has a first base plate on a top surface of which a plurality of fiber fixing grooves for fixing a plurality of first optical fibers are formed, a second base plate on a top surface of which a plurality of fiber introducing grooves for introducing the second optical fiber are formed as located on extension lines of said fiber fixing grooves, and an engaging portion formed on the top surface of said second base plate and along said fiber introducing grooves, and wherein said movable arm has a movable head facing said optical fiber arranging member and fixing the tip end of said second optical fiber, and a positioning member provided in the movable head and engaging with said engaging portion.

26. The optical switch according to claim 12, wherein said antireflection agent is silicone oil.

27. The optical switch according to claim 12, wherein said optical fiber arranging member is encased in a lower portion of said sealing case hermetically closed, the tip ends of said first optical fibers are juxtaposed on said first optical fiber arranging member, said movable arm is made to extend in a vertical direction, the tip end of said second optical fiber is fixed to said movable arm, and an oil sump recess for encasing said tip ends of said first optical fibers and said tip end of said second optical fiber is formed in the lower portion of said sealing case.

28. The optical switch according to claim 27, wherein a slide guide portion for engaging with a base stage to which said movable arm is fixed and for drive-guiding said movable arm in said direction of arrangement is disposed in an upper portion in said sealing case and wherein a sealing cover surrounds at least said slide guide portion.

29. The optical switch according to claim 28, wherein said slide guide portion comprises an external thread shaft extending in said direction of arrangement between both side portions of said sealing case and meshing with an internal thread portion provided in said base stage, and a guide shaft extending in parallel with said external thread shaft and guiding said base stage in said direction of arrangement.

30. The optical switch according to claim 28, wherein said sealing cover is constructed of bellows extending between said base stage and side portions of said sealing case.

31. The optical switch according to claim 28, wherein a movable element for driving said movable arm in the direction perpendicular to said direction of arrangement is disposed inside said base stage.

32. The optical switch according to claim 28, wherein first and second support members moving back and forth in the direction perpendicular to said direction of arrangement are engaged with the both side portions of said sealing case and said slide guide portion is disposed between said first support member and said second support member.

33. The optical switch according to claim 32, wherein said sealing case and said first and second support members are arranged to move back and forth through a wedge mechanism.

34. The optical switch according to claim 12, comprising:
- a first movable arm composing a part of said movable arm and having elasticity;
- a second movable arm composing a part of said movable arm and energized by said first movable arm;
- a base stage fixing a base end of said movable arm and disposed in said sealing case so as to be slidable in the direction of arrangement of said first optical fibers;
- an external thread shaft extending in the direction of arrangement of said first optical fibers between both side portions of said sealing case and meshing with an internal thread portion provided in said base stage; and
- a movable element disposed in a receiving space portion formed inside said base stage and facing said first movable arm, said movable element moving into or out of said base stage in the direction perpendicular to the direction of arrangement of said first optical fibers to drive said pressing arm.

35. The optical switch according to claim 34, comprising a cam shaft extending in parallel with said external thread shaft and engaging with said movable element to drive said movable element in the direction perpendicular to said direction of arrangement, where said cam shaft is disposed between a first flange and a second flange formed in said movable element and said movable element is driven in the direction perpendicular to said direction of arrangement by cooperative action of said first and second flanges and said cam shaft.

36. The optical switch according to claim 35, wherein a compression spring urges one end of said movable element against said second movable arm and wherein a first restraining wall to get into contact with said first flange by an urging force of said compression spring so as to restrain movement of said movable element is formed in said receiving space portion.

\* \* \* \* \*